(12) United States Patent
Becker et al.

(10) Patent No.: US 9,375,683 B2
(45) Date of Patent: Jun. 28, 2016

(54) FILTRATION WITH INTERNAL FOULING CONTROL

(71) Applicant: Danisco US Inc., Palo Alto, CA (US)

(72) Inventors: Nathaniel T. Becker, Hillsborough, CA (US); Ryszard Braun, Fairport, NY (US); Robert I. Christensen, Pinole, CA (US); Stefan Ekbom, Tenala (FI); Robin Fong, Mountain View, CA (US); Alexandra Schuler, Woodside, CA (US)

(73) Assignee: Danisco US Inc., Palo Alto, CA (US)

( * ) Notice: Subject to any disclaimer, the term of this patent is extended or adjusted under 35 U.S.C. 154(b) by 172 days.

(21) Appl. No.: 14/310,287

(22) Filed: Jun. 20, 2014

(65) Prior Publication Data

US 2014/0299532 A1    Oct. 9, 2014

Related U.S. Application Data

(62) Division of application No. 12/209,424, filed on Sep. 12, 2008, now Pat. No. 8,784,662.

(60) Provisional application No. 60/971,769, filed on Sep. 12, 2007.

(51) Int. Cl.
*B01D 65/02* (2006.01)
*B01D 63/10* (2006.01)
(Continued)

(52) U.S. Cl.
CPC ............ *B01D 65/00* (2013.01); *B01D 61/14* (2013.01); *B01D 63/10* (2013.01); *B01D 65/02* (2013.01);
(Continued)

(58) Field of Classification Search
CPC ........... B01D 2311/06; B01D 2311/14; B01D 2311/165; B01D 2313/19; B01D 2321/02; B01D 2321/04; B01D 2321/10; B01D 2321/12; B01D 2321/20; B01D 2321/2008; B01D 2321/2083; B01D 61/14; B01D 63/10; B01D 65/02; B01D 65/08
See application file for complete search history.

(56) References Cited

U.S. PATENT DOCUMENTS 4,760,025 A    7/1988 Estell et al.
5,182,204 A    1/1993 Estell et al.
(Continued)

FOREIGN PATENT DOCUMENTS

CN    1840228 A    10/2006
EP    0323299 B1   1/1993
(Continued)

OTHER PUBLICATIONS

Baruah, G.L. et al. "Scale-up from laboratory microfiltration to a ceramic pilot plant: Design and performance." *Journal of Membrane Science* 274(1-2): 56-63, Apr. 5, 2006.
(Continued)

Primary Examiner — Dirk Bass
(74) Attorney, Agent, or Firm — Danisco US Inc.

(57) ABSTRACT

Filtration processes and systems are provided for the separation of a filterable fluid stream by a filtration membrane module with uniform transmembrane pressure and flux along the membrane and internal control of membrane fouling via intermittent periodic reduction of the pressure differential between the permeate and retentate sides of the membrane and/or backwashing cycles during separation, recovery, and/or purification of proteins, peptides, nucleic acids, biologically produced polymers and other compounds or materials from aqueous fluids.

10 Claims, 43 Drawing Sheets

(51) Int. Cl.
*B01D 65/00* (2006.01)
*B01D 61/14* (2006.01)
*B01D 65/08* (2006.01)

(52) U.S. Cl.
CPC ............ *B01D 65/08* (2013.01); *B01D 2311/06* (2013.01); *B01D 2313/19* (2013.01); *B01D 2321/02* (2013.01); *B01D 2321/04* (2013.01); *B01D 2321/10* (2013.01); *B01D 2321/12* (2013.01); *B01D 2321/20* (2013.01); *B01D 2321/2008* (2013.01); *B01D 2321/2083* (2013.01)

(56) References Cited

U.S. PATENT DOCUMENTS

| | | |
|---|---|---|
| 5,256,294 A | 10/1993 | Van Reis |
| RE34,606 E | 5/1994 | Estell et al. |
| 5,888,401 A | 3/1999 | Nguyen |
| 6,312,936 B1 | 11/2001 | Poulose et al. |
| 7,005,291 B1 | 2/2006 | Nair et al. |
| 2004/0251192 A1 | 12/2004 | Fritze et al. |
| 2005/0072734 A1 | 4/2005 | Goldsmith et al. |
| 2007/0246406 A1 | 10/2007 | Dibel et al. |

FOREIGN PATENT DOCUMENTS

| | | |
|---|---|---|
| EP | 0747111 A1 | 12/1996 |
| EP | 2008705 A1 | 12/2008 |
| WO | WO91/11249 A1 | 8/1991 |
| WO | WO 99/07458 | 2/1999 |

OTHER PUBLICATIONS

Brandsma, R.L. et al. "Depletion of Whey Proteins and Calcium by Microfiltration of Acidified Skim Milk Prior to Cheese Making." *J. Dairy Sci.* 82(10): 2063-2069, Oct. 1, 1999.
Drenth, J. et al. "Subtilisin Novo." *European Journal of Biochemistry* 26(2): 177-181, 1972.
Kalisz, H.M. "Microbial proteinases." *Advances in Biochemical Engineering/Biotechnology* 36: 1-65, 1988.
Kawaguchi, T. et al. "Cloning and sequencing of the cDNA encoding [beta]-glucosidase 1 from *Aspergillus aculeatus*." *Gene* 173(2): 287-288, Sep. 16, 1996.
Knowles, J. et al. "Cellulase families and their genes." *Trends in Biotechnology* 5(9): 255-261, Sep. 1987.
Koch Membrane Systems. (2011). "KMS MFK™ Food & Dairy MF Elements," 2 pp.
Lahlou, Mohamed. (Dec. 28, 2000). "Membrane Filtration as an Alternative: Part 1," *Water Wastes Digest*, accessed at http://www.wwdmag.com/desalination/membrane-filtration-alternative-part-1 on May 1, 2012, 3 pp.
Lipp, P. et al. (2005). "Treatment of Reservoir Water with a Backwashable MF/UF Spiral Wound Membrane," *Desalination* 179:83-94.
Minnesota Rural Water Association. (2009). "Membrane Filtration," Chapter 19 in "Minnesota Water Works Operations Manual," created Aug. 13, 2009, accessed at http://www.mrwa.com/Chapter19/MembraneFiltration.pdf on May 3, 2012, 12 pp.
Mycrodyn-Nadir Gmbh. (Date Unknown). "SPIRA-CEL® Data Sheet, Modules for Ultrafiltration, DS-UP-8338 Series," 2 pp.
Nedkov, P. et al. "Die Primärstruktur von Subtilisin DY." *Hoppe-Seyler's Z. Physiol. Chem.* 364: 1537-1540, Nov. 1983.
The Northeast Waste Management Officials' Association. (Jun. 17, 2003). "Pollution Prevention Technology Profile Closed-Loop Aqueous Cleaning," accessed at http://www.newmoa.org/prevention/p2tech/ProfileAqueousCleaningFinal.pdf on May 1, 2012, 19 pp.
Okada, H. et al. "Molecular Characterization and Heterologous Expression of the Gene Encoding a Low-Molecular-Mass Endoglucanase from *Trichoderma reesei* QM9414." *Appl. Environ. Microbiol.* 64(2): 555-563, Feb. 1, 1998.
Ooi, T. et al. "Cloning and sequence analysis of a cDNA for cellulase (FI-CMCase) from *Aspergillus aculeatus*." *Current Genetics* 18(3): 217-222, Oct. 1, 1990.
Penttilä, M. et al. "Homology between cellulase genes of *Trichoderma reesei*: complete nucleotide sequence of the endoglucanase I gene." *Gene* 45(3): 253-63, 1986.
Saarilahti, H.T. et al. "CeIS: a novel endoglucanase identified from *Erwinia carotovora* subsp. *carotovora*." *Gene* 90(1): 9-14, May 31, 1990.
Sakamoto, S. et al. "Cloning and sequencing of cellulase cDNA from *Aspergillus kawachii* and its expression in *Saccharomyces cerevisiae*." *Current Genetics* 27(5): 435-439, Apr. 1, 1995.
Saloheimo, A. et al. "A novel, small endoglucanase gene, egl5, from *Trichoderma reesei* isolated by expression in yeast." *Molecular Microbiology* 13(2): 219-228, 1994.
Saloheimo, M. et al. "EGIII, a new endoglucanase from *Trichoderma reesei*: the characterization of both gene and enzyme." *Gene* 63(1): 11-22, 1988.
Saloheimo, M. et al. "cDNA Cloning of a *Trichoderma reesei* Cellulase and Demonstration of Endoglucanase Activity by Expression in Yeast." *European Journal of Biochemistry* 249(2): 584-591, 1997.
Shoemaker, S. et al. "Molecular Cloning of Exo-Cellobiohydrolase I Derived from *Trichoderma reesei* Strain L27." *Nat Biotech* 1(8): 691-696, Oct. 1983.
Techneau. (2006). "Nanaofiltration in Drinking Water: Literature Review," created May 30, 2007, accessed at http://www.techneau.org/fileadmin/files/Publications/Publications/Deliverables/D5.3.4b.pdf on May 3, 2012, 54 pp.
Teen, T.T. et al. "Homologous domains in *Trichoderma reesei* cellulolytic enzymes: gene sequence and expression of cellobiohydrolase II." *Gene* 51(1): 43-52, 1987.

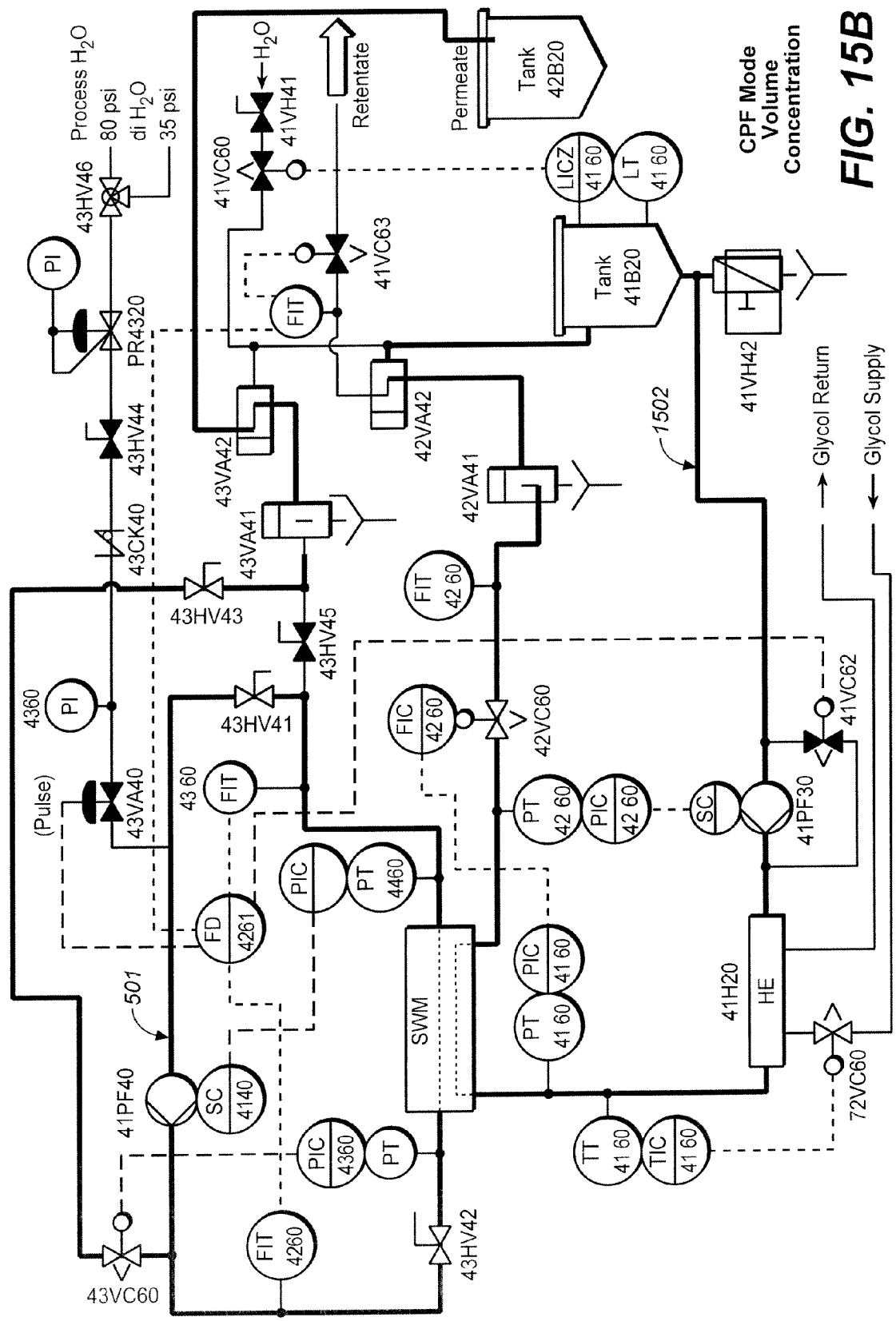

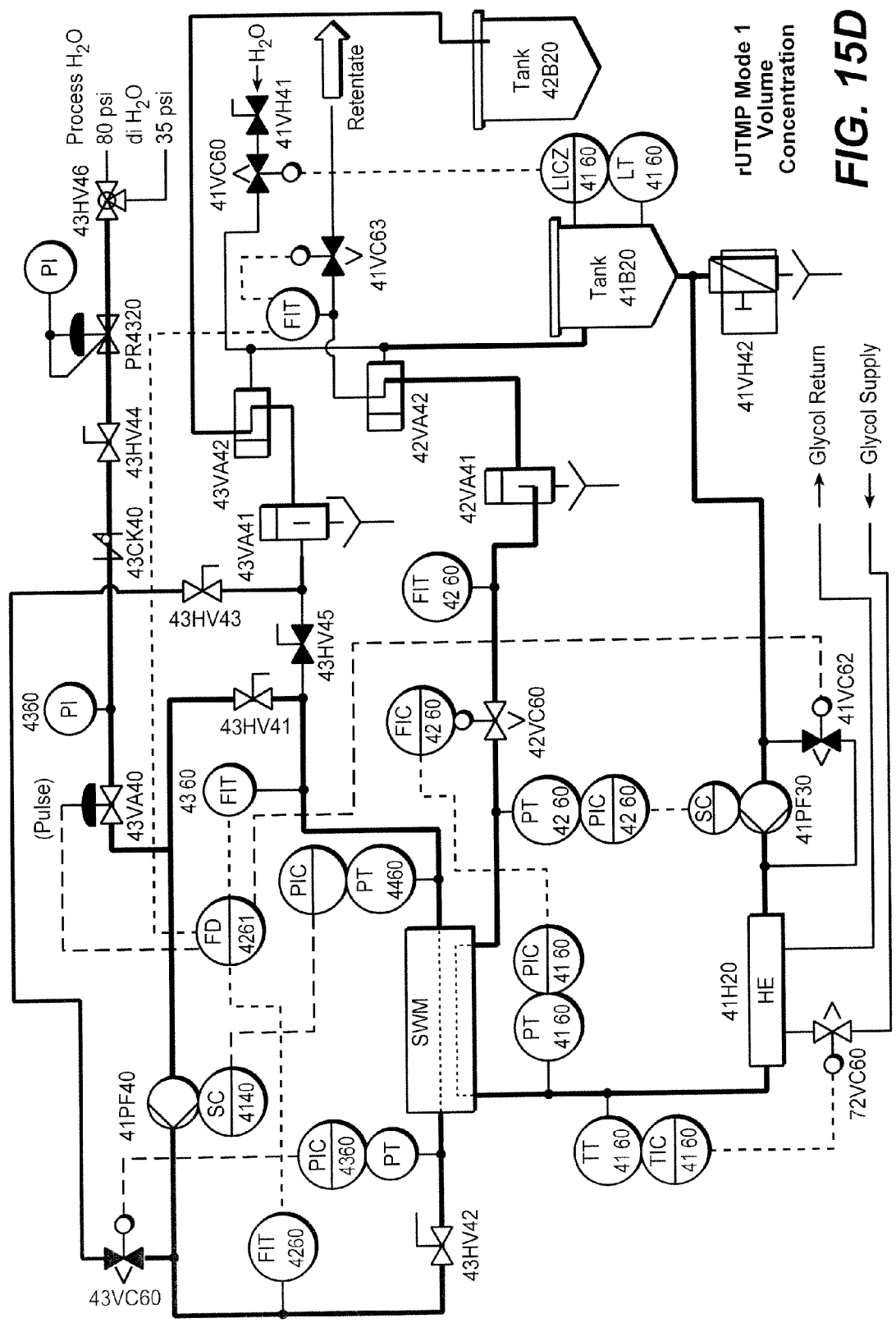
FIG. 15D rUTMP Mode 1 Volume Concentration

FFO Mode Diafiltration

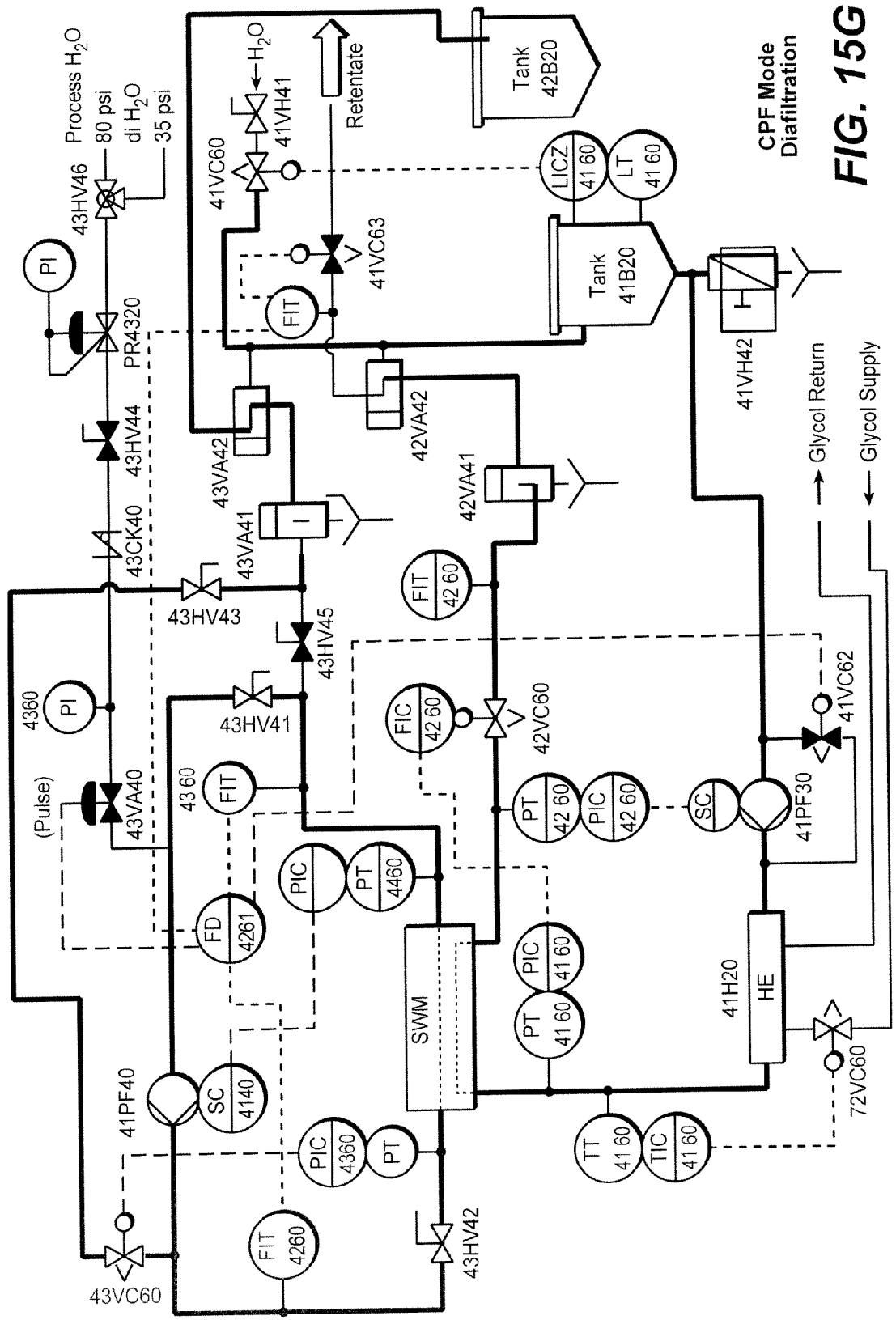

FIG. 16

| FIG. 16A | FIG. 16B | FIG. 16C | FIG. 16D | FIG. 16E |
|---|---|---|---|---|

| | | | Start-up | Water recirculation |
|---|---|---|---|---|
| Feed Pump | 41PF30 | Auto | OFF | CIP |
| Permeate Recycle Pump | 41PF40 | Auto | OFF | ON Speed controlled by PIC 42 60 |
| Dilution water Control Valve | 41VC60 | Auto | Closed | OFF |
| Retentate Bypass Valve | 41VC62 | | Closed | ON Position controlled by LICZ 41 60 |
| Retentate Harvest Valve | 41VC63 | | Closed | Closed |
| Retentate Loop Drain Valve | 42VA41 | Auto | Open to 42VA42 | Closed |
| | 42VA42 | Auto | Open to Feed Tank 41B20 | Open to 42VA42 |
| Retentate Outlet Control Valve | 42VC60 | Auto | Closed | Open to Feed Tank 41B20 |
| | | | | ON Position controlled by PIC 41 60 |
| rUTMP Pulse Valve | 43VA40 | Auto | OFF | OFF |
| Permeate Loop Drain Valve | 43VA41 | Auto | Open to 43VA42 | Open to 43VA42 |
| | 43VA42 | Auto | Open to Feed Tank 41B20 | Open to Feed Tank 41B20 |
| Permeate Product valve | 43VC60 | Auto | Closed | Closed |
| Permeate Loop Control Valve | 72VC60 | Auto | Closed | ON Position controlled by TIC 41 60 |
| Glycol control valve | PR4320 | Man | | |
| rUTMP Pulse Pressure Regulator | 41HV41 | Man | Closed | Open |
| Water supply shut-off | 41VH42 | Man | Closed | Closed |
| Retentate Drain Valve | 43HV41 | Man | Closed | Closed |
| Permeate Recycle Loop Shut-off Valve | 43HV42 | Man | Closed | Closed |
| Permeate Inlet Valve | 43HV43 | Man | Closed | Closed |
| Permeate Rec. Loop Product Return Shut-off Valve | 43HV44 | Man | Closed | Closed |
| Pulse Feed shut-off Valve | 43HV45 | Man | Open | Open |
| Permeate Outlet Shut-off Valve | 43CK40 | N/A | | |
| Pulse Feed Check Valve | | | | |

FIG. 16A

| FFO Mode | CPF Mode | nUTMP Mode |
|---|---|---|
| Volume Concentration | Volume Concentration | |
| ON Speed controlled by PIC 42 60 | ON Speed controlled by PIC 42 60 | ON Fixed Speed during nUTMP phase |
| OFF | ON Speed controlled by PIC 44 60 | ON Fixed Speed during nUTMP phase |
| Closed | Closed | Closed |
| Closed | Closed | Closed |
| | | |
| Open to 42VA42 | Open to 42VA42 | Open to 42VA42 |
| Open to Feed Tank 41B20 | Open to Feed Tank 41B20 | Open to Feed Tank 41B20 |
| ON Position controlled by PIC 41 60 | ON Position controlled by PIC 41 60 | ON Position fixed during nUTMP mode |
| | | |
| OFF | OFF | OFF |
| Open to 43VA42 | Open to 43VA42 | Open to 43VA42 |
| Open to Product Tank 42B20 | Open to Product Tank 42B20 | |
| Closed | ON Position controlled by PIC 43 60 | ON Valve closes during nUTMP phase |
| ON Position controlled by TIC 41 60 | ON Position controlled by TIC 41 60 | ON Position controlled by TIC 41 60 |
| | | |
| Closed | Closed | N/A |
| Closed | Closed | Closed |
| Closed | Open | Open |
| Closed | Open | Open |
| Closed | Open | Open |
| Closed | Closed | Closed |
| Open | Closed | Closed |

*FIG. 16B*

| rUTMP Mode 1 | rUTMP Mode 2 | FFO Mode |
|---|---|---|
|  |  | Diafiltration |
| ON Fixed Speed during rUTMP phase | ON Fixed Speed during rUTMP phase | ON Speed controlled by PIC 42 60 |
| ON Fixed Speed during rUTMP phase | ON Fixed Speed during rUTMP phase | OFF |
| Closed | Closed | ON Position controlled by LICZ 41 60 |
| Closed | ON Position controlled by DFIC | Closed |
|  |  |  |
| Open to 42VA42 | Open to 42VA42 | Open to 42VA42 |
| Open to Feed Tank 41B20 | Open to Feed Tank 41B20 | Open to Feed Tank 41B20 |
| ON Position fixed during rUTMP mode | ON Position fixed during rUTMP mode | ON Position controlled by PIC 41 60 |
| ON Valve opens for timed SP once net flow in FD 4261 approaches zero | OFF | OFF |
| Open to 43VA42 | Open to 43VA42 | Open to 43VA42 |
|  |  | Open to Product Tank 42B20 |
| ON Valve closes during rUTMP phase | ON Valve closes during rUTMP phase | Closed |
| ON Position controlled by TIC 41 60 | ON Position controlled by TIC 41 60 | ON Position controlled by TIC 41 60 |
| ON Set to pressure SP |  |  |
| N/A | N/A |  |
| Closed | Closed | Open |
| Open | Open | Closed |
| Open | Open | Closed |
| Open | Open | Closed |
| Open | Open | Closed |
| Open | Closed | Closed |
| Closed | Closed | Open |

FIG. 16C

| UTMP Mode | FFO Mode | CPF Mode |
|---|---|---|
| Diafiltration | Recirculation | Recirculation |
| ON Speed controlled by PIC 42 60 | ON Speed controlled by PIC 42 60 | ON Speed controlled by PIC 42 60 |
| ON Speed controlled by PIC 44 60 | OFF | ON Speed controlled by PIC 44 60 |
| ON Position controlled by LICZ 41 60 | Closed | Closed |
| Closed | Closed | Closed |
| | | |
| Open to 42VA42 | Open to 42VA42 | Open to 42VA42 |
| Open to Feed Tank 41B20 | Open to Feed Tank 41B20 | Open to Feed Tank 41B20 |
| ON Position controlled by PIC 41 60 | ON Position controlled by PIC 41 60 | ON Position controlled by PIC 41 60 |
| | | |
| OFF | OFF | OFF |
| Open to 43VA42 | Open to 43VA42 | Open to 43VA42 |
| Open to Product Tank 42B20 | Open to Feed Tank 41B20 | Open to Feed Tank 41B20 |
| ON Position controlled by PIC 43 60 | Closed | ON Position controlled by PIC 43 60 |
| ON Position controlled by TIC 41 60 | ON Position controlled by TIC 41 60 | ON Position controlled by TIC 41 60 |
| | | |
| Open | Closed | Closed |
| Closed | Closed | Closed |
| Open | Closed | Open |
| Open | Closed | Open |
| Open | Closed | Open |
| Closed | Closed | Closed |
| Closed | Open | Closed |

*FIG. 16D*

FFO Mode
Flush
ON Speed controlled by PIC 42 60
OFF
ON Position controlled by LICZ 41 60
Closed
Closed
Open to drain
Open to Feed Tank 41B20
ON Position controlled by PIC 41 60

OFF
Open to drain
Open to Feed Tank 41B20
Closed
Closed

Open
Closed
Closed
Closed
Closed
Closed
Closed
Open

CPF Mode
Flush
ON Speed controlled by PIC 42 60
ON Speed controlled by PIC 44 60
ON Position controlled by LICZ 41 60
Closed
Closed
Open to drain
Open to Feed Tank 41B20
ON Position controlled by PIC 41 60

OFF
Open to drain
Open to Feed Tank 41B20
ON Position controlled by PIC 43 60
Closed Open
Closed
Open
Open
Open
Closed
Closed Normal Mode Volume Concentration: Feed is recirculated through the retentate loop, the permeate recycle loop is closed off a(43HV41 and 43HV42 are closed) and the permeate recycle pump is off. The retentate inlet pressure is controlled by adjusting the pump speed. The retentate outlet pressure is controlled by the outlet retentate outlet control valve (42VC60) Permeate is sent to the product receipt tank.
UTMP Mode Volume Concentration: The retentate side is run as in normal mode.

*FIG. 16E*

1. TFF system employing CCPR and run under conditions where $P_{Ri} - P_{Pi} \sim P_{Roi} - P_{Po} > 0$
And periodically goes to condition $P_{Ri} - P_{Pi} \sim 0$ and $P_{Roi} - P_{Po} \sim 0$ and a significant retentate crossflow is maintained.

2. A TFF system as in #1, where periodically $P_{Ri} - P_{Pi} \sim P_{Roi} - P_{Po} < 0$ and a significant retentate crossflow is maintained.

3. A TFF system as in #1, where periodically $Q_{Pi} - Q_{Po} \sim 0$ and a significant retentate crossflow is maintained.

4. A TFF system as in #1, where periodically $Q_{Pi} - Q_{Po} < 0$ and a significant retentate crossflow is maintained.

10. A spiral system employing CCPR and run under conditions where $P_{Ri} - P_{Pi} \sim P_{Roi} - P_{Po} > 0$ and a significant retentate crossflow is maintained.

11. A spiral system as in #10 and run under conditions which periodically go to $P_{Ri} - P_{Pi} \sim 0$ and $P_{Roi} - P_{Po} \sim 0$ and a significant retentate crossflow is maintained.

12. A spiral system as in #10, where periodically $P_{Ri} - P_{Pi} \sim P_{Roi} - P_{Po} < 0$ and a significant retentate crossflow is maintained.

13. A spiral system as in #10, where periodically $Q_{Pi} - Q_{Po} \sim 0$ and a significant retentate crossflow is maintained.

14. A spiral system as in #10, where periodically $Q_{Pi} - Q_{Po} < 0$ and a significant retentate crossflow is maintained.

15. A spiral system as in #10, where an FRE is used to help manipulate permeate pressure.

*FIG. 31*

FILTRATION WITH INTERNAL FOULING CONTROL

CROSS-REFERENCE TO RELATED APPLICATIONS

This application is a divisional of U.S. application Ser. No. 12/209,424, filed on Sep. 12, 2008, which claims the benefit of U.S. Provisional Application No. 60/971,769, filed on Sep. 12, 2007, which are incorporated by reference herein in their entirety.

INTRODUCTION

The section headings used herein are solely for organization purposes and are not to be construed as limiting the subject matter described in any way.

The present invention pertains to filtration with internal fouling control, and, particularly, filtration using membranes providing uniform transmembrane pressure and internal fouling control for liquid/solid separations.

BACKGROUND

Microfiltration and ultrafiltration have been used for separation of compounds in biological broths or other liquids. The beverage industry has employed microfiltration to clarify beer and wine and in the dairy industry microfiltration and ultrafiltration can be used for processing of, for example, cheese whey or milk. Microfiltration has also recently been applied to the biotechnology industry, albeit somewhat more sparingly, for product separation and purification.

Microfiltration is in principle an attractive method of separating solutes from high solids suspensions, for example, fermentation suspensions, milk, or juice pulp. A variety of different microfiltration formats have been used in practice, including plate and frame, ceramic tubes, hollow fiber, and membrane systems. Plate and frame is used infrequently, but it is able to handle high solids concentrations. This format, however, is relatively expensive and requires a large equipment footprint when used for industrial scale operations. Ceramic tubes are widely used in the dairy and food industry because of the high throughputs, ease of operation, ease of sterilization/cleaning, and membrane longevity. However, ceramic tube systems are generally very expensive and require more power than other microfiltration systems in order to maintain the very high cross flows needed to minimize fouling. Hollow fibers are an alternative to ceramic tubes. They are not as operationally robust or as easy to run and operate as ceramic tubes, but are less costly and require a much smaller equipment footprint than ceramic tubes or plate and frame systems.

Spiral wound membranes have also been used for certain microfiltration operations. Spirally wound membrane constructions generally include an envelope of sheet membrane wound around a permeate tube that is perforated to allow collection of the permeate. Referring to FIG. 3, an exemplary spiral wound membrane module design includes a cylindrical outer housing shell, and a central collection tube sealed within the shell and having a plurality of holes or slots therein which serve as permeate collection means. A leaf comprising two membrane layers and a permeate channel layer sandwiched between the membranes is spirally wound around the tube with a feed channel spacer separating the layers of the wound leaf. The permeate channel layer typically is a porous material, which directs permeate from each membrane layer in a spiral path to the collection tube. In operation, a feed solution to be separated is introduced into one end of the cylinder and flows directly axially along the feed channel and feed spacer, and a retentate stream is removed from the other axial end of the shell. The edges of the membrane and permeate channel layer that are not adjacent the collection tube are sealed to retain and direct permeate flow within permeate channel layer between the membranes to the collection tube. Permeate which passes through the membrane sheets flows radially through the permeate collection means toward the central tube, and is removed from the central tube at a permeate outlet.

Applications of spirals at a commercial scale have been largely confined to treatments of highly dilute (low solids) process fluids. Spirally wound membrane modules are often employed alone or in combination for the separation of relatively low solids content materials by high pressure reverse osmosis, for example, for the production of pure water from brine; or low pressure ultrafiltration, for example, in the dairy field, for example, for the concentration of whey protein. In theory, a spiral wound membrane configuration offers a relatively large membrane surface area for separation processing relative to the footprint of the filtration module. The larger the membrane area in a filter system, the greater the permeation rate that is potentially available, everything else being equal. However, spiral wound membranes tend to foul at a high rate. Fouling leads to decline of flux, which determines system throughput, and decline in passage, which determines product yield. Unfortunately, the trans-membrane pressure (TMP) at the inlet of a spiral wound membrane is much higher than the TMP at the outlet. This occurs as membrane resistance creates a pressure gradient on the retentate side, whereas the permeate pressure is uniformly low across the membrane. Thus, optimal TMP condition can typically only be achieved within a relatively short zone along the membrane. Upstream of this optimal zone the membrane is overpressurized and tends to foul, while downstream of this zone the low TMP results in suboptimal flux. Spiral wound membranes are often run in series, which exacerbates the fouling problem.

Backpulsing is a generally known technique intended to restore flux and reduce fouling in filters. Backpulsing has been done in spiral membranes, for example, by forcing collected permeate backwards into the permeate channel to generate significant overpressure from the permeate side of the membrane. In the past, backpulsing strategies have not provided uniform local transmembrane pressures along the permeate side of the membrane. The pressure gradient within the permeate space has tended to be relatively higher at the permeate backflow inlet and relatively lower at distal locations in the permeate channel from the backflow source. Therefore, the level of localized defouling and flux restoration has varied considerably and unpredictably along the axial length of the membrane. In prior backpulsing approaches, either insufficiently low backflow pressure was developed within the permeate space resulting in suboptimal cleaning, or high backflow pressures developed within the permeate side sufficient to induce some level of defouling would lead to membrane damage by delamination. Backpulsing based on such permeate flow reversal techniques may generate a hydrodynamic shock wave or water hammer effect for inducing defouling, which is hard on the membrane. Also, the level of any flux restoration and defouling achieved tends to progressively decline after multiple filtration cycles using such backpulsing treatments. In some cases pressurized air has been used to enhance the backpulsing effect. However, some spiral membranes in particular may not be robust enough to tolerate pneumatic backpulsing. Some vendors, e.g., Trisep and Grahamtek, produce spiral membranes designed to handle backpulsing stresses.

Baruah, G., et al., *J Membrane Sci*, 274 (2006) 56-63, describe a microfiltration plant tested on transgenic goat milk featuring a ceramic microfiltration membrane configured with a back pulsing device, permeate re-circulation in co-flow to reportedly achieve uniform transmembrane pressure (UTMP), and a cooling/temperature control system. Backpulsing is done by trapping the permeate. This is done by closing the backpulse valve and a valve behind the pump outlet. By adjusting the bypass of the backpulsing device, a variable amount of liquid is then forced into the system to achieve the backpulse. However, modalities expected to cause non-uniform backpressure in the filtrate passage during backpulsing are undesirable as any defouling effects achieved on the membrane also will tend to be non-uniform. Also, ceramic filters generally are more costly than some other MF formats, for example, spiral membranes, and will offer less working surface area per length than a spiral format. Brandsma, R. L., et al., *J Dairy Sci*, (1999) 82:2063-2069, describe depletion of whey proteins and calcium by microfiltration of acidified skim milk prior to cheese making in a MF system reported to have UTMP capability. Alumina-based ceramic membranes are described as the filtering means, which were cleaned using a cycle of 1.5 weight percent NaOH and 1.5 weight percent nitric acid with use of the UTMP system as a backwashing mechanism. As such, the backwashing cycle as described by Brandsma et al. involves use of external chemicals to clean the ceramic membrane. The use of external harsh chemicals and significant production down times associated with their use to clean filters is non-ideal.

There is a need for filter strategies that can achieve high passage and yields in liquid/solid separations conducted on feed streams having low through high solids contents in a more continuous, less interrupted manner with reduced equipment and operating costs and effective defouling without cleaning chemical additions.

Crossflow filtration can also be used to separate like solutes or components based on differences in molecular weight. Sugar separation employing nanofiltration is one example. Separating milk proteins (primarily casein and whey) is another example that is actively being studied by the dairy industry. There has been some success with tubular ceramic membranes employing high crossflow velocities. Unfortunately, the hydrodynamics of spiral wound membranes have previously made this type of process very inefficient with polymeric spiral wound membranes, due to the development of a layer of polarized particles that eventually forms during operation. This fouling layer leads to reduced fluxes and rejection of solutes, specifically whey proteins. The fouling layer development is more extreme as the ratio between TMP and crossflow velocity increases. A system that can decouple crossflow from TMP would allow operation under conditions of minimal fouling

SUMMARY

In one aspect, the invention provides a filtration process comprising providing a membrane module including a membrane defining opposing permeate and retentate sides, an inlet and an outlet, a feed stream flowing from the inlet to the outlet axially along the retentate side of the membrane, a permeate stream flowing axially from the inlet to the outlet along the permeate side of the membrane, and a permeate recirculation loop for providing co-current permeate recirculation flow to the module; adjusting the flow rate or pressure on the permeate or retentate side of the membrane to provide baseline pressures at the inlet and the outlet on the permeate and retentate sides of the membrane such that the difference in baseline pressures between the permeate and retentate sides of the membrane is substantially the same at the inlet and the outlet, wherein the baseline pressure on the permeate side of the membrane is greater at the inlet than the baseline pressure at the outlet and the baseline pressure on the retentate side of the membrane is greater at the inlet than the baseline pressure at the outlet; and periodically adjusting the pressure on the permeate side of the membrane to reduce the difference in pressures between the permeate and retentate sides of the membrane at the inlet and the outlet by at least about 50% relative to the difference between the baseline pressures. In one embodiment, the membrane is a spiral wound membrane.

In some embodiments, periodically adjusting the pressure on the permeate side of the membrane occurs at approximately 1 minute to 6 hour intervals for approximately 1 to 60 second durations, and intervening time periods comprise separation phases of operation. In one embodiment, when the pressure is periodically reduced on the permeate side of the membrane the difference in pressures between the permeate and retentate sides of the membrane is reduced to essentially zero at the inlet and the outlet.

In some embodiments, the process further comprises periodically performing a reverse uniform transmembrane pressure (rUTMP) process by either increasing the permeate pressure or decreasing the retentate pressure, resulting in a controllable overpressurization on the permeate side of the membrane in comparison with the pressure on the retentate side of the membrane to provide backflow across the membrane while axial flow is maintained from the inlet to the outlet on both sides of the membrane, wherein the difference in pressures between the permeate and retentate sides of the membrane is substantially the same at the inlet and the outlet during said rUTMP process. In some embodiments, the rUTMP process occurs periodically at approximately 1 minute to 6 hour intervals for approximately 1 to 60 second durations, and intervening time periods comprise separation phases of operation.

In another aspect, the invention provides a filtration process comprising providing a spiral wound membrane module including a membrane defining opposing permeate and retentate sides, an inlet and an outlet, a feed stream flowing from the inlet to the outlet axially along the retentate side of the membrane, a permeate stream flowing axially from the inlet to the outlet along the permeate side of the membrane, and a recirculation loop for providing co-current permeate recirculation flow to the module; and adjusting the flow rate of the permeate stream to provide baseline pressures at the inlet and the outlet on the permeate and retentate sides of the membrane such that the difference in baseline pressures between the permeate and retentate sides of the membrane is substantially the same at the inlet and the outlet, wherein the baseline pressure on the permeate side of the membrane is greater at the inlet than the baseline pressure at the outlet and the baseline pressure on the retentate side of the membrane is greater at the inlet than the baseline pressure at the outlet. In one embodiment, the membrane is a spiral wound membrane.

In some embodiments, the process further comprises periodically adjusting the pressure on the permeate side of the membrane to reduce the difference in pressures between the permeate and retentate sides of the membrane at the inlet and the outlet by at least about 50% relative to the difference between the baseline pressures. In one embodiment, when the pressure is periodically reduced on the permeate side of the membrane, the difference in pressures between the permeate and retentate sides of the membrane is reduced to essentially zero at the inlet and the outlet. In some embodiments, periodically adjusting the pressure on the permeate side of the membrane occurs at approximately 1 to 30 minute intervals for approximately 1 to 10 second durations, and intervening time periods comprise separation phases of operation.

In some embodiments, the process further comprises periodically performing a rUTMP process on said permeate side of the membrane, by either increasing the permeate pressure or decreasing the retentate pressure, resulting in a controllable overpressurization on the permeate side of the membrane in comparison with the pressure on the retentate side of the membrane to provide backflow across the membrane while axial flow is maintained from the inlet to the outlet on both sides of the membrane, wherein difference in pressures between the permeate and retentate sides of the membrane is substantially the same at the inlet and the outlet during said rUTMP process.

In another aspect, the invention provides a filtration process comprising providing a membrane module including a membrane defining opposite permeate and retentate sides, an inlet and an outlet, a feed stream flowing from the inlet to the outlet axially along the retentate side of the membrane, a permeate stream flowing from the inlet to the outlet along the permeate side of the membrane, and a permeate recirculation loop for providing co-current permeate recirculation flow to the module; adjusting the flow rate of the permeate stream such that the difference in pressures between the permeate and retentate sides of the membrane is substantially the same at the inlet and the outlet, wherein the pressure on the permeate side of the membrane is greater at the inlet than the outlet and the pressure on the retentate side of the membrane is greater at the inlet than the outlet; and periodically performing a rUTMP process on said permeate side of the membrane, by either increasing the permeate pressure or decreasing the retentate pressure, resulting in a controllable overpressurization on the permeate side of the membrane in comparison with the pressure on the retentate side of the membrane to provide backflow across the membrane while axial flow is maintained from the inlet to the outlet on both sides of the membrane, wherein the difference in pressures between the permeate and retentate sides of the membrane is substantially the same at the inlet and the outlet during said rUTMP process. In one embodiment, the membrane is a spiral wound membrane.

In another aspect, the invention provides a filtration process for the separation of a filterable fluid stream by a spiral wound filtration membrane module into a permeate stream and a retentate stream which process comprises: (a) flowing a feed stream to be separated at a feed stream flow rate into a feed stream inlet and axially across a retentate side of a spirally wound membrane under positive pressure in a first flow direction through a retentate channel of the membrane module; (b) withdrawing an axially flowing retentate stream at a retentate outlet of the membrane module; (c) collecting a permeate stream flowing radially within a permeate channel located on a permeate side of the membrane that is opposite to the retentate side thereof, in a permeate collection tube in fluid communication therewith, wherein the collection tube contains at least one flow resistance element; (d) flowing collected permeate stream through the central permeate collection tube to a permeate outlet for discharge from the module; (e) returning a portion of the permeate discharged from said permeate collection tube to a permeate inlet thereof at a permeate flow rate; and (1 adjusting the flow rate of the permeate stream to provide baseline pressures at the inlet and the outlet on the permeate and retentate sides of the membrane such that the difference in baseline pressures between the permeate and retentate sides of the membrane is substantially the same at the inlet and the outlet, wherein the baseline pressure on the permeate side of the membrane is greater at the inlet than the baseline pressure at the outlet and the baseline pressure on the retentate side of the membrane is greater at the inlet than the baseline pressure at the outlet.

In one embodiment, the process further comprises (g) periodically adjusting the pressure on the permeate side of the membrane reduce the difference in pressures between the permeate and retentate sides of the membrane at the inlet and the outlet by at least about 50% relative to the difference between the baseline pressures. In some embodiments, periodically adjusting the pressure on the permeate side of the membrane occurs at approximately 1 minute to 6 hour intervals for approximately 1 to 60 second durations, and intervening time periods comprise separation phases of operation. In one embodiment, when the pressure is periodically reduced on the permeate side of the membrane the difference in pressures between the permeate and retentate sides of the membrane is reduced to essentially zero at the inlet and the outlet.

In one embodiment, the process further comprises (g) periodically performing a rUTMP process on said permeate side of the membrane, by either increasing the permeate pressure or decreasing the retentate pressure, resulting in a controllable overpressurization on the permeate side of the membrane in comparison with the pressure on the retentate side of the membrane to provide backflow across the membrane while axial flow is maintained from the inlet to the outlet on both sides of the membrane, wherein difference in pressures between the permeate and retentate sides of the membrane is substantially the same at the inlet and the outlet during said rUTMP process. In some embodiments, the rUTMP process occurs periodically at approximately 1 minute to 6 hour intervals for approximately 1 to 60 second durations, and intervening time periods comprise separation phases of operation. In some embodiments, during the rUTMP process, transmembrane pressure (TMP) varies less than 40% along the entire length of the membrane as compared to TMP value at either axial end of the membrane. In some embodiments, the retentate and permeate channels are continuously maintained under positive pressures of about 0.1 to about 10 bar during said rUTMP process.

In some embodiments of any of the processes described herein, a flow resistance element is included on the permeate side of the membrane, wherein permeate flows through the flow resistance element, and wherein the flow rate of permeate flowing through the flow resistance element is varied to create the controlled pressure gradient. In some embodiments, the flow resistance element is selected from the group consisting of a tapered unitary insert, a porous media packed within an internal space defined by a collection tube through which permeate flows, a static mixing device housed within a collection tube through which permeate flows, and at least one baffle extending radially inward from an inner wall of a collection tube through which permeate flows. In one embodiment, the flow resistance element comprises a tapered unitary insert. In one embodiment, the flow resistance element comprises a tapered unitary insert retained within the collection tube by at least one resilient sealing ring located between the insert and an inner wall of the collection tube, and said tapered unitary insert including at least one groove extending below said resilient sealing ring allowing passage of fluid under the sealing ring and along an outer surface of the tapered unitary insert. In some embodiments, the flow resistance element comprises a porous media selected from beads and foams. In some embodiments, the flow resistance element comprises spherical polymeric beads. In some embodiments, the flow resistance element comprises a static mixing device.

In some embodiments of any of the processes described herein, the membrane is selected from a PVDF, a polysulfone, or a polyether sulfone membrane, and said membrane having a pore size of about 0.005 to about 5 micrometers. In some embodiments, the membrane comprises a polysulfone or a polyether sulfone membrane having a pore size of about 0.005 to about 2 micrometers.

In some embodiments of any of the processes described herein, the feed stream comprises a polypeptide, a nucleic acid, a glycoprotein, or a biopolymer. In some embodiments, the feed stream comprises a fermentation product of a bacterial production organism. In some embodiments, the bacterial production organism is selected from the group consisting of *Bacillus* sp, *Escherichia* sp, *Pantoea* sp, *Streptomyces* sp, and *Pseudomonas* sp. In some embodiments, the feed stream comprises a fermentation product from a fungal production host. In some embodiments, the fungal production host is selected from the group consisting of *Aspergillus* sp, *Trichoderma* sp, *Schizosaccharomyces* sp, *Saccharomyces* sp, *Fusarium* sp, *Humicola* sp, *Mucor* sp, *Kluyveromyces* sp, *Yarrowia* sp, *Acremonium* sp, *Neurospora* sp, *Penicillium* sp, *Myceliophthora* sp, and *Thielavia* sp. In some embodiments, the feed stream comprises a protease and filtration is carried out at a temperature maintained at about 15° C. or less. In some embodiments, the feed stream comprises an amylase and filtration is carried out at a temperature maintained at about 55° C. or less.

In another aspect, the invention provides a filtration system comprising: (a) a spiral wound filtration membrane module, comprising: a spirally wound membrane, a retentate channel extending along a retentate side of the membrane for receiving a feed stream from a feed stream inlet and flow of retentate axially across a retentate side of the membrane to a retentate outlet for discharge from the module; a permeate channel located on a permeate side of the membrane that is opposite to the retentate side, for radial flow of permeate passing through the membrane to a central permeate collection tube in fluid communication therewith, said collection tube containing at least one flow resistance element and defining a fluid channel for flow of collected permeate to a permeate outlet for discharge of collected permeate from the module, and said collection tube has a permeate inlet for introducing at least a portion of discharged permeate back into the collection tube; (b) a permeate pump for returning a portion of the permeate discharged from said permeate collection tube at a controllable rate into the permeate inlet of the collection tube; (c) a feed stream pump for feeding the feed stream to the feed stream inlet at a controllable rate, wherein said permeate pump and feed stream pump being mutually controllable; (d) a controller for mutual control of the permeate pump and feed stream pump such the respective feed stream and permeate flow rates into the membrane module are mutually controllable effective to provide alternating separation and defouling phases during a production run wherein uniform transmembrane pressure is substantially maintained axially along the membrane during both phases of operation. In some embodiments, the system further comprises (e) a pressurized water line in fluid communication with the permeate channel.

In some embodiments, the filtration system further comprises a housing having a first and second axial ends and defining an annular space in which the central permeate collection tube is located; a membrane leaf spirally wound around the permeate collection tube, said membrane leaf comprising a porous member sandwiched between semi-permeable membrane sheets to define the permeate passage as a radial flow channel, and a spacer arranged between windings of the membrane leaf to define the retentate channel, wherein an outer axial edge and lateral side edges of the membrane leaf are sealed and the inner axial edge thereof is in permeate flow communication with said permeate collection tube.

In some embodiments, the permeate pump and feed stream pump further being controllable for periodically overpressurizing the permeate side of the membrane relative to the retentate side sufficient to generate backflow across the membrane from the permeate side to the retentate side while maintaining axial, co-directional positive forward flow in the retentate and permeate channels.

In some embodiments, the feed stream pump is controllable to reduce the feed rate while the permeate pump being controllable to maintain the discharged permeate at a constant return rate. In some embodiments, the permeate pump being controllable to increase return rate of discharged permeate to the permeate inlet while feed stream pump is controllable to maintain the feed stream at a constant rate.

In some embodiments, the flow resistance element is selected from the group consisting of a tapered unitary insert, a porous media packed within an internal space defined by a collection tube through which permeate flows, a static mixing device housed within a collection tube through which permeate flows, and at least one baffle extending radially inward from an inner wall of a collection tube through which permeate flows. In one embodiment, the flow resistance element comprises a tapered unitary insert. In one embodiment, the flow resistance element comprises a tapered unitary insert retained within the collection tube by at least one resilient sealing ring located between the insert and an inner wall of the collection tube, and said tapered unitary insert including at least one groove extending below said resilient sealing ring allowing passage of fluid under the sealing ring and along an outer surface of the tapered unitary insert. In one embodiment, the flow resistance element comprises a porous media comprising spheres packed within an internal space defined by the collection tube.

In some embodiments, the membrane has a filter pore size of from about 0.005 micron to about 5 micron. In some embodiments, the membrane has a filter pore size of from about 0.05 micron to about 0.5 micron. In some embodiments, the membrane is selected from a PVDF, a polysulfone, or a polyether sulfone membrane, and said membrane having a pore size of about 0.005 to about 5 micrometers. In one embodiment, the membrane comprises a polysulfone or a polyether sulfone membrane having a pore size of about 0.005 to about 2 micrometers.

In some embodiments, the filtration system further comprises a plurality of valves for regulating flow of fluid through the system, a plurality of sensors for acquiring data about fluid as it flows through the system, and an electronic data processing network capable of at least receiving, transmitting, processing, and recording data associated with the operation of said pumps, valves, and sensors, wherein the recorded data collected during a flow filtration process is sufficiently comprehensive to allow control of the flow filtration process. In some embodiments, the sensors are selected from at least one of flow rate sensors, pressure sensors, concentration sensors, pH sensors, conductivity sensors, temperature sensors, turbidity sensors, ultraviolet absorbance sensors, fluorescence sensors, refractive index sensors, osmolarity sensors, dried solids sensors, near infrared light sensors, or Fourier transform infrared light sensors.

In another aspect, the invention provides a permeate product or a retentate product produced according to any of the processes described herein.

In another aspect, the invention provides a spiral wound membrane filter module comprising a spirally-wound membrane defining permeate and retentate sides, a permeate collection tube in fluid communication with the permeate side of the membrane, at least one flow resistance element included within the permeate collection tube operable to reduce fluid pressure in permeate flowing between inlet and discharge ends of the collection tube. In one embodiment, the permeate collection tube is located approximately centrally within the module. In some embodiments, the flow resistance element is selected from the group consisting of a tapered unitary insert, a porous media packed within an internal space defined by a collection tube through which permeate flows, a static mixing device housed within a collection tube through which permeate flows, and at least one baffle extending radially inward from an inner wall of a collection tube through which permeate flows. In one embodiment, the flow resistance element comprises a tapered unitary insert. In one embodiment, the flow resistance element comprises a tapered unitary insert retained within the collection tube by at least one resilient sealing ring located between the insert and an inner wall of the collection tube, and said tapered unitary insert including at least one groove extending below said resilient sealing ring allowing passage of fluid under the sealing ring and along an outer surface of the tapered unitary insert. In one embodiment, the flow resistance element comprises a porous media packed within an internal space defined by the collection tube. In some embodiments, the flow resistance element is selected from the group consisting of solid or hollow polymeric spheres, solid polymeric spheres, glass beads, solid ceramic spheres, solid metal spheres, hollow metal spheres, composite spheres, and combinations thereof. In one embodiment, the flow resistance element comprises a static mixing device housed within the collection tube. In one embodiment, the flow resistance element comprises an impeller adapted to rotate within the collection tube. In one embodiment, the flow resistance element comprises at least one baffle extending radially inward from an inner wall of the collection tube.

BRIEF DESCRIPTION OF THE DRAWINGS

The skilled artisan will understand that the drawings described below, are for illustration purposes only. The drawings are not intended to limit the scope of the application teachings in any way. Similarly numbered features in the different figures refer to the same feature unless indicated otherwise. The drawings are not necessarily drawn to scale.

FIGS. 15A-15I are simplified drawings illustrating a microfiltration system with a spiral membrane arranged for different permeate and retentate flow configurations. FIG. 15A illustrates a feed flow only configuration of the microfiltration system. FIGS. 15B-15E in particular illustrate embodiments according to the present teachings. FIG. 15B illustrates a configuration of the microfiltration system providing co-current permeate recirculation (CCPR) conditions to provide UTMP over the spiral membrane of embodiments of the present teachings. FIG. 15C illustrates a configuration of the microfiltration system providing null UTMP (nUTMP) conditions over the spiral membrane. FIGS. 15D and 15E illustrate alternative flow configurations of the microfiltration system for providing reverse UTMP (rUTMP) conditions over the spiral membrane. FIG. 15F illustrates a configuration of the microfiltration system providing free flow only diafiltration conditions. FIG. 15G illustrates a configuration of the microfiltration system providing UTMP diafiltration conditions. FIG. 15H illustrates a configuration of the microfiltration system providing free flow only recirculation conditions. FIG. 15I illustrates a configuration of the microfiltration system providing UTMP recirculation conditions.

FIG. 16A-16E is a chart showing exemplary equipment settings for the various modes of operation of the microfiltration system configurations illustrated in FIGS. 15A-15I.

FIG. 31 is a chart showing illustrative non-limiting embodiments in accordance with aspects of the present invention with the general process conditions associated with each scenario being indicated.

DESCRIPTION OF VARIOUS EMBODIMENTS

Figure 1:
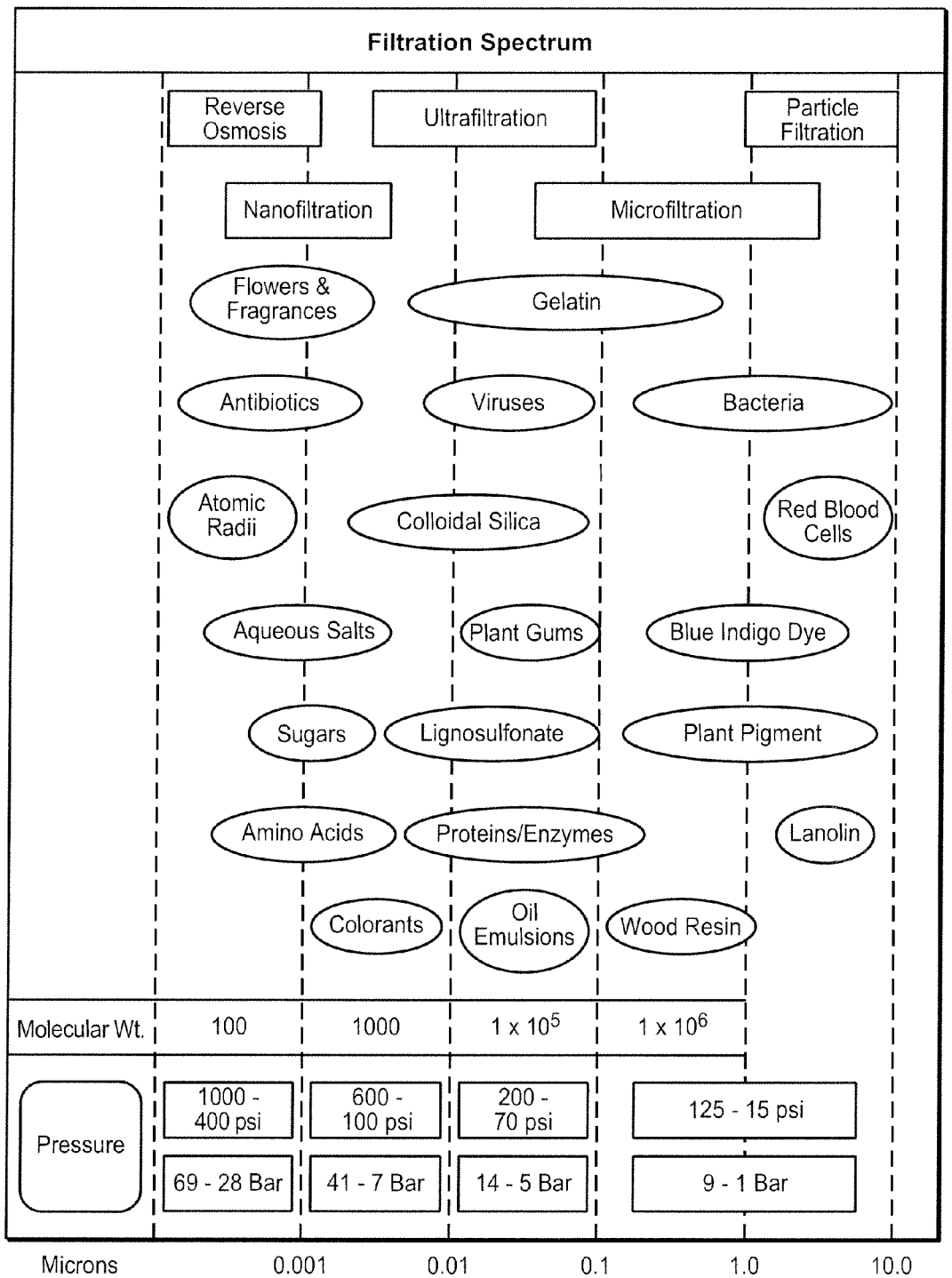
FIG. 1 illustrates a spectrum of filtration processes.

It is to be understood that the following descriptions are exemplary and explanatory only. The accompanying drawings are incorporated in and constitute a part of this application and illustrate several exemplary embodiments with the description. Reference will now be made to various embodiments, examples of which are illustrated in the accompanying drawings.

Throughout the application, descriptions of various embodiments use "comprising" language, however, it will be understood by one of skill in the art, that in some specific instances, an embodiment can alternatively be described using the language "consisting essentially of" or "consisting of."

For purposes of better understanding the application and in no way limiting the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. In some instances, "about" can be understood to mean a given value±5%. Therefore, for example, about 100 ml, could mean 95-105 ml. At the very least, each numerical parameter should at least be construed in light of the number of reported significant digits and by applying ordinary rounding techniques.

According to various embodiments, methods are provided that refer to processes or actions involved in sample preparation or other procedures. It will be understood that in various embodiments a method or process can be performed in the order of processes as presented, however, in related embodiments the order can be altered as deemed appropriate by one of skill in the art in order to accomplish a desired result.

For purposes of this application, the following definitions apply.

Backwashing refers to reversing the direction of flow through the membrane in order to dislodge foulants that are accumulating on the feed or retentate side of the membrane. Fluid flow will be from permeate side to feed/retentate side during backwashing.

Co-Current Permeate Recirculation (CCPR) refers to when permeate is actively pumped (recirculated) through the permeate side of a membrane system in the same direction as the feed. In our case, this is the flow mode that allows us to achieve UTMP throughout the membrane element.

Crossflow velocity refers to the superficial velocity of the feed as it travels through the membrane system. This is usually reported in m/s.

Defouling refers to removal of materials causing fouling from the filtration membrane surface.

Feed or feed stream refers to the liquid that is to be filtered by the membrane, and during the process it can also be referred to as retentate.

Flux refers to the rate in which fluid passes through the membrane. This is normally reported in LMH (liters per square meter of membrane area per hour).

Flow Resistance Element (FRE) refers to any type of structural unit or feature used to increase the rate of permeate pressure drop within the permeate collection space. This can be done by generating a resistance to flow of permeate through the collection tube of a filter module, either by restricting the flow channel area or generating turbulence. Resistance to flow results in a greater pressure drop than non-restricted flow, allowing for ease in manipulation of a wide range of pressure drops across a membrane filtration unit.

Fouling should be understood to mean obstruction of pores in a membrane by a gel layer, cake layer, pore blockage by particulate matter or by internal binding of molecules to the membrane pores, or by physical occlusion of the pores by insolubles.

Passage is the fraction of a solute that passes through the membrane during filtration. In practice, passage is determined by calculating the ratio of permeate concentration to retentate concentration of the solute and is typically expressed as a percentage.

Permeate is the liquid that has passed through (permeated) the filtration membrane. It also can be referred to as filtrate.

Retentate is the liquid that is retained on the feed side of the filtration membrane, and during the process it can also be referred to as feed. It also can be referred to as concentrate.

Reverse Uniform Transmembrane Pressure (rUTMP) refers to the pressure difference across a filtration membrane where the pressure is greater on the permeate side than on the retentate side of the membrane, and the pressure difference is essentially uniform across the length of the membrane system.

Transmembrane pressure (TMP) refers to the pressure difference between the retentate side and the permeate side of a membrane. Inlet transmembrane pressure (ITMP) refers to the pressure difference between the retentate stream and the permeate stream at the inlet of the membrane module or filtration system. Outlet transmembrane pressure (OTMP) refers to the pressure difference between the retentate stream and the permeate stream at the outlet of the membrane module or filtration system.

Uniform Transmembrane Pressure (UTMP) refers to the pressure difference between the retentate side and the permeate side of a membrane, where the pressure difference is essentially uniform across the length of the filtration membrane and/or where the difference in baseline pressures between the permeate and retentate sides of the membrane is substantially the same at the inlet and the outlet with the baseline pressure at the inlet greater than the baseline pressure at the outlet on both the permeate and retentate sides of the membrane.

$\Delta P$ refers to the pressure drop in the liquid feed between the liquid feed inlet and outlet axially along the retentate side in the membrane system.

Permeate $\Delta P$ refers to the pressure drop from inlet to outlet axially along the permeate side of the membrane.

Volume concentration factor (VCF) refers to volume of the retentate flowing out of the filtration module divided by the volume of feed flowing into the module for a continuous system or the volume of feed or net broth divided by the volume of retentate in the filtration system for a batch system.

Biological broth should be understood to mean raw biological fluid produced by culture or fermentation of biological organisms, for example, bacteria, fungi, mammalian or insect cells, or plant cells. The biological broth can contain a desired product, fermentation media and cells, or cell debris. Biological broths can also be obtained by extraction from biological samples, for example, plant matter or animal tissues or can mean the use of process intermediates, for example, precipitates, crystals or extracts.

Cell separation should be understood to mean the process by which cells, cell debris, and/or particulates are removed to allow separation and recovery of desired compounds and to clarify a broth for further processing. Cell lysis procedures can precede cell separation.

Clarification should be understood to mean the removal of particulate matter from a solution.

Cell paste should be understood to mean material in the retentate portion of the filtration module when filtering a biological broth, and often it refers to the retentate that exits the filtration system.

Concentration should be understood to mean the removal of water from a broth, and can refer to the use of a membrane, for example, in microfiltration, ultrafiltration, nanofiltration or reversed osmosis processes, chromatography, precipitation, and crystallization. Concentration can also be accomplished by evaporation techniques.

Concentration Polarization should be understood to mean the accumulation of the retained molecules (gel layer) on the surface of a membrane and can be caused by a combination of factors: transmembrane pressure, crossflow velocity, sample viscosity, and solute concentration.

Diafiltration should be understood to mean the fractionation process by which smaller components are washed through the membrane, leaving the desired larger components in the retentate. It can be an efficient technique for removing or exchanging salts, buffers, removing detergents, low molecular weight materials, or changing the ionic or pH environment. The process can typically employ a microfiltration or ultrafiltration membrane that is employed to separate a product of interest from a mixture while maintaining the concentration of the larger component constant. Diafiltration can be accomplished with, for example, filtration permeate, water or a buffered salt solution.

Fluids is used in a general sense, and unless indicated otherwise in a particular context, can encompass liquid materials containing dispersed and or solubilized species, pure liquids, or other flowable materials.

Fractionation should be understood to mean the preferential separation of molecules based on a physical or chemical properties.

Gel Layer or Boundary Layer should be understood to mean the microscopically thin layer of compounds that can form on the retentate side of a membrane. It can affect retention of molecules by clogging, or fouling, the membrane surface and thereby reduce the flux.

Filtration, for example, microfiltration or ultrafiltration, should be understood to mean a process that employs membranes to separate larger compounds from smaller compounds, for example, larger molecular weight from smaller molecular weight compounds. It can be used to concentrate mixtures and its efficiency is determined by factors, for example, the molecular weight cut off or pore size and type of the filter media, processing conditions and properties of the mixture being separated. The lower molecular weight compounds can be larger than the lower molecular weight compounds separated by ultrafiltration. Relative separation capabilities between ultrafiltration and microfiltration capabilities can be found described in FIG. 1. Of course, it will be noted that there is some overlap between the two filtration processes. The system and methods described herein, however, can be applicable to all filtrations including, for example, membrane systems as purification systems (for example, MF membranes, UF membranes). In embodiments according to the present teachings, microfiltration can be used to separate suspended particles in the range of about 0.05 to about 10 microns, in the range of about 0.1 to 8 microns, in the range of about 1 to about 5 microns, or about 0.05 to about 100 microns, 125 microns, or greater from fluids, such as biological fluids, for example, fermentation broth.

Molecular Weight Cut Off (MWCO) should be understood to mean the size (kilodaltons) designation for the ultrafiltration membranes. The MWCO is defined as the molecular weight of the globular protein that is 90% retained by the membrane.

Permeation Rate is the flow rate, or the volume of permeate per unit time, flowing through a membrane and is typically expressed in liters per minute (LPM).

Product Yield or Yield is the total amount of product collected in the product stream, usually expressed as a percentage of the total amount in the feedstream.

Proteins, polypeptides or biologically derived polymers should be understood to mean molecules of biological or biochemical origin or in vitro processes. These are made of condensed building blocks of amino acids and include enzymes, structural proteins and cell derived polymers, for example, celluloses, starch, polyhydroxybutyric acid, and polylactate.

Product Stream is a permeate or retentate stream that contains a product of interest. For example, in a concentration process, the product stream is the retentate because the product is retained while the solvent (water) is permeated. In a cell separation process, the product stream is the permeate because the product passes through the filter while cells and cell debris are retained.

Product Purity or Purity is the degree of isolation of the product in the product stream. It can be understood to mean the amount of desired compound isolated compared to the sum amount of the other components in the stream and can be expressed as a weight percentage. Alternatively, it can be understood to mean the ratio of the concentration of the product relative to that of another selected component in the product stream and can be expressed in weight percent. In various embodiments, purity is measured directly or indirectly instrumentally or manually, for example, by determination of enzymatic activity (for example, as determined colorimetrically); and or by product color determination by absorbance measurement, CIELAB formula, or US Pharmacopeia (USP) Monographs, and so forth to measure product color; and or by impurity level measurement (for example, measurement of microbial impurities in fresh product or as part of shelf life studies); and or total protein content or other product component; and or organoleptically by odor, taste, texture, visual color, and so forth (for example, in fresh product or as part of shelf life studies).

Rejection should be understood to mean the inability of a compound to pass through the filter media because of, for example, the formation of a gel, cake or boundary layer on a membrane surface; electrostatic charge interactions between the compound and a membrane surface; or the small pore size of the membrane.

Tangential Flow Filtration (TFF) should be understood to mean a process in which the fluid mixture containing the components to be separated by filtration is recirculated across the plane of the membrane.

Ultrafiltration should be understood to mean a process that employs membranes to separate large molecular weight compounds from low molecular weight compounds. It is used to concentrate a solution and its efficiency is determined by the molecular weight cut off of the membrane. Relative separation capabilities between ultrafiltration and microfiltration capabilities can be found described in FIG. 1. Of course, it will be noted that there is some overlap between the two filtration processes. Ultrafiltration can be used to concentrate suspended solids and solutes of molecular weight greater than 1,000 daltons, and a size greater than about 0.005 microns and up to about 0.1 microns.

Active Permeate Collection refers to a process in which the pressure of the permeate is controlled and the rate at which permeate is collected or removed from the permeate loop is controlled by a valve or other metering device.

According to various embodiments, unique liquid/solid separation processes, operations, systems and modules with internal fouling control are provided. Amongst other surprising results and advantages, processes and systems according to various embodiments of the present teachings make it feasible to more fully exploit the high surface area per length and compact footprint of spiral filtration membranes in particular in order to obtain increased product passage and yield while controlling membrane fouling with in-process manipulation of process fluids and without adding external cleaning chemicals or damaging membranes.

According to various embodiments, filtration processing is implemented in membrane formats operable to provide unique uniform transmembrane pressure (UTMP) modalities of operation that are effective for membrane fouling control. Membrane formats suitable for use with the filtration processes described herein include, for example, spiral, plate and frame, flat sheet, ceramic tube, and hollow fiber systems.

According to various embodiments, a filtration process is implemented in a membrane format comprising providing a membrane module including a membrane defining opposing permeate and retentate sides, an inlet and an outlet, a feed stream flowing from the inlet to the outlet axially along the retentate side of the membrane, a permeate stream flowing axially from the inlet to the outlet along the permeate side of the membrane, and a permeate recirculation loop for providing co-current permeate recirculation flow to the module. The flow rate and/or pressure of the permeate and/or retentate stream is adjusted to provide baseline pressures at the inlet and the outlet on the permeate and retentate sides of the membrane such that the difference in baseline pressures between the permeate and retentate sides of the membrane is substantially the same at the inlet and the outlet, wherein the baseline pressure on the permeate side of the membrane is greater at the inlet than the baseline pressure at the outlet and the baseline pressure on the retentate side of the membrane is greater at the inlet than the baseline pressure at the outlet.

In some embodiments, the pressure on the permeate side of the membrane is periodically adjusted to reduce the difference in pressures between the permeate and retentate sides of the membrane at the inlet and the outlet by any of at least about 50%, 60%, 70%, 80%, or 90% relative to the difference between the baseline pressures ("reduced UTMP"). In a further embodiment, when the pressure is periodically increased on the permeate side of the membrane, the difference in pressures between the permeate and retentate sides of the membrane is reduced to essentially zero at the inlet and the outlet. In this embodiment, equal and opposing pressures are provided on the opposite permeate and feed sides of the membrane such that a zero or null pressure gradient condition is created across the membrane. This provides a "null UTMP" condition in the module which allows feed crossflow to clean the retentate side of the membrane. In one embodiment this null UTMP mode of operation can be induced one or more times during a filtration production run, such as intermittently or periodically at regular time intervals or irregular time intervals (e.g., as needed) during otherwise normal operational flow conditions of co-current permeate recirculation conditions, and particularly UTMP conditions. In some embodiments, reduced or null UTMP occurs at intervals of 1 minute to 6 hours, 4 hours to 8 hours, 1 minute to 30 minutes, 1 minute to 10 minutes, 10 minutes to 30 minutes, or 10 minutes to 1 hour, for a duration of 1 second to 1 minute, 1 second to 30 seconds, or 1 second to 10 seconds. The duration refers to the time during which the TMP is reduced to the desired level, and is not inclusive of the amount of time that it takes for the permeate to reach the reduced pressure. In a particular embodiment, this reduced or null UTMP mode of operation can be implemented on a spiral wound membrane, although not limited thereto. It also can be implemented on a variety of other microfiltration formats plate and frame, ceramic tubes, hollow fiber, and so forth.

In some embodiments, reverse uniform transmembrane pressure (rUTMP) is provided. In such an embodiment, the permeate side of the membrane is periodically backwashed, i.e., a reverse flow through the membrane is achieved by either increasing the permeate pressure or decreasing the retentate pressure, resulting in a controllable overpressurization on the permeate side of the membrane in comparison with the pressure on the retentate side of the membrane. This controllable overpressurization condition provides backflow across the membrane while axial flow is maintained from the inlet to the outlet on both sides of the membrane. The difference in pressures between the permeate and retentate sides of the membrane is substantially the same at the inlet and the outlet during backwashing (rUTMP). The backwashing (rUTMP) phase removes fouling cake or other fouling material from the membrane. In more particular embodiments of defouling with rUTMP, periodic internal reverse flow can be provided by increasing the pressure of permeate and/or decreasing the pressure of retentate relative to one another, for example, by adjusting the flow rate(s) of permeate and/or retentate, and/or adjusting the recirculation rate of permeate, resulting in a controllable overpressurization on the permeate side. Backflow across the membrane is provided while positive flow is maintained in both the feed and permeate lines.

In one embodiment, a UTMP process has two defouling phases in which the first phase involves providing reduced UTMP or nUTMP conditions such as described herein followed by a subsequent phase of the rUTMP cycle involving providing the controllable overpressurization condition.

According to other various embodiments, a filtration process, such as at least one of the processes referenced above, is implemented in a spiral wound membrane format wherein at least one flow resistance element (FRE) is included within a permeate space, such as a collection tube, of the spiral wound filtration module. In various embodiments, the FRE is used in combination with co-current permeate recirculation to the filter module via a permeate recirculation loop. The flow resistance element partially impedes or obstructs forward movement of permeate through the collection tube such that a pressure drop can be created within the collection tube between the permeate inlet and outlet thereof. By altering the flow rate of permeate via the FRE, a controlled pressure gradient on the permeate side, close in magnitude to the retentate pressure gradient, can be induced along the length of the permeate side of the membrane. By including the flow resistance element (FRE) within the collection tube permeate space of the filtration module in combination with the periodic varying of the flow rate of permeate through the flow resistance element disposed in the collection tube, a controlled pressure gradient, which is close in magnitude to the retentate pressure gradient, can be induced along the length of the permeate side of the membrane. Positive permeate side pressure thus can build in a controlled manner in the permeate channel during the intermittent reduced or null UTMP and/or rUTMP phases while maintaining forward flow of both the feed stream and recirculated permeate streams through the module. Resulting backpressures and fluxes are gentle and uniform along the length of the membrane, avoiding excessive overpressure or underpressure, resulting in optimal reversal of fouling and minimizing the risk of membrane damage, for example, delamination of a spiral wound membrane module. A result achieved is significantly higher fluxes, and, the ability to efficiently process liquids containing high concentrations of solids that would be extremely problematic in a spiral membrane system. The maintenance of positive flow through the retentate passage during reduced or null UTMP and/or rUTMP phases facilitates removal of partly dislodged fouling materials from the retentate side of the membrane which can be swept away before they can settle back onto the retentate side when backwash pressure is relieved. As substantially uniform defouling is achieved along the length of the membrane, the flux is restored substantially uniformly along the length of the membrane. This is a gentle defouling regimen that minimizes the risk of mechanical damage to polymeric membranes, for example, spiral wound designs, while maintaining sufficient crossflow and backflow to reverse fouling by flushing out particulates and disrupting the cake layer on the membrane. Also, fouling due to overpressure is avoided.

The flow resistance elements can take various forms. In various embodiments they are a passive means, for example, a tapered unitary insert, porous media for example, beads or foams. In other various embodiments they are active means, for example, a static mixer, or other means of inducing resistance to fluid flow through the collection tube effective for a pressure drop to develop between the inlet and outlet to the tube. The magnitude of the pressure gradient on the permeate side is determined by the linear resistance or porosity of the flow resistance elements and the rate of the recirculation flow, allowing for independent control of TMP and crossflow rate. When the pressure gradients on the retentate and permeate sides of the membrane are offset by a constant pressure difference, uniform transmembrane pressure (UTMP) results. By adjusting the TMP to the optimal level along the entire length of the membrane, the entire membrane is used effectively, not just a portion as when the permeate pressure is unconstrained. Furthermore, fouling due to overpressure on the retentate side is avoided. This results in significantly higher product passages.

In various embodiments, significantly reduced membrane fouling in spiral membrane filtration systems is achieved and maintained, thereby allowing for improved recovery and maintenance of high fluxes and passages after numerous filtration cycles (i.e, separation/defouling cycles) spanning significant production time periods. Embodiments according to the present teachings can create new opportunities for use of spiral membrane-based filtration in separation processing applied to high solids content feeds. In various embodiments, significant flux advantages from UTMP are obtained in a spiral membrane format on liquids with high solids concentrations. Unlike brackish water for water purification systems, and the like, processes of embodiments herein can also be implemented on feed mixtures having solids loads that are several orders of magnitude larger than many conventional applications of spiral membranes.

In various embodiments, the feed stream to be separated comprises at least 25%, for example, at least 15%, and, for example, at least 5%, dispersed solids content. Surprisingly, in various embodiments of the present teachings, a lower crossflow when filtering certain high concentration broths, for example, *B. subtilis* broths, results in an initial higher flux. This result is surprising and unexpected as a high crossflow velocity is often cited in the membrane field as an important factor in establishing high fluxes higher velocities being thought necessary to sweep the membrane surface clean and maintain flux.

In various embodiments, defouling phases of processes according to embodiments of the present teachings (reduced or null UTMP, and/or rUTMP) are controlled to occur periodically, for example, at intervals of approximately 1 minute to 6 hours, 4 hours to 8 hours, 1 minute to 30 minutes, 1 minute to 10 minutes, 10 minutes to 30 minutes, or 10 minutes to 1 hour, for a duration of 1 second to 1 minute, 1 second to 30 seconds, or 1 second to 10 seconds. The retentate and permeate passages or channels are continuously maintained under positive pressures of about 0.1 to about 10 bar during defouling cycles. In various embodiments, during defouling, transmembrane pressure (TMP) varies less than 40%, for example, less than 20%, and, for example, less than 10%, along the entire axial length of the membrane as compared to TMP value at either axial end of the membrane. As indicated, process fluid is used in the backwashing regimen, such that external chemicals and significant process disruptions are not required for filter cleaning.

Product can be recovered from the permeate, retentate, or both streams exiting the membrane module in filtering systems configured and operated according to embodiments of the present teachings. According to various embodiments, an industrial scale, cost effective process is provided in various embodiments that can recover proteins, for example enzymes. The feed stream can comprise a protein, a polypeptide, a nucleic acid, a glycoprotein, or a biopolymer. The feed stream can comprise a fermentation product of a bacterial production organism, for example, *Bacillus* sp, *Escherichia* sp, *Pantoea* sp, *Streptomyces* sp, and or *Pseudomonas* sp. The feed stream can comprise a fermentation product from a fungal production host, for example, *Aspergillus* sp, *Trichoderma* sp, *Schizosaccharomyces* sp, *Saccharomyces* sp, *Fusarium* sp, *Humicola* sp, *Mucor* sp, *Kluyveromyces* sp, *Yarrowia* sp, *Acremonium* sp, *Neurospora* sp, *Penicillium* sp, *Myceliophthora* sp, and or *Thielavia* sp. The feed stream can comprise a serine protease and filtration is carried out at a temperature maintained at from about 12° C. to about 18° C., or amylase and filtration is carried out at a temperature maintained at from about 20° C. or 35° C. to about 45° C. or about 60° C. In some embodiments, the feed stream is a dairy feed stream, for example, milk (e.g., raw whole milk, whole milk, skim milk), whey, whey hydrolysates, buttermilk, curdled casein (acid or enzyme), or the like.

In various other embodiments, filtration systems for practicing the processes are also provided. The filtration system can comprise a spiral wound filtration membrane module, a permeate pump for returning a portion of the permeate discharged from a permeate collection tube containing at least one flow resistance element at a controllable rate into the permeate inlet of the collection tube, and a feed stream pump for feeding the feed stream to the feed stream inlet at a controllable rate. A controller, either manual, automatic or a combination thereof, for joint control of the permeate pump and feed stream pump is provided such the respective feed stream and permeate flow rates into the membrane module are mutually controllable effective to provide alternating separation and defouling phases during a production run wherein uniform transmembrane pressure is substantially maintained axially along the membrane during both phases of operation. Alternatively, pumps and/or valves may be independently controlled. The filtration system can comprise a plurality of valves for regulating flow of fluid through the system, a plurality of sensors for acquiring data about fluid as it flows through the system, and an electronic data processing network capable of at least receiving, transmitting, processing, and recording data associated with the operation of the pumps, valves, and sensors, wherein the recorded data collected during a flow filtration process is sufficiently comprehensive to allow automated control of the filtration process. In various embodiments, the membrane can comprise a PVDF, a polysulfone or polyether sulfone membrane having a pore size of about 0.005 to about 5 micrometers, or about 0.005 to about 20 micrometers.

The permeate loop of the operating system may include a valve that allows removal of permeate from the circulation loop. The permeate loop includes a valve, located upstream of the permeate pump, that is connected to a pressurized water line. The valve is controllable. When the water pressure is set higher then the permeate pressure inside the loop opening this valve allows to overpressurize the permeate loop relative to the retentate side sufficient to generate backflow across the membrane from the permeate side to the retentate side while maintaining axial, co-directional positive forward flow in the retentate and permeate channels.

In various other embodiments, a spiral wound membrane filter module is provided comprising a spirally-wound membrane defining permeate and retentate sides, a permeate collection tube in fluid communication with the permeate side of the membrane, at least one flow resistance element included within the permeate collection tube operable to reduce fluid pressure in permeate flowing between inlet and discharge ends of the collection tube.

Filtration processes and systems of various embodiments according to the present teachings also can provide significant cost reductions as well as improvements in product quality. In various embodiments, they are applicable to microfiltration, ultrafiltration, nanofiltration, singly or in overlapping scenarios thereof. The cost reduction derives both from high yields in efficiently separating and/or concentrating solutions and/or solutes from high solids suspensions and from elimination of raw materials used in other filtration operations. Various embodiments of the present teachings further enable cost savings from reductions in membrane costs and associated equipment resulting from higher permeate fluxes per unit of membrane area and potentially from improved cleaning, and reduced risk of damage to membranes during defouling. Various embodiments of the present teachings have application, in various embodiments, in fermentation broths, pharmaceuticals, chemicals, dairy, soy, and other food industries, for example, fruit juice, vegetable juice, brewing, distilling, and so forth. Various embodiments include recovery and purification of enzymes or other macromolecules from fermentation broth, juice clarification, and milk decontamination or concentration and/or separation of components of milk, and the like.

According to various embodiments, a filtration process is provided for the separation of a filterable fluid stream by a spiral wound filtration membrane module into a permeate stream and a retentate stream, in which the process comprises flowing a feed stream to be separated into a feed stream inlet and axially across a retentate side of a spirally wound membrane under positive pressure in a first flow direction through a retentate passage of the membrane module. An axially flowing retentate stream is withdrawn at a retentate outlet of the membrane module. A permeate stream flowing radially within a permeate passage located on a permeate side of the membrane module that is opposite to the retentate side is collected in a central permeate collection tube in fluid communication therewith. The collection tube contains at least one flow resistance element that partially impedes but does not block forward flow of permeate through the tube. The collected permeate stream flows through the central permeate collection tube to a permeate outlet for discharge from the module. A portion of permeate discharged from said permeate collection tube is returned to the tube through a permeate inlet to provide co-current permeate recirculation through the membrane module during separation processing. The permeate and feed stream flow rates into the membrane module are mutually controlled effective to provide successive filtration cycles comprising alternating separation and defouling phases during a production run during which uniform transmembrane pressure is maintained along the axial length of the membrane in both phases of operation. In various embodiments, the pressure on the permeate side of the membrane is periodically adjusted to reduce the difference in pressures between the permeate and retentate sides of the membrane at the inlet and the outlet by at least about 50% relative to the difference between the baseline pressures.

Figure 2:
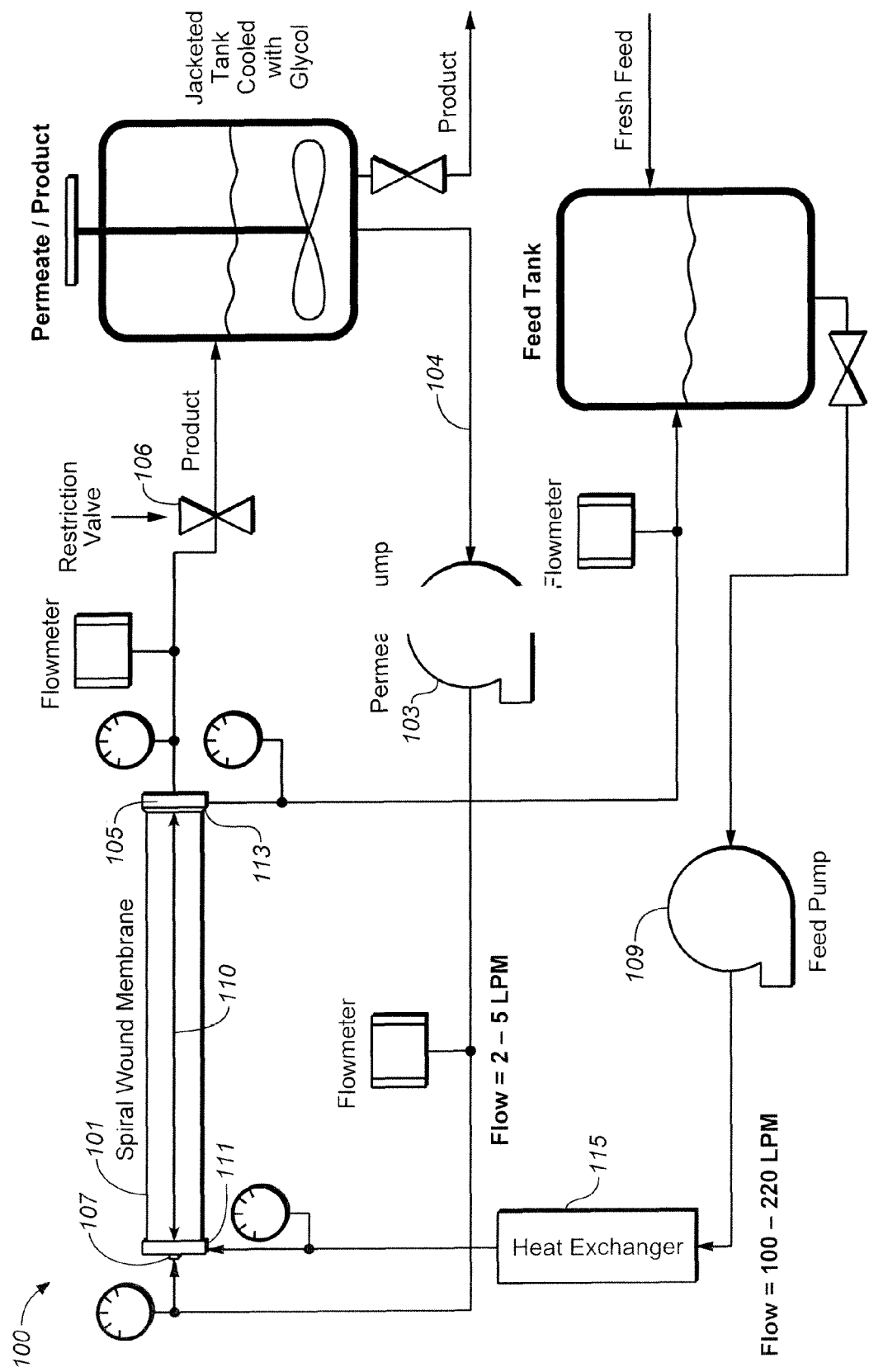
FIG. 2 is a simplified drawing illustrating a microfiltration system, according to various embodiments of the present teachings, with a spiral membrane arranged for co-current permeate recirculation and having a flow resistance element in the permeate collection tube.

Referring to FIG. 2, a generalized microfiltration system 100 for practicing various embodiments according to the present teachings is schematically illustrated. The filtration system 100 includes a spiral membrane 101, permeate pump 103, feed stream pump 109, and other components, for example, valves, pressure gauges, temperature gauges, flow meters, feed/collection tanks, and so forth, for providing an integrated operational separation system. Spiral wound filtration membrane module 101 is arranged for providing co-current permeate flow via permeate recirculation loop 104 including control valve 106 and permeate pump 103. Permeate pump 103 is controllable to return a portion of permeate discharged at permeate outlet 105 of the module 101 (i.e., an outlet end of a permeate collection tube) at a controllable rate into a permeate inlet 107 of the permeate collection tube disposed within filter module 101. Features of module 101 are illustrated in more detail below. Feed stream pump 109 is provided for feeding a feed stream to be separated to a feed stream inlet 111 of filter module 101 at a controllable rate. The feed stream is passed through a heat exchanger 115 before introduction into the filter module 101. Retentate exits filter module 101 at outlet 113 located at the opposite axial end of the module. The valve 106, permeate pump 103 and feed stream pump 109 are mutually controlled in manners described in more detail hereinafter to provide UTMP, null UTMP and rUTMP modes of operation. Uniform transmembrane pressure (UTMP) is provided in various embodiments during separation phases as the normal operating condition by providing co-current permeate recirculation through the collection tube of the spiral filtration module during separation of feed by recirculating a portion of the permeate to the collection tube inlet for reflow through the tube. The spiral membrane 101, permeate pump 103, feed stream pump 109 and valving 106 can be controlled such that UTMP modality is provided during the separation phases of a production run that are alternated with null UTMP (nUTMP) or reverse UTMP (rUTMP) phases provided at regulated time intervals as intermittent defouling phases applied to the membrane along its entire axial length. For purposes herein, axial length is determined parallel to the axial dimension 110 of the filter module 101.

Figure 3A:
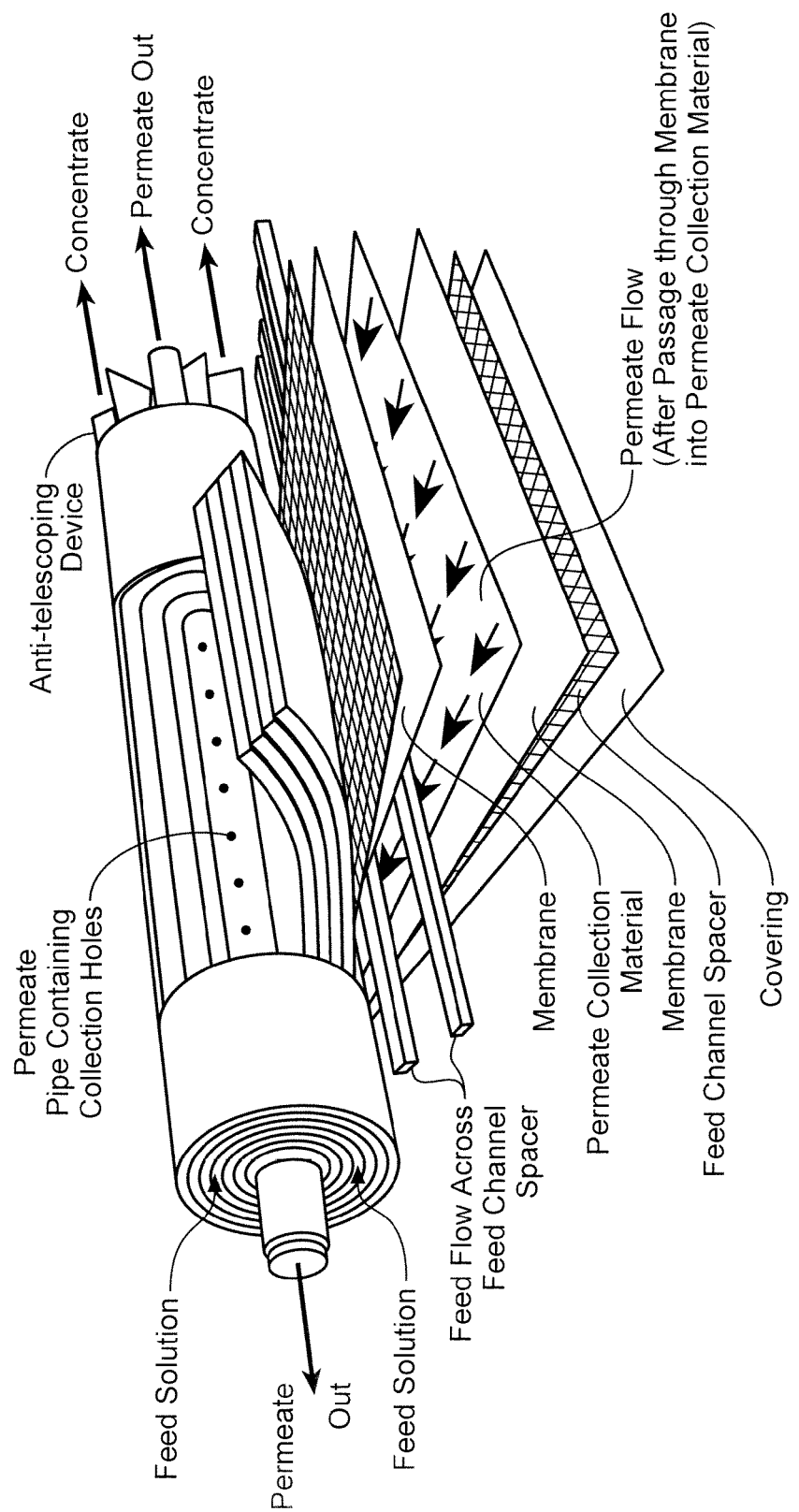
FIG. 3A is a schematical representation of a spiral wound membrane.
Figure 3B:
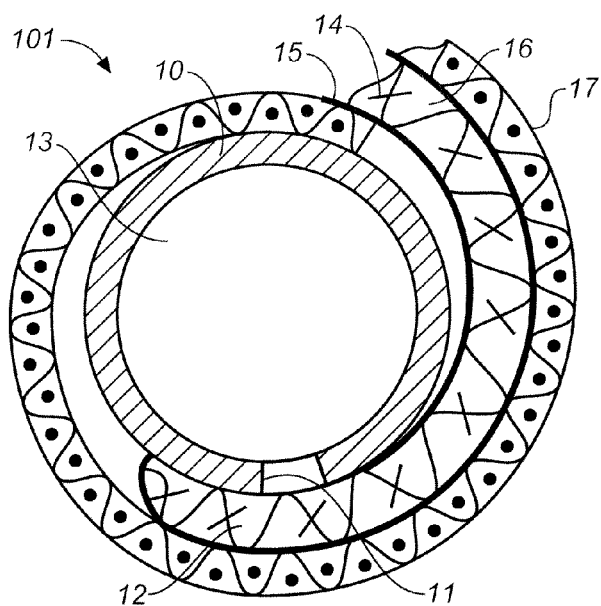
FIG. 3B is a partial cross-sectional view of a spiral wound membrane.

In various embodiments, the spiral membrane 101 has features in common with the filter module illustrated in FIG. 3A, although not limited thereto. FIG. 3B shows the spiral membrane 101 in a cross-section according to one non-limiting embodiment of the present teachings. However, the spiral membrane also can have significant modifications according to other various embodiments of the present teachings, such as illustrated in FIGS. 4-8 and described in more detail below. As shown in FIG. 3B, the spiral membrane 101 generally includes a perforated central collection tube 10 having openings 11 for introduction of permeate from permeate channel 12 into the interior space 13 of the tube 10. The tube 10 can be a semi-rigid or rigid material, for example, plastic, metal, ceramic construction, and so forth. Permeate channel 12 is sandwiched between membranes 14 and 15 to form a membrane leaf 16 that is spirally wrapped around tube 10 one or multiple times. The edges of the membrane and permeate channel layer that are not adjacent the collection tube generally are sealed, for example, in a conventional manner with adhesive or other sealing means, to retain and direct permeate flow within the permeate channel between the membranes to the tube 10. Permeate channel 12 can be a porous media layer or material, for example, a sheet or strip of porous cloth, felt, netting, or other porous material. The membranes 14 and 15 can be flexible sheet materials that are semi-permeable to dispersed discrete solid materials, depending on the size of the dispersed materials. The membranes can be microporous polymeric sheet materials, for example, microporous sheets of thermoplastic films. A feed channel spacer 17 separates layers of the wound leaf 16, and which is used for introduction of fluid material to be separated into the spiral membrane 101. To simplify this illustration, only a partial wrapping of membrane leaf 16 around tube 10 is shown. For purposes herein, the radial dimension 112 of the filter module 101 is orthogonal to the axial dimension 110.

Referring to FIGS. 4-8, in various embodiments of the present teachings, a flow resistance element can be provided in the permeate space 13. For purposes herein, a flow resistance element or "FRE" can be an individual component or a plurality of components used in unison, as will be better understood from the following non-limiting illustrations.

Figure 4A:
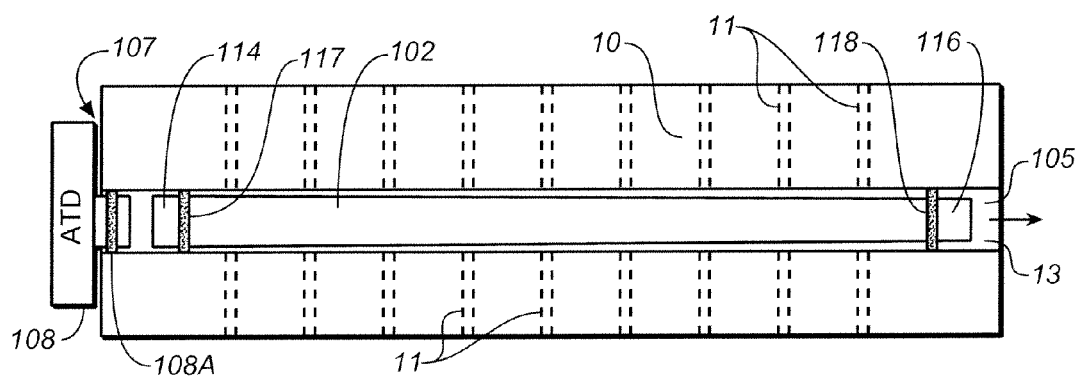
FIG. 4A is a partial cross-sectional view of a spiral membrane for a microfiltration system in which a tapered unitary insert is installed in the collection tube as a FRE according to an embodiment of the present teachings.

Referring to FIG. 4A, a tapered unitary insert 102 is positioned within the collection tube 10. The tube openings 11 shown in this figure through which permeate is introduced into the interior space 13 of the tube 10 from the spiral membrane 101 during a filtration operation are merely illustrative, as the number and frequency and size thereof can vary and differ in practice. The tapered insert 102 has one axial end 114 near tube inlet 107 having a cross-sectional diameter that is larger than that of the opposite axial end 116 nearer the tube outlet 105. In this illustration, the tapered insert 102 generally has a negative (decreasing) slope between its ends 114 and 116. The tapered insert 102 can have a metal, plastic, ceramic or other type of construction which is stable and durable in the permeate environment. The tapered design of insert 102 promotes a more even pressure drop gradient as permeation through the membrane contributes to the total permeate flow along the axial length of the permeate collection tube. A resilient sealing ring or gasket 117, 118, such as an O-ring, is located between the insert 102 and an inner wall 119 of the collection tube 10 at each axial end of the insert 102 to retain the insert in lateral position within interior space 13 of tube 10. An anti-telescoping device (ATD) 108 is illustrated as holding one of the opposite longitudinal ends 121 of the insert 102 in place to prevent longitudinal movement thereof.

Figure 4B:
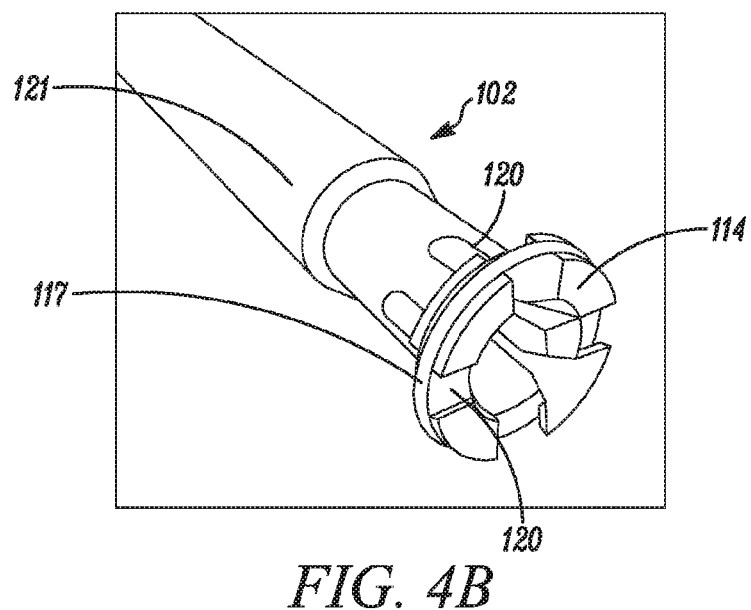
FIG. 4B is a perspective view of an end portion of the tapered unitary insert component of FIG. 4A.

As shown in more detail in FIG. 4B, a plurality of grooves 120 are provided in the surface of the tapered insert 102 at each axial end 114 and 116 thereof that extend below the location where the resilient sealing ring 117 or 118, as applicable, is installed, allowing passage of permeate fluid under the sealing ring and along an outer surface 121 of the tapered unitary insert 102 below the sealing ring. This illustration shows the grooves at the inlet side end 114 of the tapered insert 102, however it will be appreciated that a similar grooved configuration is applied at the opposite axial end of the insert 102 to allow for permeate flow by the region where seal ring 118 is used to retain the axial end 116 in fixed lateral position relative to inner wall 119. As shown in FIG. 4A, the ATD also can include a resilient ring 108A sealing means where fitted within the inlet 107 of the interior space 13 of tube 10. Grooves (not shown) can be provided on the surface portion of the ATD extending into the inlet of the tube 10 similar to that provided on the insert 102 to allow permeate flow into the tube space 13. A similar ATD retention system can be used at the opposite end of the insert 102 to stabilize both opposite ends of the insert 102.

Figure 4C:
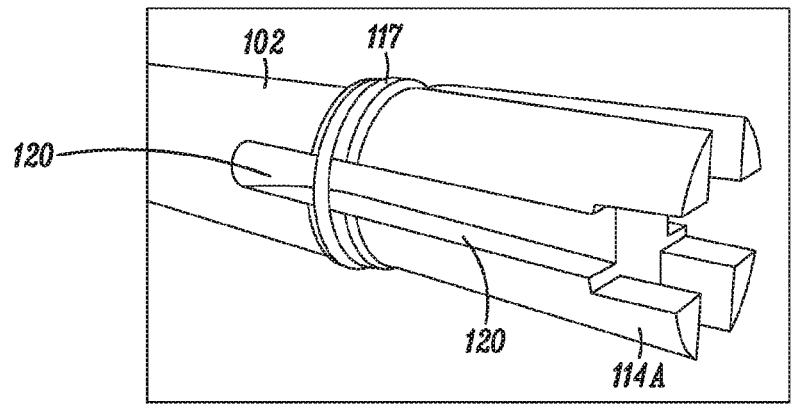
FIG. 4C is a perspective view of an end portion of the tapered unitary insert component of FIG. 4A in accordance with another embodiment of the present teachings.

FIG. 4C illustrates an alternative axial end 114A for the tapered insert 102 which is configured to mechanically interlock with a corresponding portion of the ATD 108 (not shown). To reduce the pressure drop across the ATD the end of the insert was modified. 60 degree cuts were placed in the center of the ends to help distribute flow to the perimeter of the insert.

Figure 4D:
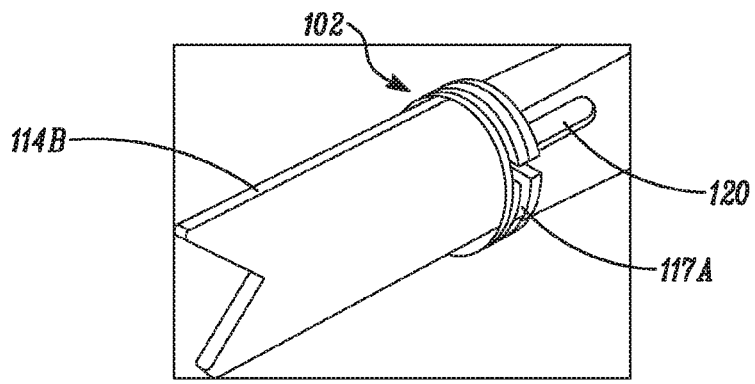
FIG. 4D is a perspective view of an end portion of the tapered unitary insert component of FIG. 4A in accordance with another embodiment of the present invention.

FIG. 4D illustrates an alternative axial end 114B for the tapered insert 102 which is configured to mechanically interlock with a corresponding portion of the ATD (not shown). The opposite axial ends of the insert 102 are removed and grooves 117A are increased under the locations where o-rings 117 are received. To hold the insert 102 in this embodiment, centered thin fins 114B are tacked on the ends thereof.

The tapered insert 102 has a significant effect on the permeate recirculation flow rates, decreasing flow rates to maintain a significant pressure drop, e.g., approximately 2 bar, across the membranes. Compared to a constant diameter insert, the tapered insert 102 has extremely similar results. Increasing the diameter of the insert, i.e., decreasing flow area within the permeate tube, results in a decrease in required flow rate to maintain a significant pressure drop, e.g., approximately 2 bar. Although not desiring to be bound to theory, the negatively tapered shaft or insert is thought to result in a gradual increase in flow area, which creates a higher pressure at the inlet and a lower pressure at the outlet of the permeate collection tube. The tapered insert is designed to accommodate for the added permeate flow down the permeate tube as well as creating the desired significant pressure drop, e.g., approximately 2 bar pressure drop.

Figure 5:
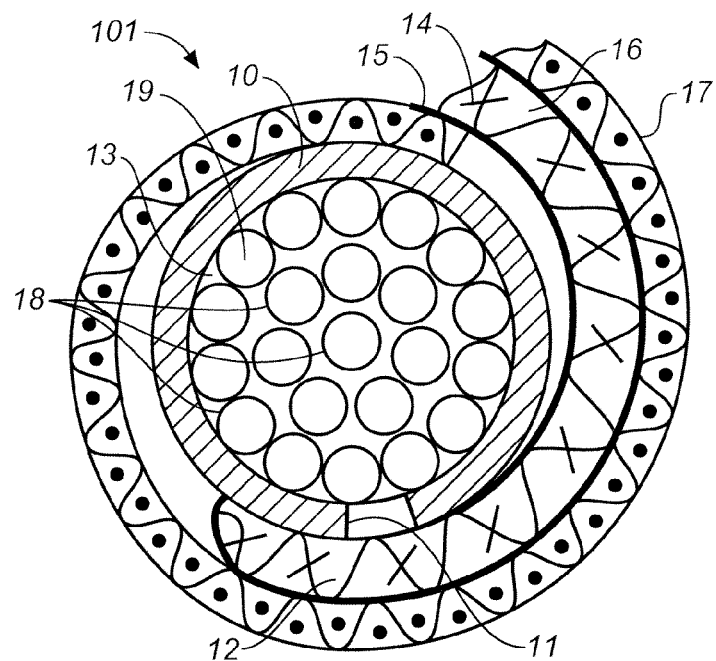
FIG. 5 is a partial cross-sectional view of a spiral membrane for a microfiltration system in which hollows packing spheres are installed in the collection tube as a FRE according to an embodiment of the present teachings.

Referring to FIG. 5, in another embodiment spheres 19 packed within permeate collection tube space 13 into relatively immobilized positions defining interstitial spaces for channeling permeate through the tube. The flow resistance element in the collection tube has the effect of inducing a pressure drop in the permeate space between the inlet and outlet thereof. The FRE dampens fluid back pressure exerted against the permeate side of the membranes during reverse flow phases, allowing positive yet gentle and more uniform backpressure to be applied along the length of the membrane. The spheres can be discrete solid or hollow plastic balls, glass beads, solid ceramic spheres, solid or hollow metal spheres, composite spheres, and the like. The flow resistance elements are not limited to spherical geometric shapes. The flow resistance material should be stable in and inert to the fluid environment. Enough interstitial void space is reserved in packed tube 10 so that forward permeate flow can be maintained.

Figure 6:
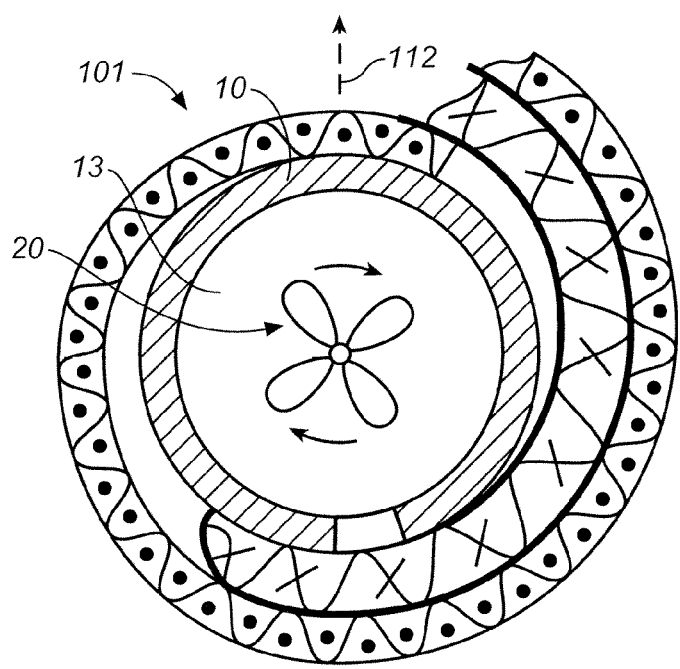
FIG. 6 is a partial cross-sectional view of a spiral membrane for a microfiltration system in which an impeller mixer is installed in the collection tube as a FRE according to an alternative embodiment of the present teachings.

Referring to FIG. 6, the flow resistance element alternatively can be a static mixer 20, for example, a radially extending impeller fixed for rotation on a rotatable rod that is axially inserted within space 13, and which can be mechanically driven in rotation by a motor or other drive means (not shown) located outside the tube 10, to agitate the permeate fluid within the tube 10. One or a plurality of static mixers can be arranged in this manner inside tube 10 to disrupt laminar flow of permeate through tube 10 at a single location or multiple locations at regular or irregular intervals along the length of the tube.

Figure 7:
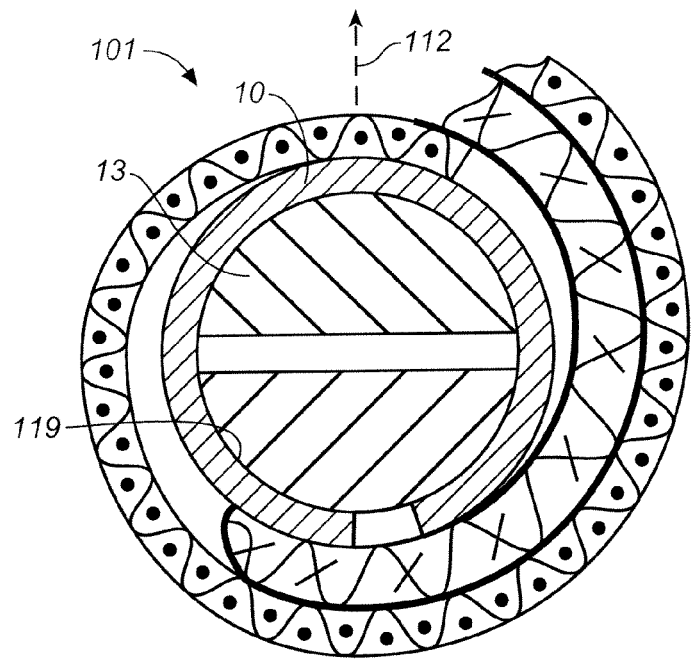
FIG. 7 is a partial cross-sectional view of a spiral membrane for a microfiltration system in which baffles are installed in the collection tube as a FRE according to another alternative embodiment of the present teachings.
Figure 8:
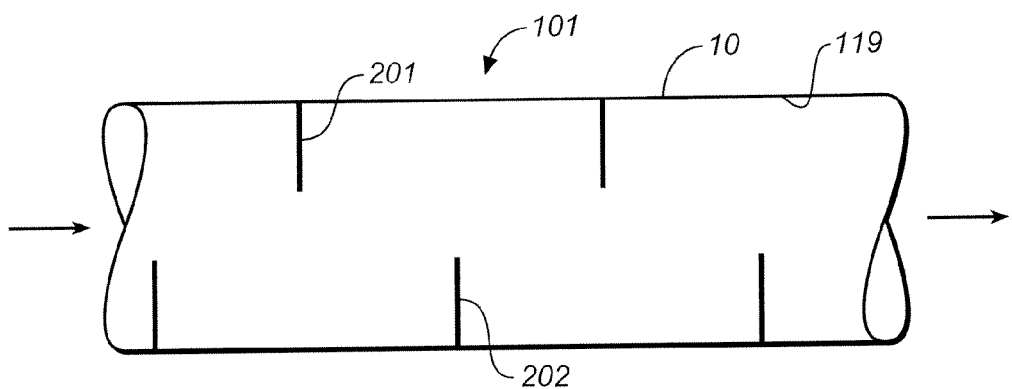
FIG. 8 is a partial cross-sectional view of a spiral membrane according to FIG. 7 along the lengthwise direction thereof according to another alternative embodiment of the present teachings.

Referring to FIGS. 7 and 8, alternatively the flow resistance element can be one or more baffles 201 and 202 that extend radially inwardly from an inner wall 119 of the collection tube 10 into the permeate space 13 defined by the collection tube. As illustrated in FIG. 8, in various embodiments the plurality of baffles 201 and 202, and so forth, can be arranged along the inner wall 119 of the collection tube 10 in a staggered, spaced formation at regular or irregular intervals along the lengthwise direction of the tube 10 to induce non-linear flow, such as a serpentine directional flow, of permeate through the tube 10. The baffles can have other shapes and configurations. The baffles can be formed integrally at the inner wall of the permeate collection tube 10, or, alternatively, they can be retro-fitted into existing collection tube structures. For example, a generally tubular shaped insert bearing baffles on its inner surface can be provided having an outer diameter sized relative to an inner diameter of an existing collection tube to allow the insert to be inserted or telescoped inside the existing collection tube.

The flow resistance elements 18, 20, 201, 202, and so forth, partially impede or obstruct forward movement of permeate through the collection tube 10 and disrupt laminar flow of the permeate through the collection tube, such that a pressure drop can be created within the collection tube along the length of the collection tube between its inlet and outlet. Positive permeate side pressure can build in a controlled manner in the permeate channel 12 during the intermittent defouling phases and while maintaining forward axial flow of both the feed stream and recirculated permeate streams. These effects aid in providing a gentle and uniform positive backpressure on the permeate side of the membrane during reverse flow which can dislodge cake build up on the retentate side of the membrane and allow it too be swept away by the sustained forward flow of the feed stream.

In various embodiments, and referring to FIG. 2, the permeate pump 103 and feed stream pump 109 are controllable such that a substantially uniform transmembrane pressure is maintainable between the retentate and permeate sides of the filter along the entire axial length of the membrane between the inlet and outlet of the module. The filtration system comprises valves for regulating flow of fluid through the system. The filtration system can further comprise a plurality of sensors for acquiring data about fluid as it flows through the system, an electronic data processing network capable of at least receiving, transmitting, processing, and recording data associated with the operation of the pumps, valves, and sensors and wherein the recorded data collected during a flow filtration process is sufficiently comprehensive to allow automated control of the flow filtration process.

Figure 9:
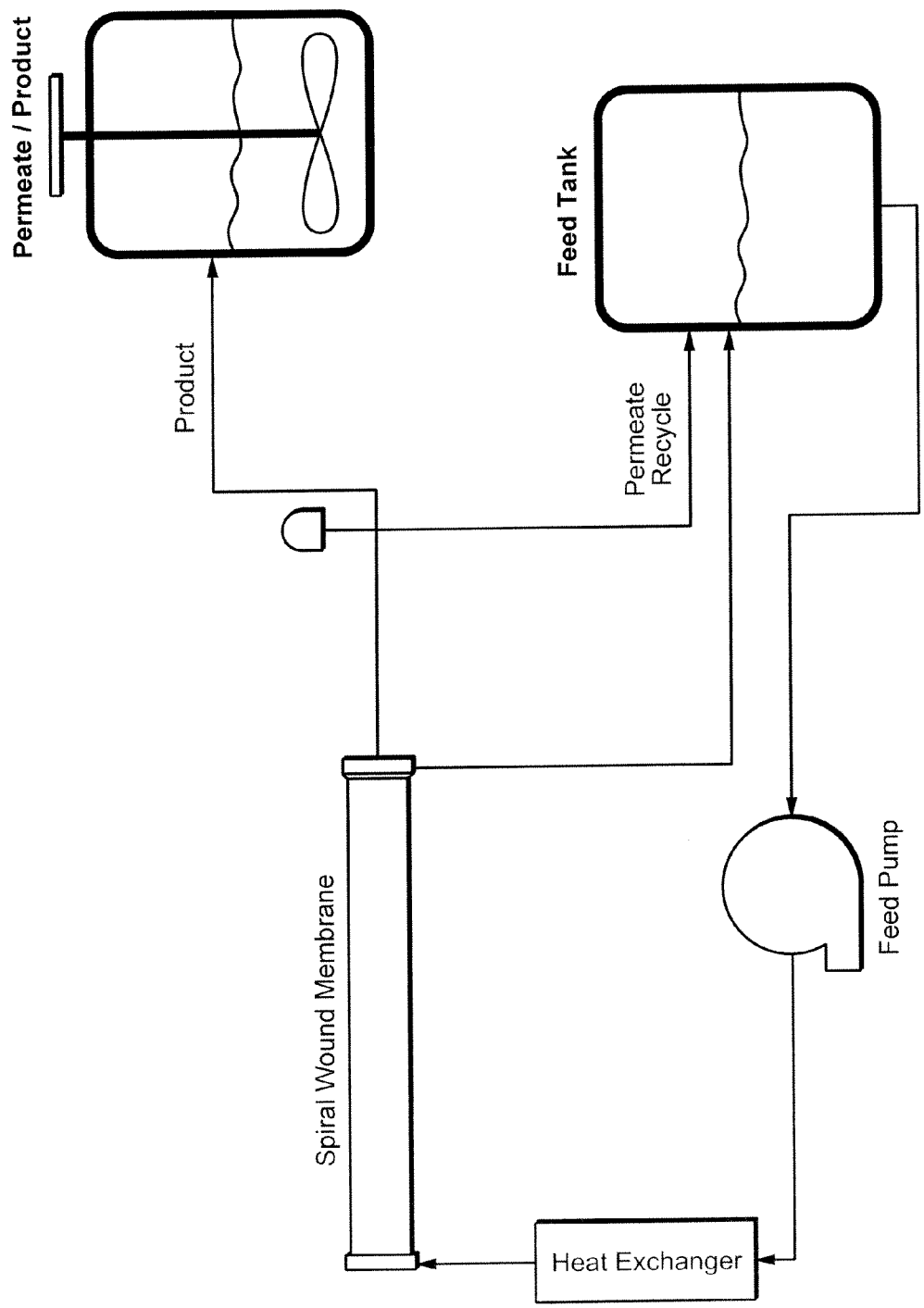
FIG. 9 is a simplified drawing of a comparison microfiltration system with a spiral wound membrane.
Figure 10:
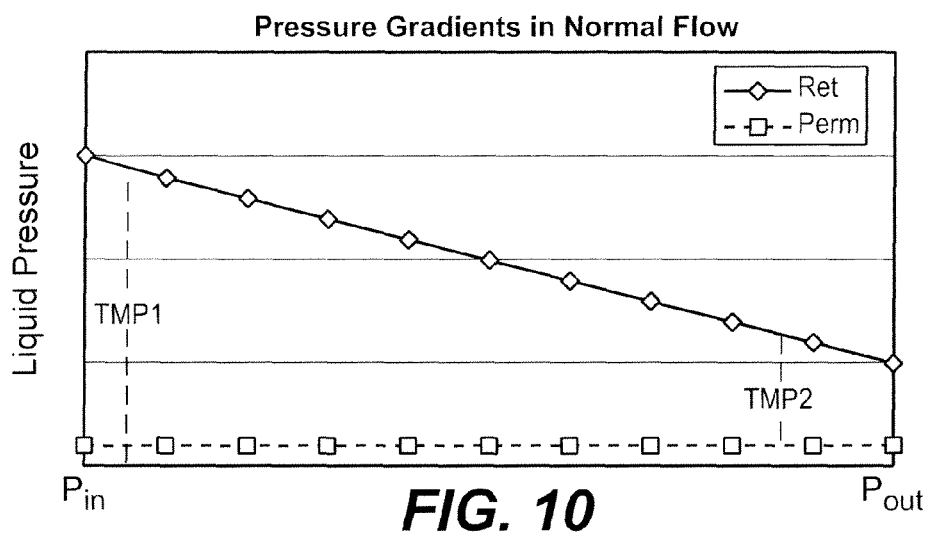
FIG. 10 is a graphical representation of the permeate and retentate side fluid pressures in a separation process implemented on the comparison spiral wound filtration system according to FIG. 9.

FIG. 9 is a simplified drawing of a comparison microfiltration system without co-current permeate recirculation. FIG. 10 is a graphical representation of the fluid pressures in a spiral wound filtration system according to FIG. 9. The feed side has a significant pressure drop though the system because of the resistance to flow it encounters as is passes through the narrow feed channels within the membrane element. Permeate is collected in a hollow central tube with negligible resistance. Along with the fact that permeate flow rates are a fraction of retentate flow rates, there is no measurable ΔP. Also, the permeate typically discharges to atmospheric pressure, so there is no significant fluid pressure on the permeate side of the system. A typical phenomenon of this system is the great difference in TMPs between the inlet (TMP1) and the outlet (TMP2) of the system.

Figure 11:
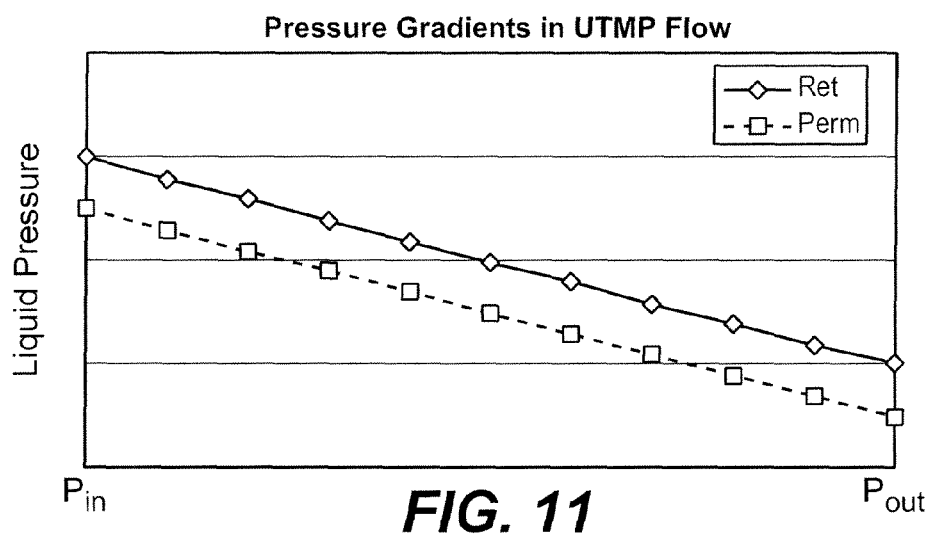
FIG. 11 is graphical representation of permeate and retentate side fluid pressures in UTMP mode implemented on the spiral wound filtration system according to FIG. 2.

FIG. 11 is graphical representation of fluid pressures in UTMP mode as applied to a spiral wound filtration system according to FIG. 2. Because permeate is recirculated through the permeate tube with a flow resistance element (FRE), for example, the tube receives a tapered insert or a packing of plastic spheres, a measurable and controllable fluid pressure is introduced on the permeate side of the membrane system. This allows for an essentially constant TMP across the length of the membrane, independent of cross flow velocity.

Figure 12:
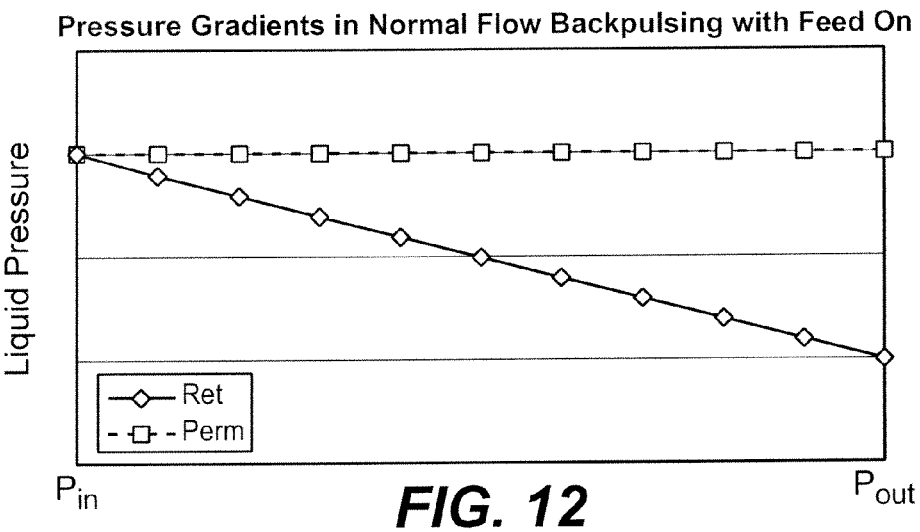
FIG. 12 is a graphical representation of permeate and retentate side fluid pressures when a comparison backwashing operation is employed on the spiral wound filtration system according to FIG. 2.

FIG. 12 is a graphical representation of the fluid pressures when a backwashing operation is employed on a spiral wound filtration system according to FIG. 2 except without including a flow resistance element. The permeate is pumped back into the permeate tube from the outlet side. Because there is no measurable drop in the permeate tube, the permeate pressure will quickly equalize across the length of the membrane system. When the retentate feed is kept on, large variations in the magnitude of backwash pressure occur at various points along the length of the system. In this scenario, the inlet side will not see enough backwash to efficiently remove foulants and the outlet side is subjected to reverse flow pressures that can be extremely detrimental to a spiral wound membrane.

Figure 13:
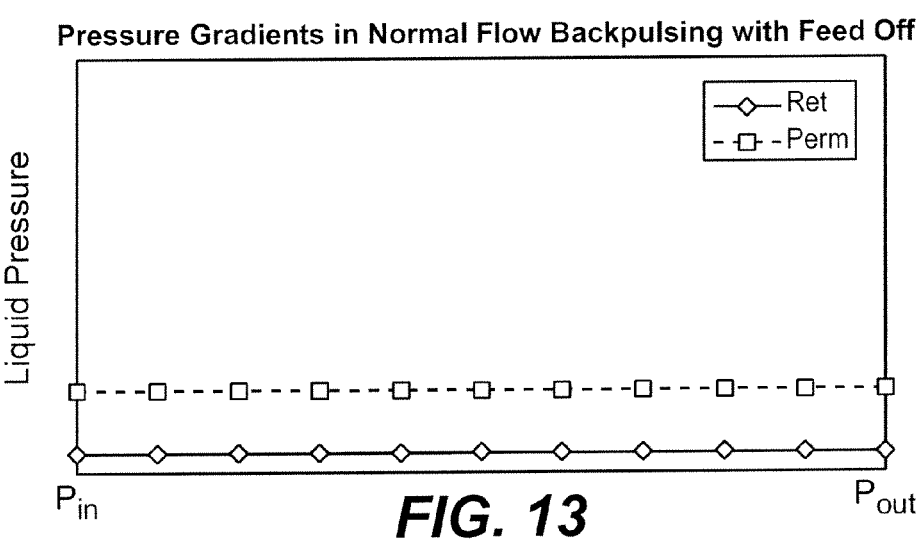
FIG. 13 is a graphical representation of the permeate and retentate side fluid pressures during a comparison backwashing operation when the feed pump is turned off on the spiral wound filtration system according to FIG. 2.

FIG. 13 is a graphical representation of the fluid pressures when a backwashing operation is employed on a spiral wound filtration system according to FIG. 2 when the feed is turned off during backwashing. The advantage of this mode is that a uniform reverse pressure is achieved, so all point of the membrane see essentially the same backwash rate and extreme reverse pressures can be avoided. However, because there is no positive forward feed flow during backwashing, crossflow is absent on the retentate side, so even though foulants might be dislodged from the surface, they will not be efficiently removed from the liquid-membrane interface. So there is a high probability for rapid refouling due to the high concentration of foulants at the interface once positive feed pressure is resumed. Also, it is operationally inefficient because this mode requires that pausing the feed pump and engaging the permeate back-pressure pump or other back-pressure device. Depending on how you operate, you will either have a slow backwash interval, which leads to longer process times, or an abrupt change in pressures, which leads to membrane failure.

While not desiring to be bound by theory, fouling is increased when the driving force pulling particles onto the membrane resulting from the transmembrane pressure (TMP) is greater than the ability for the tangential fluid flow to sweep particles off the surface. Optimal microfiltration flux and passage requires control of TMP within a narrow range. When TMP is too low, fluxes are suboptimal, and at high TMP, rapid and irreversible fouling can occur. Comparison systems illustrated by reference to FIG. 12 can not achieve the correct balance in this respect over substantial axial lengths of the membrane.

Figure 14:
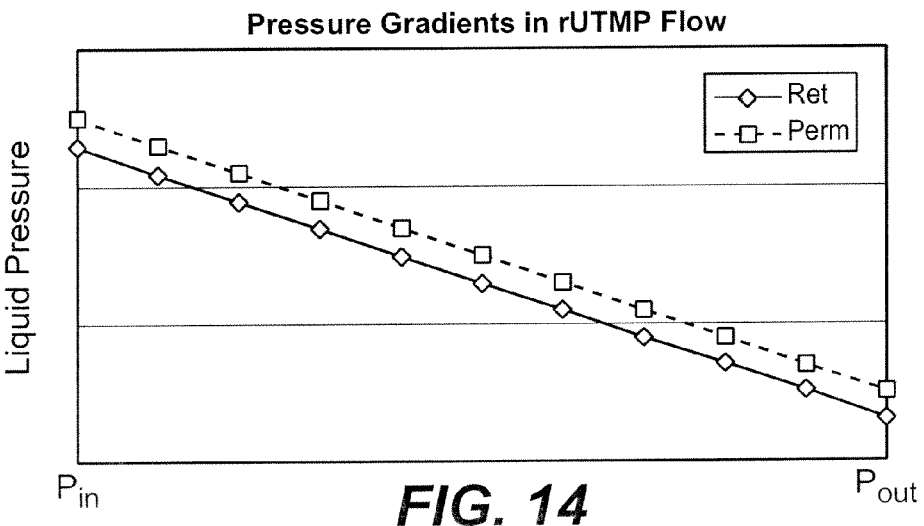
FIG. 14 is a graphical representation of the permeate and retentate side fluid pressures in a reverse UTMP (rUTMP) mode enabled by co-current permeate recirculation on the spiral wound filtration system according to FIG. 2 in an embodiment according to the present teachings.

FIG. 14 is a graphical representation of the fluid pressures in rUTMP mode enabled by CCPR as employed on a spiral wound filtration system according to FIG. 2. The feed pump can be slowed down, or the permeate recirculation pump can be sped up in order to overpressurize the permeate side of the membrane system. In this case, an essentially equivalent backwash flow is achieved throughout the membrane system, with no excessive reverse pressures and a quick, gentle method of achieving the reverse flow. Ample retentate crossflow is maintained to sweep away foulants that are dislodged from the retentate side membrane surface.

The combination of co-current permeate recirculation and inclusion of a flow resistance element within the permeate space of spiral wound membrane modules has been found to allow for independent control of crossflow velocity and transmembrane pressures, thereby enabling Uniform Trans Membrane Pressure operation within the spiral membrane. The combination also allows for backflushing by means of Reverse Uniform Trans Membrane Pressure (rUTMP), which is a operational modality for sustaining surprisingly high and fluxes and passages along the membrane. The rUTMP flow conditions result in backflow across the membrane while axial flow is maintained in both the feed and permeate line. Resulting backpressures and fluxes are gentle and uniform along the length of the membrane, avoiding overpressure or underpressure, resulting in optimal reversal of fouling. This results in significantly higher fluxes and the ability to efficiently process high solids liquids that would be extremely problematic in a typical spiral system. Also, surprisingly it has been found that lower crossflows can give improved results in the terms of flux for certain high solids fermentation broths or other feed materials.

Processes according to various embodiments of the present teachings can achieve a uniform backpressure by either increasing the pump speed of the permeate pump or by decreasing the retentate pump speed.

Another embodiment for operating the process lay-out of FIG. 2 comprises trapping the permeate in a circulation loop, in which a pump is included in the loop, and creating a pressure overlay by connecting a pressure vessel to the loop. This is done by closing the connection of the circulation loop to the spill over for the permeate. By closing the permeate spill over connection, permeate is trapped in the circulation loop and equilibrates in pressure. Then the pressure vessel is opened, which is connected before the pump inlet. The circulation of permeate continues unabated while pressure is increased on the permeate side via a pressurized vessel. This allows uniform TMP along the membrane, even when the pressure on the permeate side exceeds that on the retentate side, the condition which is called rUTMP herewithin. Additional details are provided on these and other useful modes operation of the microfiltration system with reference to FIGS. 15A-15I.

Figure 15A:
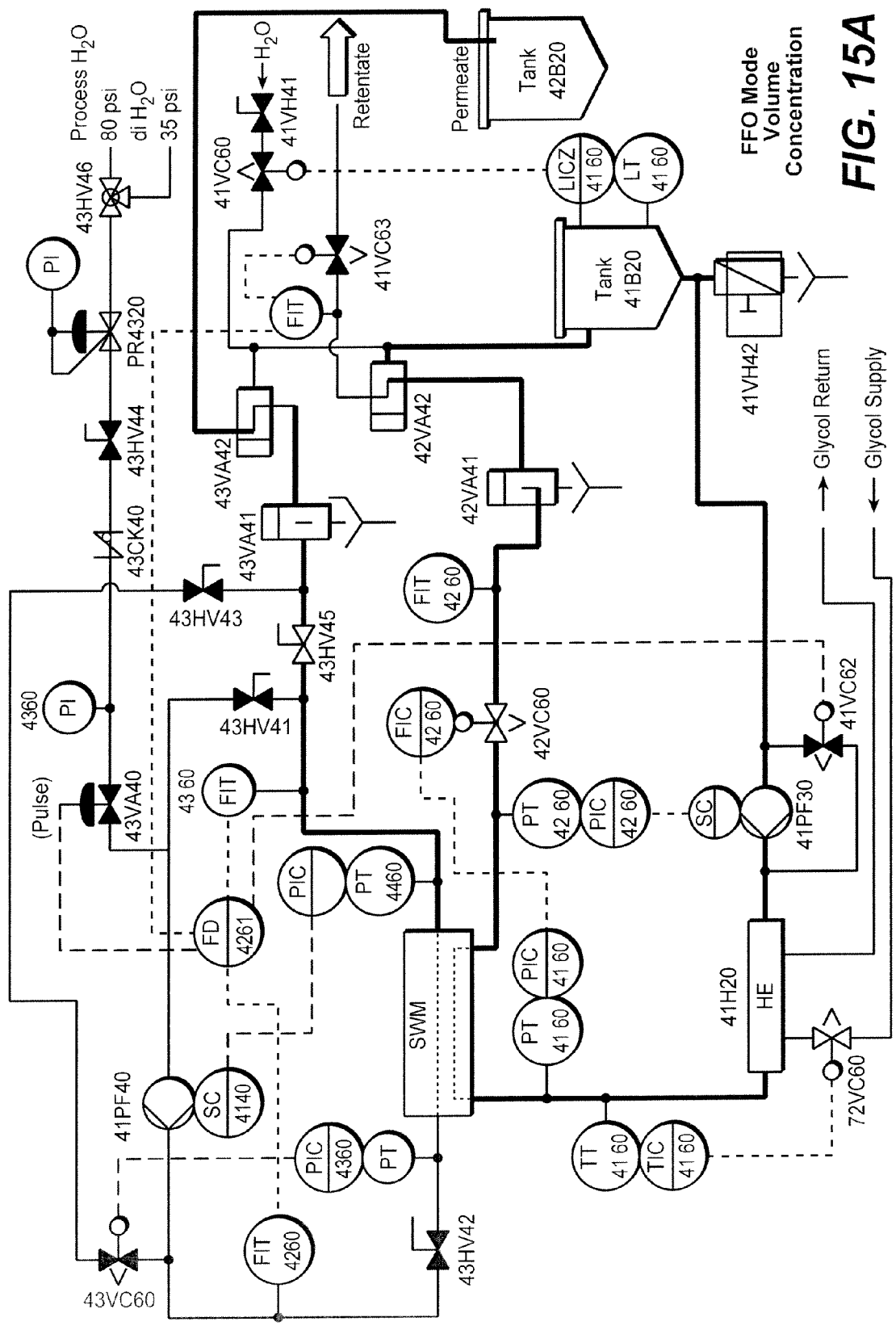

FIGS. 15A-15I show different flow paths of retentate and permeate during operational modes that may be conducted on the microfiltration system of the present teachings. Although any one or more of the modes illustrated in these figures may be included in a processing operation of the present teachings, the modes illustrated in FIGS. 15B-15E are of particular interest in accordance with various embodiments of the present invention. In these figures, active flows are represented by heavier lines, e.g., the feed stream to, and the permeate and retentate streams exiting from, the filtration module SWM as illustrated in FIG. 15B. Also in these figures, darkly-shaded valves, e.g., valve 43HV45 in FIG. 15B, are closed to flow, and lightly-shaded valves, e.g., valve 43VC60 in FIG. 15B, are open to flow.

FIG. 16 is a chart summarizing the basic equipment settings for providing the various operational conditions illustrated in FIGS. 15A-15I. Before the filtration system is powered on, the glycol supply and return line valves to the heat exchanger, diafiltration supply water valves, and compressed air supply valves, to the filtration system are opened as part of start-up operations. Instrumentation is set to the start-up defaults such as indicated in FIG. 16. When the filtration system is powered on, all automated parts (valves, pumps, etc.) are set to a pre-set default setting. In one embodiment, the filtration system may be prepped for process by running in water recirculation mode first. Water recirculation mode is the start point of all other operational modes. All other modes transition from water recirculation. Therefore, for the two main process modes, Feed Flow Only (FFO and Co-current Permeate Flow (CCPR), the default settings are for the recirculation mode. Once the process is ready to run (dilution and mixing, feed at temperature, etc.) the operator changes default settings to appropriate experimental process settings to operate in another mode (batch, diafiltration, or fed-batch).

The filtration system in FIGS. 15A-15I, for example, includes the spiral membrane SWM, permeate pump 41PF40, feed stream pump 41PF30, and other components, for example, valves (43HV41, 43HV45, 43VA40, 43VC60, 43HV42, 42VC60, 41VC62, 72VC60), pressure gauges (PI), pressure-valve controllers (PIC), pressure transmitters (PT), temperature transmitters (TT), temperature-valve controller (TIC), flow meters (FI), flow indication transmitters (FIT), flow-valve controllers (FIC), feed/collection tanks (TANK), heat exchanger (HE), tank level transmitter (LT), feed-valve controller (LICZ), and so forth, for providing an integrated operational separation system. In several of the illustrated configurations, spiral wound filtration membrane module SWM is arranged for providing co-current permeate flow via permeate recirculation loop 1501 (e.g., see FIGS. 15B-15E). In these embodiments, a portion of permeate discharged at the permeate outlet of module SWM (i.e., an outlet end of a permeate collection tube) is returned at a controllable rate into the permeate inlet of the permeate collection tube disposed within filter module SWM. Features of module SWM were illustrated above. A feed stream 1502 is pumped to a feed stream inlet of filter module SWM at a controllable rate. The feed stream is passed through a heat exchanger HE before introduction into the filter module SWM. Retentate exits filter module SWM at an outlet located at the opposite axial end of the SWM module.

More particularly, FIG. 15A illustrates forward feed conditions (FFO Mode) without CCPR conditions being provided. No co-current permeate recirculation is provided in this configuration.

Referring to FIG. 15B, a CCPR flow configuration is illustrated for providing UTMP conditions over a spiral membrane as the normal operating condition of the process according to an embodiment of the present teachings. FIGS. 15G and 15I, which are discussed in more detail below, also show variations on this flow mode.

Figure 15C:
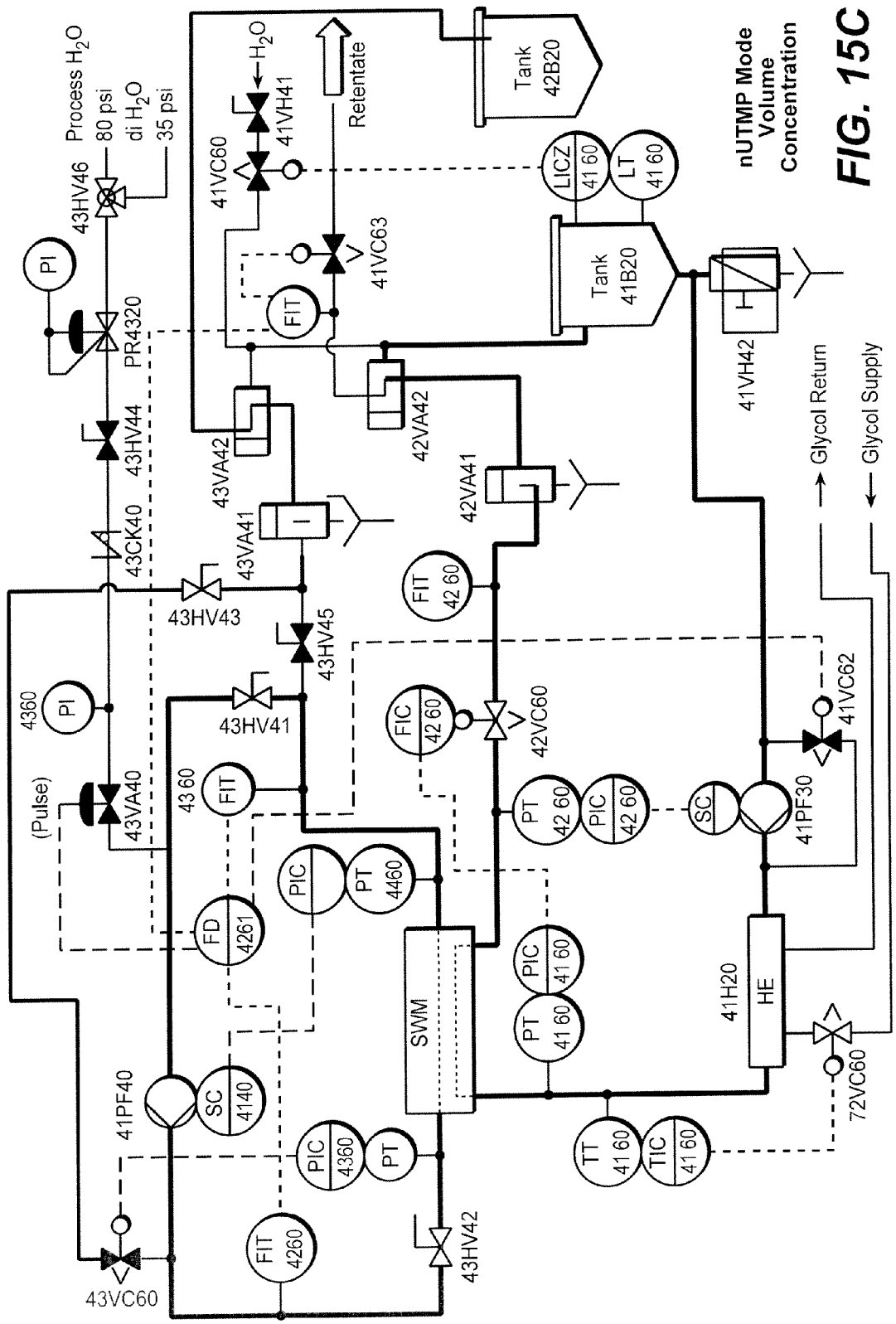

Referring to FIG. 15C, a spiral wound membrane system having the illustrated process lay-out can be used to implement null UTMP (nUTMP) embodiments according to the present teachings. No permeate is collected in this mode of operation. Valve 42VC60, the permeate recirculation pump, and the feed pump, are held at their established settings in order to maintain the feed side pressure set-points and the crossflow rates of both the permeate and the retentate. Valve 43VC60 is closed during this mode of operation. Enough co-current permeate recirculation is provided to equalize with the feed stream such that TMP is substantially zero everywhere axially along the membrane. The nUTMP and rUTMP flow configurations illustrated in FIGS. 15C-15E represent those specific phases only of a nUTMP and/or rUTMP process, and for the remainder of the process time, the process flows are represented by CCPR mode such as illustrated in FIG. 15B.

Referring to FIG. 15D, a spiral wound membrane system having the illustrated process lay-out alternatively can be used to implement reverse UTMP (rUTMP) embodiments according to the present teachings. The first phase of rUTMP according to either FIG. 15D or 15E, is the provision of nUTMP conditions such as illustrated in FIG. 15C. In the second phase, the equipment settings indicated in FIG. 16 are provided to overpressurize the permeate side of the system. In particular, pulse valve 43VA40 may be opened to overpressurize the permeate side until the net flow in FD4261 approaches zero, indicating backwashing conditions have been established over the membrane of the module SWM.

Figure 15E:
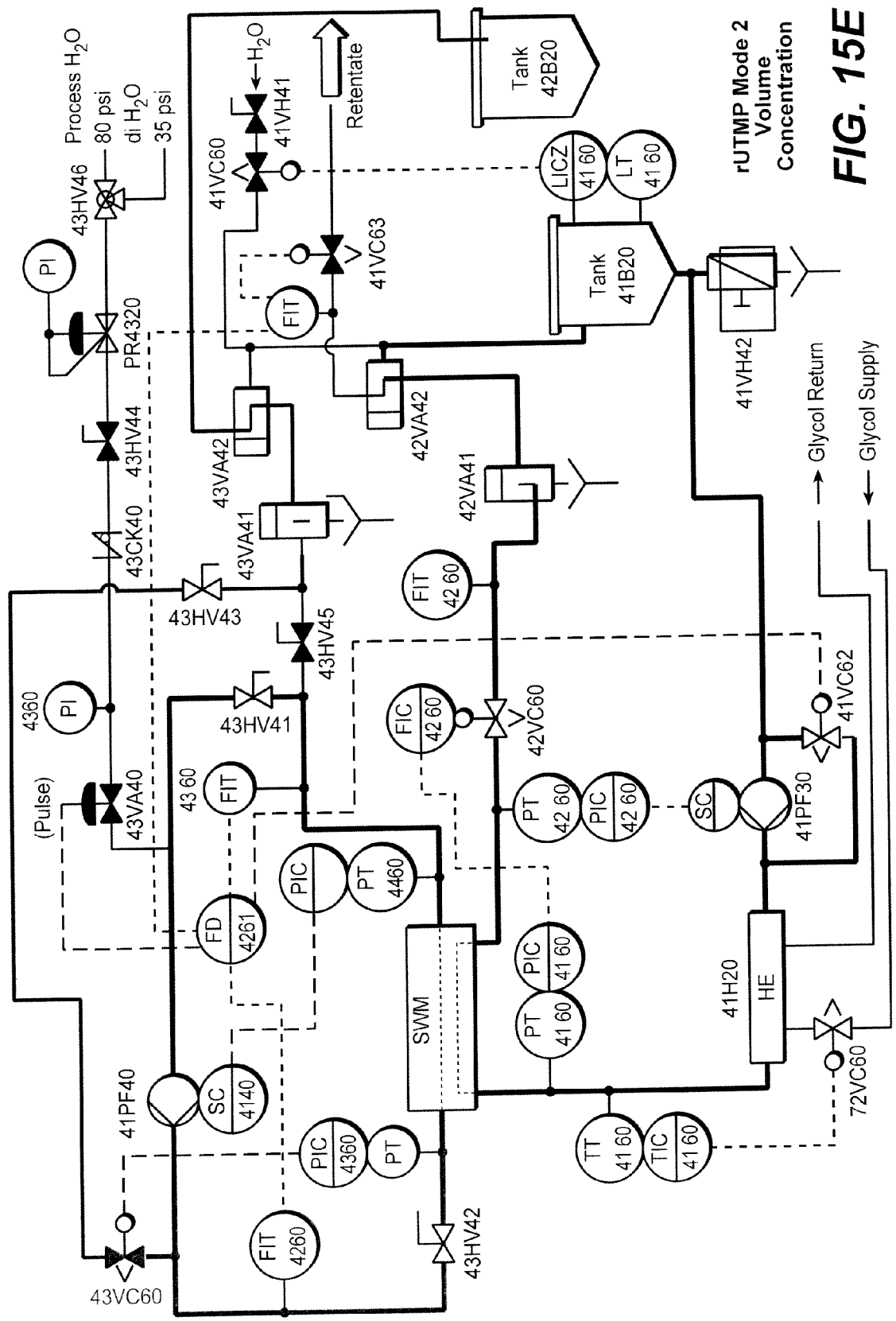

Referring to FIG. 15E, this is an alternative mode for providing rUTMP conditions to that illustrated in FIG. 15D. The first phase of rUTMP according to FIG. 15E also is the provision of nUTMP conditions such as illustrated in FIG. 15C. Then, the feed side of the system is underpressurized using the equipment settings such as indicated in FIG. 16, indicating backwashing conditions have been established over the membrane of the module SWM. In particular, valve 41VC62 may be opened to allow bypass of feed flow from the outlet to the inlet of the feed pump, thereby reducing the feed flow to the membrane.

Exemplary control logic for providing the nUTMP or rUTMP modes of operation in the microfiltration system of FIGS. 15C-E includes the following steps, with the following timer definitions:

T20=lock out time before re-enable automatic control.
T21=nUTMP cycle time.
T22=rUTMP mode1 cycle time.
T23=rUTMP mode2 cycle time.
T24=Time between end of cycle to start of next cycle.
Control logic steps:
1. Start of nUTMP sequence.
2. Lock speed of Feed Pump (41PF30).
3. Lock speed of Permeate Recycle Pump (41PF40).
4. Lock position of Retentate Outlet Control Valve (42VC60).
5. Permeate Loop Control Valve (43VC60) closes.
6. Flow Differential value (FD 4261) drops below 0.05 LPM.
7. If T22=0, go to step 9.
8. If T22=X seconds, start rUTMP1 sub-routine.
 1. Open rUTMP Pulse Valve (43VA40).
 2. Start T22 countdown.
 3. Once T22 has elapsed, close rUTMP Pulse Valve (43VA40).
 4. Go to step 11.
9. If T23=0, go to step 11.
10. If T23=X seconds, start rUTMP2 sub-routine.
 1. Enable Retentate Bypass Valve (41VC62).
 2. Open valve until Flow Differential value (FD 4261) reaches SP value. Note: SP will be a negative net flow.
 3. Once SP is reached, Start T23 countdown.
 4. Once T23 has elapsed, close Retentate Bypass Valve (41VC62).
 5. Go to step 11.
11. Once cycle time has elapsed, re-enable automated control of Permeate Loop Control Valve (43VC60).
12. Start T20 countdown.
13. Once T20 time has elapsed, re-enable automated control of the Feed Pump (41PF30), Permeate Recycle Pump (41PF40) and Retentate Outlet Control Valve (42VC60).
14. End of nUTMP or rUTMP sequence.
15. Start T24 countdown to next cycle.

Figure 15F:
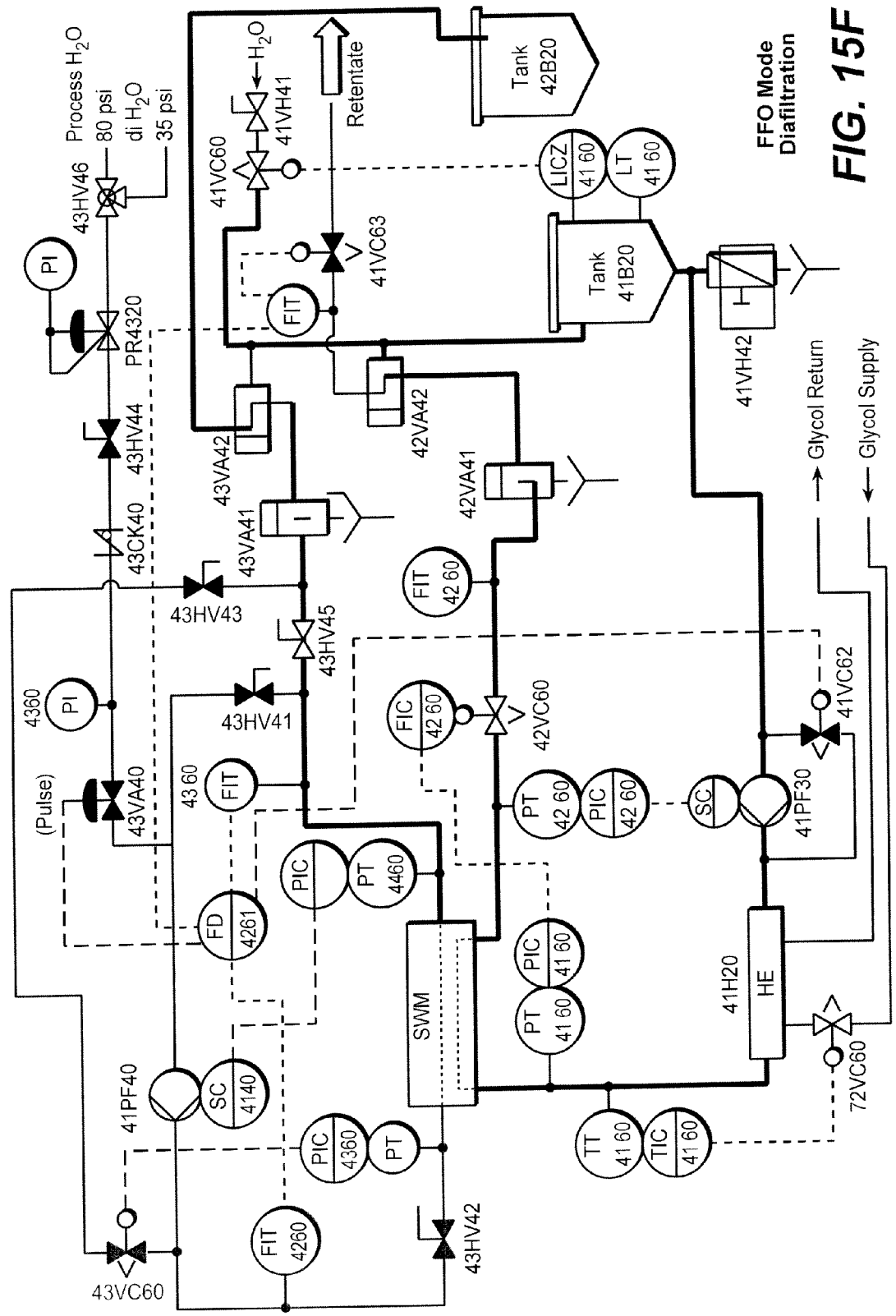

FIG. 15F, like FIG. 15A, illustrates forward feed conditions (FFO Mode) without CCPR conditions being provided. No co-current permeate recirculation is provided in this configuration. Unlike FIG. 15A, valves 41VC60 and 41VH41 are opened to allow introduction of diafiltration water in this illustration.

FIG. 15G, like FIG. 15B, illustrates CCPR conditions being provided. As a variation on FIG. 15B, in FIG. 15G valves 41VC60 and 41VH41 are opened to allow introduction of diafiltration water in this illustration.

Figure 15H:
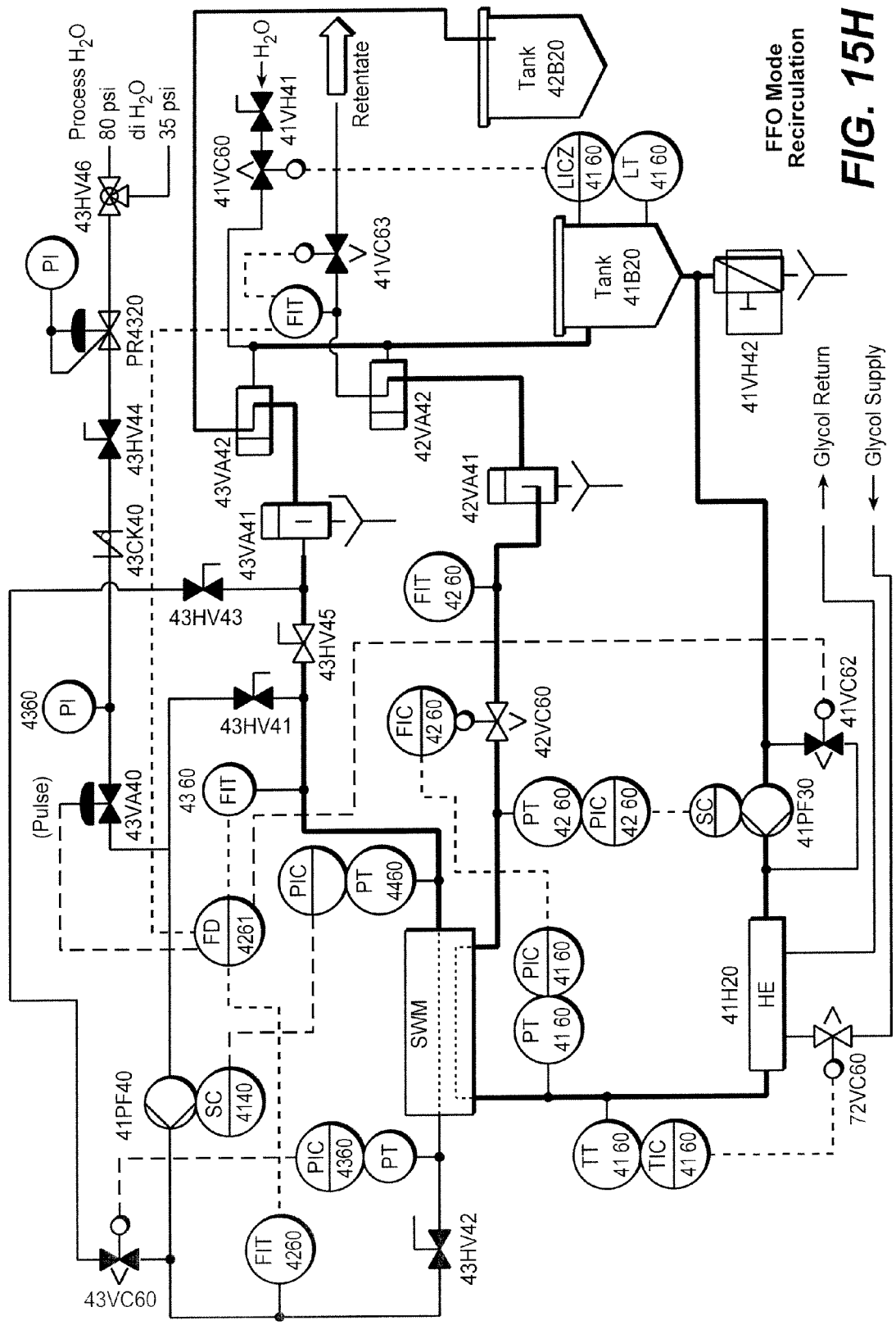
Figure 15I:
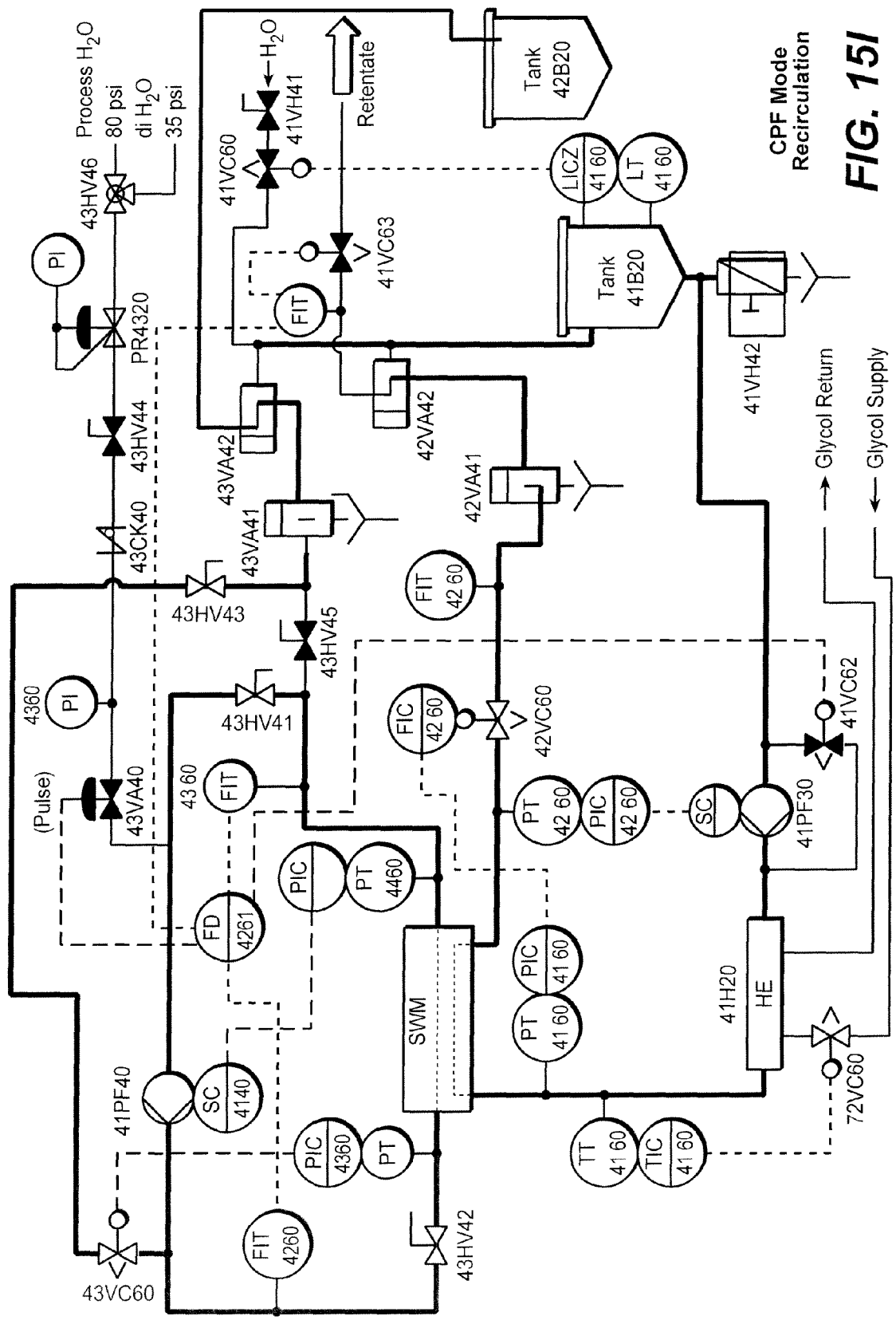

FIG. 15H, like FIG. 15A, illustrates forward feed conditions only, without co-current permeate recirculation (FFO Mode). No co-current permeate recirculation is provided in this configuration. Unlike FIG. 15A, permeate valve 43VA42 is opened to allow diversion of a portion of the permeate to retentate holding tank 41B20 for recycling permeate to the retentate side of the system.

FIG. 15I, like FIG. 15B, illustrates CCPR conditions being provided. As a variation on FIG. 15C, in FIG. 15I permeate valve 43VA42 is opened to allow diversion of a portion of the permeate to retentate holding tank 41B20 for recirculation of permeate also via the retentate side of the system.

According to various embodiments of the present teachings such as illustrated in FIG. 15B, a flux is maintained during CCPR (UTMP) flow mode at about 0.1 to about 200 L/m$^2$/hr, for example, about 10 to about 60 L/m$^2$/hr along the spiral membrane during the separation phases of the filtration cycles.

In various embodiments, defouling phases (reduced or null UTMP and/or rUTMP) of processes according to embodiments of the present teachings are controlled to occur periodically, for example, at approximately 1 minute to 12 minute intervals for approximately 1 to 60 second durations. The type of feed stream being processed can affect selection of these variables. For example, for some feed streams a defouling phase may be applied every few minutes (e.g., some proteases), and for a more dilute stream it may be applied less frequently, including for example approximately every hour or several hours (e.g., brackish water). In various embodiments, during defouling, transmembrane pressure (TMP) varies less than 40%, for example, less than 20%, and, for example, less than 10%, along the entire axial length of the membrane as compared to TMP value at either axial end of the membrane. In various embodiments, the retentate and permeate passages are continuously maintained under positive pressures of about 0.1 to about 60 bar, particularly about 0.1 to about 10 bar, during backwashing cycles. According to various embodiments, the filtration process can be operated at transmembrane pressures that can range from 0.1 bar to about 60 bar, for example, from about 0.1 to about 10 bar, for example, from about 0.1 to about 5 bar, for example, from about 0.1 to about 1.0 bar. The lower limit of the TMP range can be determined by the choice of membrane system. The term "bar" is defined as a unit of pressure corresponding to $10^5$ Pa. Conventional pressures can be considered to be in the range of about 0.1 to about 1.5 bar; however, this range can vary depending on for example, a protein being filtered or a filtration medium being used. High pressures can be considered to begin above about 1.5 to about 2.0 bar. The apparatus and processes described herein can operate at conventional and/or high pressures.

In an optional further embodiment in accordance with the teachings of the present invention, air scouring can be used as a process enhancement. Air scouring can be employed by periodically injecting micronized air bubbles into the permeate recirculation loop before the filtration module inlet. The air bubbles would provide extra force in removing foulants that might accumulate on the retentate side of the membrane. This gives the advantage of more efficient defouling or less reverse permeate flow needed to provide an equivalent level of defouling. A vertically oriented system is preferred for this optional embodiment involving air scouring, in which the liquid flows are directed upwards. This would facilitate purging air from the system.

Examples of various membrane materials that can be used in the membranes of the process or system can comprise polysulfone (PS), polyethersulfone (PES), polyvinylidene difluoride (PVDF), polyarylsulfone, regenerated cellulose, polyamide, polypropylene, polyethylene, polytetrafluoroethylene (PTFE), cellulose acetate, polyacrylonitrile, vinyl copolymer, polyamides, polycarbonate, or blends thereof or the like. The pore sizing of the membrane can vary depending on the membrane material and application. In various embodiments, the membrane can have a filter pore size of from about from about 0.005 micron to about 0.05 microns, from about 0.05 micron to about 0.5 microns, from about 0.5 microns to about 1 microns, from about 1 micron to about 5 microns, from about 5 microns to about 10 microns, or from about 10 microns to about 100 microns. In one exemplary embodiment, the membrane comprises a PVDF, polysulfone or polyether sulfone membrane having a pore size of about 0.005 to about 5 micrometers, and particularly, for example, about 0.005 to about 2 micrometers.

Although the present teachings are illustrated herein as implemented with spiral sheet membranes, where especially surprising and beneficial results are achieved, it will be appreciated that the present teachings include embodiments in other filter formats for example, plate and frame, ceramic tubes, hollow fiber, a stainless steel filter, or other filter configurations.

In various embodiments, a filtration system can be controlled by a controller. The controller can play a role in regulating various parameters of the filtration process, for example TMP, CF, net permeation rate, flux, purity and yield. The system can also comprise valves that assist in system regulation. An appropriate control scheme can be determined based upon the needs for filtering or purifying compounds of interest.

According to various embodiments, the filtration system can comprise a plurality of sensors for acquiring data about a fluid sample as it flows through the fluid process pathway. In various embodiments, the filtration system can comprise an electronic data processing network capable of at least receiving, transmitting, processing, and recording data associated with the operation of said pumps, valves, and sensors and the recorded data collected during a flow filtration process can be sufficiently comprehensive to determine control of the filtration process.

According to various embodiments, sensors can comprise detectors that measure flow rate, pressure, concentration, pH, conductivity, temperature, turbidity, ultraviolet absorbance, fluorescence, refractive index, osmolarity, dried solids, near infrared light, or Fourier transform infrared light. Such detectors can be used for monitoring and controlling the progress and safety of filtration procedures.

According to various embodiments, the system can comprise a microfiltration system that is designed or adapted such that the filtration system is amenable to automation for partial or complete automated self-control during a production run.

It should be understood to those skilled in the art that the optimal operation of the system relies on knowledge of how a particular feed material and product compound behaves under various operational conditions and that this knowledge is normally gathered through pilot- and production-scale studies.

For a given set of process conditions and equipment set-up, the manufacturing system can be pre-sampled to empirically learn how a particular feed and product will respond to various sets of process conditions applied on the system exemplified herein. For example, such empirical studies can be used to develop a predictive model, which embodies mathematical algorithms, of the relationships between sensed parameter values, a desired adjustment to alter the value of one operational parameter, and choice and degree of adjustments to be made at the other operational parameters to maintain them constant during adjustment of the other parameter. To implement such a predictive model, the controller can comprise a programmable logic controller (PLC) having access to computer code, embodied in microelectronic hardware mounted on a motherboard or the like and/or in software loaded on a remote computer (not shown) in communication therewith via the graphical under interface. Commercially available PLC modules can be modified to support these functionalities based on the teachings and guidance provided herein. The controller system can have both hardware components and software, which can be adapted to develop and implement such algorithms for process control as exemplified herein.

According to various embodiments, all of the processes, apparatuses, and systems described herein are applicable to fermentation broths, pharmaceuticals, chemicals, dairy, soy, and other food industries, and so forth. According to various embodiments, all of the processes, apparatuses, and systems described herein are applicable to liquid/solid separations performed on aqueous solutions of proteins, polypeptides and biologically produced polymers and small molecule compounds, which can be in a mixture of viruses or cells (bacterial, fungal, amphibian, reptilian, avian, mammalian, insect, plants or chimeras), cell debris, residual media components, undesired biopolymers produced by the host cells, and contaminants introduced to the system during broth treatment which can occur in preparation for microfiltration. The processes, apparatuses and systems can also be used for the processing of feedstreams that are produced during the recovery of desired molecules, for example, precipitates, solvents of aqueous extracts, and crystal slurries. In various embodiments, a filtration system can comprise a filtration apparatus, however, in some embodiments reference to a filtration system can be used interchangeably with reference to a filtration apparatus or filtration machine.

In various embodiments, the compounds, or components of interest can be a protein, a polypeptide, a nucleic acid, a glycoprotein, another biopolymer, or a small molecule compound. In various embodiments, the compounds can comprise therapeutic proteins, for example, antibodies, enzymatically active protein therapeutics (enzymes), and hormones. They can also comprise, for example, structural proteins, for example, collagen, elastin and related molecules. Hormones can include, but are not limited to, a follicle-stimulating hormone, luteinizing hormone, corticotropin-releasing factor, somatostatin, gonadotropin hormone, vasopressin, oxytocin, erythropoietin, insulin and the like. Therapeutic proteins can include, but are not limited to, growth factor, which is a protein that binds to receptors on the cell surface with the primary result of activating cellular proliferation and/or differentiation, platelet-derived growth factor, epidermal growth factor, nerve growth factor, fibroblast growth factor, insulin-like growth factors, transforming growth factors and the like.

According to various embodiments enzymes can be produced by an industrial scale process. Any enzyme can be used, and a nonlimiting list of enzymes include phytases, xylanases, β-glucanases, phosphatases, proteases, amylases (alpha or beta), glucoamylases, cellulases, phytases, lipases, cutinases, oxidases, transferases, reductases, hemicellulases, mannanases, esterases, isomerases, pectinases, lactases, peroxidases, laccases, other redox enzymes and mixtures thereof.

In some embodiments the enzyme recovered is a hydrolase, which includes, but is not limited to, proteases (bacterial, fungal, acid, neutral or alkaline), amylases (alpha or beta), lipases, cellulases, and mixtures thereof, for example, enzymes sold under the trade names Purafect®, Purastar®, Properase®, Puradax®, Clarase®, Multifect®, Maxacal®, Maxapem®, and Maxamyl® by Genencor Division, Danisco US, Inc. (U.S. Pat. No. 4,760,025 and WO 91/06637); Alcalase®, Savinase®, Primase®, Durazyme®, Duramyl®, Clazinase®, and Termamyl® sold by Novo Industries A/S (Denmark).

Cellulases are enzymes that hydrolyze the β-D-glucosidic linkages in celluloses. Cellulolytic enzymes have been traditionally divided into three major classes: endoglucanases, exoglucanases or cellobiohydrolases and β-glucosidases (J. Knowles et al., TIBTECH (1987) 5:255-261). An example of a cellullase is Multifect® BGL, available from Genencor Division, Danisco US, Inc. Cellulases can be made from species, for example, *Aspergillus, Trichoderma, Penicillium, Humicola, Bacillus, Cellulomonas, Thermomonospore, Clostridium*, and *Hypocrea*. Numerous cellulases have been described in the scientific literature, examples of which include: from *Trichoderma reesei*, S. Shoemaker et al., Bio/Technology (1983) 1:691-696, which discloses CBHI; T. Teeri et al., Gene (1987) 51:43-52, which discloses CBHII; M. Penttila et al., Gene (1986) 45:253-263, which discloses EGI; M. Saloheimo et al., Gene (1988) 63:11-22, which discloses EGII; M. Okada et al., Appl Environ Microbiol (1988) 64:555-563, which discloses EGIII; M. Saloheimo et al., Eur J Biochem (1997) 249:584-591, which discloses EGIV; and A. Saloheimo et al., Molecular Microbiology (1994) 13:219-228, which discloses EGV. Exo-cellobiohydrolases and endoglucanases from species other than *Trichoderma* have also been described, for example, Ooi et al., 1990, which discloses the cDNA sequence coding for endoglucanase Fl-CMC produced by *Aspergillus aculeatus*; T. Kawaguchi et al., 1996, which discloses the cloning and sequencing of the cDNA encoding beta-glucosidase 1 from *Aspergillus aculeatus*; Sakamoto et al., 1995, which discloses the cDNA sequence encoding the endoglucanase CMCase-1 from *Aspergillus kawachii* IFO 4308; and Saarilahti et al., 1990 which discloses an endoglucanase from *Erwinia carotovara*.

Proteases, include, but are not limited to serine, metallo, thiol or acid protease. In some embodiments, the protease will be a serine protease (for example, subtilisin). Serine proteases are well known in the art and reference is made to Markland et al., Honne-Seyler's Z Physiol. Chem (1983) 364:1537-1540; J. Drenth et al. Eur J Biochem (1972) 26:177-181; U.S. Pat. No. 4,760,025 (RE 34,606), U.S. Pat. No. 5,182,204 and U.S. Pat. No. 6,312,936 and EP 0 323,299. Means for measuring proteolytic activity are disclosed in K. M. Kalisz, "Microbial Proteinases" Advances in Biochemical Engineering and Biotechnology, A. Fiecht Ed. 1988.

Xylanases include, but are not limited to, xylanases from *Trichoderma reesei* and a variant xylanase from *T reesei*, both available from Danisco A/S, Denmark and/or Genencor Division, Danisco US Inc., Palo Alto, Calif. as well as other xylanases from *Aspergillus niger, Aspergillus kawachii, Aspergillus tubigensis, Bacillus circulans, Bacillus pumilus, Bacillus subtilis, Neocallimastix patriciarum, Streptomyces lividans, Streptomyces thermoviolaceus, Thermomonospora fusca, Trichoderma harzianum, Trichoderma reesei, Trichoderma viride*.

Examples of phytases are Finase L®, a phytase from *Aspergillus* sp., available from AB Enzymes, Darmstadt, Germany; Phyzyme™ XP, a phytase from *E. coli*, available from Danisco, Copenhagen, Denmark, and other phytases from, for example, the following species: *Trichoderma, Penicillium, Fusarium, Buttiauxella, Citrobacter, Enterobacter, Penicillium, Humicola, Bacillus*, and *Peniophora*.

Amylases can be, for example, from species, for example, *Aspergillus, Trichoderma, Penicillium, Bacillus*, for instance, *B. subtilis, B. stearothermophilus, B. lentus, B. licheniformis, B. coagulans*, and *B. amyloliquefaciens*. Suitable fungal amylases are derived from *Aspergillus*, for example, *A. oryzae* and *A. niger*. Proteases can be from *Bacillus amyloliquefaciens, Bacillus lentus, Bacillus subtilis, Bacillus licheniformis*, and *Aspergillus* and *Trichoderma* species.

The above enzyme lists are examples only and are not meant to be exclusive. For example, other enzyme-producing host organisms can include *Mucor* sp, *Kluyveromyces* sp, *Yarrowia* sp, *Acremonium* sp, *Neurospora* sp, *Myceliophthora* sp, and *Thielavia* sp. Any enzyme can be used in embodiments according to the present teachings, including wild type, recombinant and variant enzymes of bacterial, fungal, plant and animal sources, and acid, neutral or alkaline pH-active enzymes.

According to various embodiments, this process can also be used for the purification of biologically produced polymers, for example, polylactic acid, polyhydroxybutiric acid and similar compounds. In no way, however, is the method or apparatus intended to be limited to preparation or processing of the above polymers.

According to various embodiments, this process can also be used for the purification of biologically produced small molecule compounds, for example, vitamins (for example, ascorbic acid), ethanol, propanediol, amino acids, organic dyes (for example, indigo dye), nutraceuticals (for example, betaine and carnitine), flavors (for example, butyl butyrate), fragrances (for example, terpenes), organic acids (for example, oxalic, citric, and succinic acids), antibiotics (for example, erythromycin), pharmaceuticals (for example, statins and taxanes), antioxidants (for example, carotenoids), sterols, and fatty acids. In no way, however, is the method or apparatus intended to be limited to preparation or processing of the above small molecule compounds.

The desired purity of the component or compound of interest in the permeate, retentate or cell paste can be, for example, from about 1% to about 100%. In various embodiments, the purity of the component of interest can be from about 1% to about 25% pure, for example, about 25% to about 50% pure, for example, from about 50% to about 75% pure, for example, from about 75% to about 90% pure, for example, from about 90% to about 95% pure, for example, from about 95% to about 97% pure, or from about 97% to about 99% pure.

According to various embodiments, the feed liquid for the process can be obtained from a production organism or production cells. The production organism can be a virus, bacteria or fungus. Production cells can comprise prokaryotic or eukaryotic cells. In various embodiments, the production cells can comprise bacterial cells, insect cells, mammalian cells, fungal cells, plant cells, or a cell line from the previously referred to cells. Cell lines can comprise cells from mammals, birds, amphibians or insects. The cells can be transformed or transfected with DNA or other nucleic acids of interest, such that the cells express a biopolymer of interest. Methods of cell transformation and/or transfection are well-known in the art and can be found for example in U.S. Pat. No. 7,005,291, which is incorporated herein in its entirety by reference.

In various embodiments, the feed liquid can be obtained from non-transformed or non-transfected cells or from other sources, for example, animal or plant tissue, such that the feed liquid obtained from the source can be flowed through a multistage-filtration apparatus. In various other embodiments feed liquid can be obtained from transgenic cell or organisms, for example, transgenic mammals. Results of the process can be independent from the starting or raw material entering the process as feed liquid. The process can be applied to broths obtained from the extraction of plant or animal matter and process intermediate, or final forms of products that can comprise crystal slurries, precipitates, permeates, retentates, cell paste or extracts. In various embodiments, the feed stream to be separated can comprise, for example, at least 25%, for example, at least 15%, and, for example, at least 5%, dispersed solids content.

According to various embodiments, a bacterial production organism can be from any bacterial species, for example, *Bacillus, Streptomyces* or *Pseudomonas* species, for instance from *Bacillus subtilis, Bacillus clausii, Bacillus lichenifor-* mis, *Bacillus alkalophilus, Escherichia coli, Pantoea citrea, Streptomyces lividans, Streptomyces rubiginosus* or *Pseudomonas alcaligenes.*

According to various embodiments, the filtration system can comprise a heat exchanger in fluid communication with feed and permeate streams to cool enzymatic species below activation temperatures to the extent such activation temperatures are lower than ambient temperatures in the process area. In this manner, autolysis of the enzymes can prevented or inhibited during processing. For example, a feed stream comprising a serum protease can be processed with process temperatures maintained in a temperature range of from about 15° C. or less. Heat exchangers can be placed along the feed stream line upstream of the membrane module and permeate line downstream of the module for this purpose.

In commercial practice, it is often of great value to arrange a set of membrane elements serially in a single housing. For example, there may be several (e.g., 4, 6, or more) membrane elements arranged end to end in a single housing. This provides savings vs. single element housings by reducing the amount of fittings required, overall footprint, piping, control valves and instrumentation. This creates a problem however for low-pressure filtration (microfiltration and ultrafiltration). Because the pressure drop through each element is usually significant compared to the transmembrane pressure of the upstream element, 10% or more, the transmembrane pressure can be significantly reduced in downstream elements. This commonly leads to systems that run above TMP optima at the upstream elements and also restricts how much crossflow can be used due to the resulting rise in TMP. This is most serious in microfiltration where lower TMPs and high crossflows are often preferred for minimization of fouling. It is also of serious consequence in cleaning, where permeation through the upstream elements might become so high as the membrane becomes clean and recovers its clean water flux, that it essentially starves downstream elements of cleaning feed, thus preventing exposure to the cleaning solution crossflows necessary for efficient cleaning. The result would be incomplete cleaning or longer cleaning cycle times.

Recirculating the permeate to control transmembrane pressure addresses these issues. Because the TMP and crossflow can be controlled independently, crossflow velocity of the feed can be raised or lowered without negatively impacting the TMP. This has advantage in a single element, but this advantage is accentuated in a series of elements. The longer the path length of the feed, the larger the discrepancy between high and low TMPs at either end of the filtration system. Also, for cleaning or other processes where the permeation through the upstream element is high enough to impact feed crossflow in downstream elements, the UTMP for the system can be lowered to reduce the permeation rate, thereby insuring adequate crossflow for all elements.

Also, certain FRE designs can be manipulated for use in a serial system. Because the permeate collection tubes of a set of membranes in series are all inter-connected, the permeate flow increases as flow progresses from inlet to outlet of a filtration system. Depending on the permeate recirculation rate and the permeation contribution from filtration, it is conceivable that the total permeate flow at the outlet could be far in excess of the total permeate flow (recirculation rate alone) at the inlet. In this case, pressure drop per unit length will vary throughout the system as pressure drop is a function of flow velocity squared. To maintain a more linear pressure drop throughout a long filtration system, an FRE that provides less resistance as flow proceeds down the permeate collection tube is required. Any FRE can be adjusted to provide more or less resistance, e.g., ball bearings can be increased in size to reduce flow resistance. The tubular tapered insert has the dual advantage of not only being readily engineered to provide a predicted pressure drop within a predicted flow range within an element, but can also have adjusted tapered diameters to account for increasing flow rates of several elements in series. For example, the permeate flow area of a downstream element could be increased by decreasing the diameter of the permeate tube insert, thereby reducing the resistance to flow in order to account for the flow rate increase due to permeation through the filter.

EXAMPLES

The following examples merely represent various embodiments of the present teachings. The examples are not intended to limit the present teachings in any way whatsoever.

Figure 17:
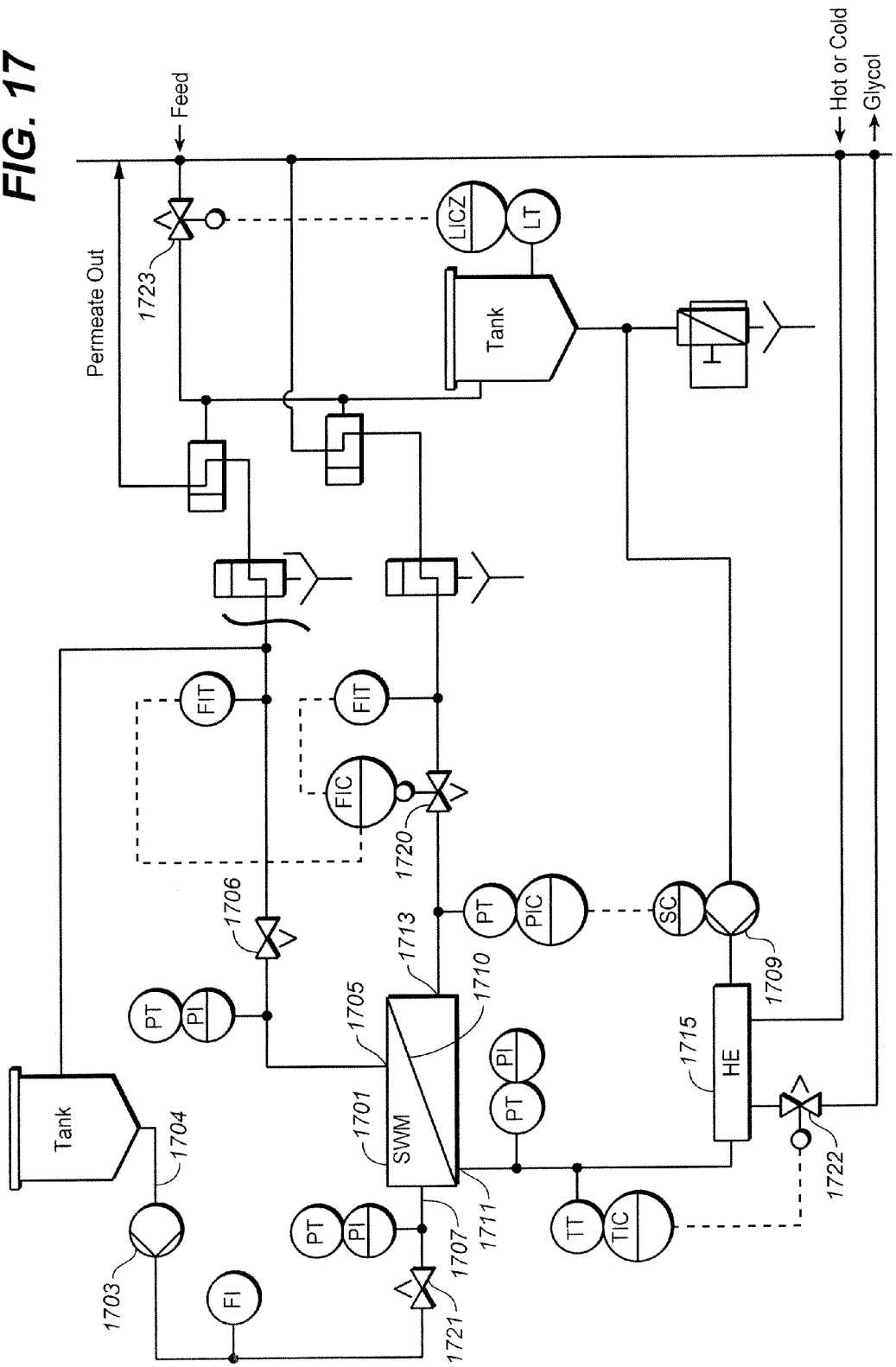
FIG. 17 is a simplified drawing of a microfiltration system with a spiral membrane used for conducting experimental studies described in the examples provided herein.

In Examples 1-3, experiments were conducted to determine the flux and passage of different *Bacillus* broths in a spiral system having the process lay-out illustrated in FIG. 17, which is similar to the layouts described in connection with FIGS. 15B-15E with several modifications. Different vendor supplied membrane elements and different fermentation broths were trialed in this filtration system. Referring to FIG. 17, a spiral wound membrane system having the illustrated process lay-out was used to implement CCPR and intermittent reverse UTMP (rUTMP) flow modes according to the present teachings. The filtration system illustrated in FIG. 17 includes a spiral membrane 1701 (SWM), permeate pump 1703, feed stream pump 1709, and other components, for example, valves (1706, 1720-1723), pressure gauges (PI), pressure transmitters (PT), valve controller, temperature transmitters (TT), flow meters (FI), flow indication transmitters (FIT), flow-valve controllers (FIC), feed/collection tanks (TANK), heat exchanger 1715 (HE), temperature-valve controller (TIC), tank level transmitter (LT), feed-valve controller (LICZ), and so forth, for providing an integrated operational separation system. Spiral wound filtration membrane module 1701 is arranged for providing co-current permeate flow via permeate recirculation loop 1704 including restriction valve 1706 and permeate pump 1703. Permeate pump 1703 is controllable to return a portion of permeate discharged at permeate outlet 1705 of the module 1701 (i.e., an outlet end of a permeate collection tube) at a controllable rate into a permeate inlet 1707 of the permeate collection tube disposed within filter module 1701. Features of module 1701 are illustrated in more detail below. Feed stream pump 1709 is provided for feeding a feed stream to be separated to a feed stream inlet 1711 of filter module 1701 at a controllable rate. The feed stream is passed through a heat exchanger 1715 before introduction into the filter module 1701. Retentate exits filter module 1701 at outlet 1713 located at the opposite axial end of the module. The permeate pump 1703, feed stream pump 1709, and control valves are mutually controlled in manners described herein to provide UTMP and rUTMP modes of operation.

Example 1

In Runs 1-4, VCF experiments were conducted on a fermentation broth using Alfa Laval 0.2 μm nominal pore size polysulfone (PS) membranes. The host organism and enzyme in the feed broth is a *B. subtilis* broth and protease enzyme, obtained as FNA broth from Genencor Division, Danisco US, Inc. The operating temperature was 15° C., the broth pH was 5.8, and 3 mm diameter solid plastic balls were used as a flow resistance element (FRE). The FRE were packed into the collection tube of the spiral wound membrane until they filled the tube between its axial ends and held into place with perforated disc plates at each end of the tube. UTMP and UTMP/rUTMP modes of filtration operation were evaluated. Two different ways to over-pressurize permeate were initially evaluated, which were slowing the feed pump or speeding up the permeate recirculation pump.

Runs 1-4 were conducted under the following conditions. Run 1 was a control run in which no UTMP was applied. The average TMP was 1.5 bar and feed flow was 9.9 m³/hr. In Run 2, UTMP mode only was applied without rUTMP. FRE was included in the permeate collection tube but no defouling phase was applied. UTMP was 1 bar and feed flow was 11.8 m³/hr. In Run 3, a UTMP/rUTMP mode was conducted with UTMP at 1 bar and feed flow at 12 m³/hr. rUTMP was done for 1 minute every 10 minutes by reducing the feed pump speed. The pump speed was reduced until a net negative permeate flow was observed. This indicated reverse flow through the membrane. In Run 4, UTMP/rUTMP mode was conducted with UTMP at 1 bar and feed flow at 12 m³/hr. rUTMP was done for 1 minute every 10 minutes by increasing the permeate pump speed. The pump speed was increased until a net negative permeate flow was observed. This indicated reverse flow through the membrane.

Figure 18:
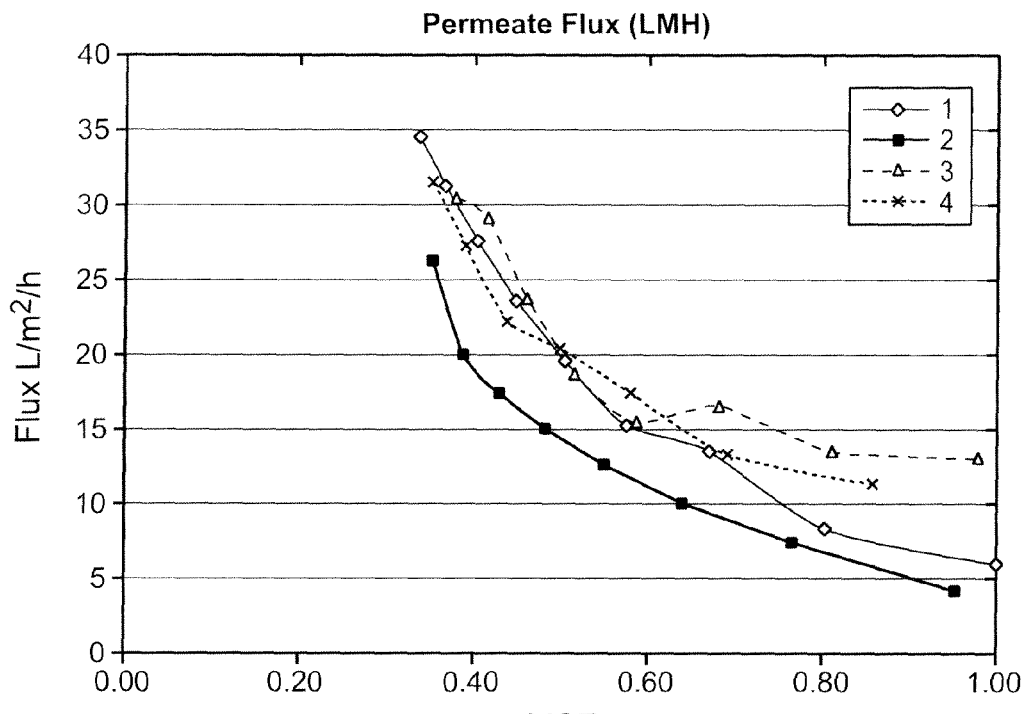
FIG. 18 illustrates data obtained from an experiment investigating filtration parameters including permeate flux and VCF, wherein the host organism and enzyme in the feed broth is a *Bacillus subtilis* broth and protease enzyme. "LMH" represents units of $L/m^2/h$.
Figure 19:
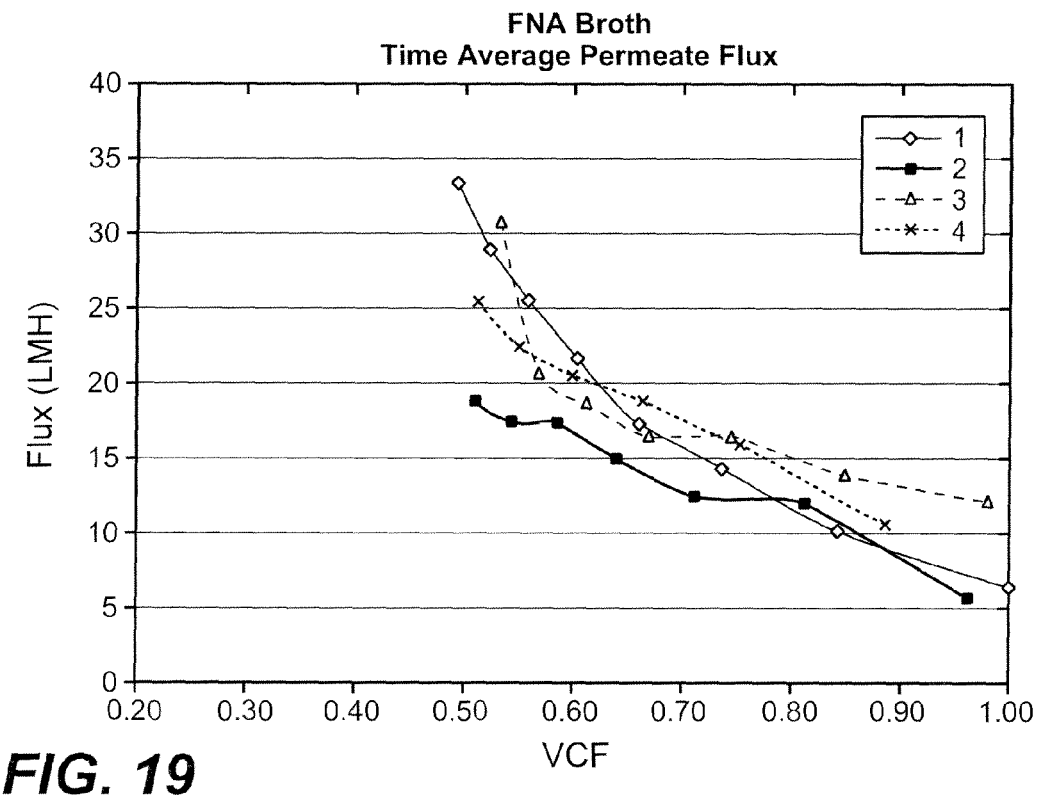
FIG. 19 illustrates data obtained from the experiment mentioned above relative to FIG. 18 investigating filtration parameters including time average permeate flux and VCF, wherein the host organism and enzyme in the feed broth is a *Bacillus subtilis* broth and protease enzyme.
Figure 20:
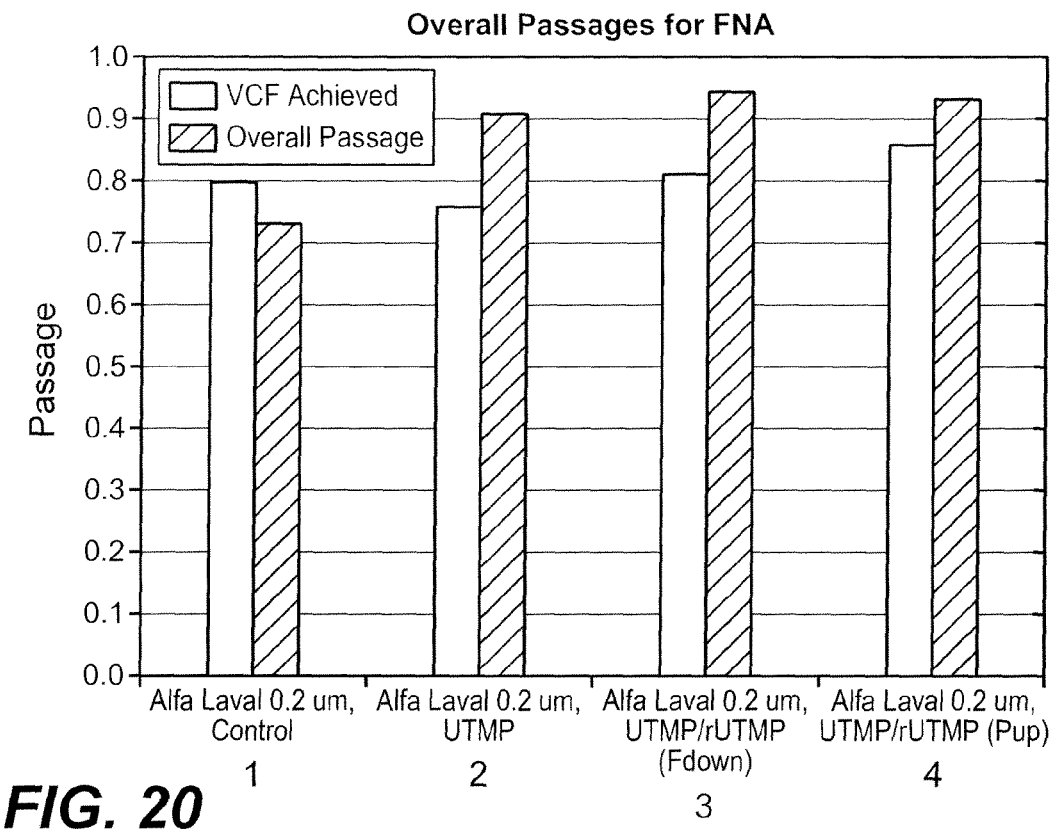
FIG. 20 illustrates data obtained from the experiment mentioned above relative to FIG. 18 investigating filtration parameters including cumulative passage and VCF, wherein the host organism and enzyme in the feed broth is a *Bacillus subtilis* broth and protease enzyme.

The results of Runs 1-4 are indicated in Tables 1-4. Results for flux at different VCF results are plotted in FIGS. 18 and 19, and passage results are plotted in FIG. 15. Among other findings, the results in FIGS. 18 and 19 show that adding UTMP resulted in slower flux unless combined with rUTMP. The least flux decay was observed in Run 3 in which UTMP/rUTMP mode was conducted involving adjustment of feed pump speed. FIG. 20 indicates all runs using UTMP had significant improvements in overall passage.

TABLE 1

Run 1

Alfa Laval 0.2 um, Control

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 0 | 0.00 | 0.34 | | 34.65 | | |
| 10 | 0.11 | 0.37 | | 31.27 | 33.57 | 118% |
| 20 | 0.23 | 0.40 | | 27.64 | 29.09 | 88% |
| 30 | 0.38 | 0.45 | | 23.64 | 25.67 | 76% |
| 40 | 0.54 | 0.50 | | 19.64 | 21.82 | 72% |
| 50 | 0.75 | 0.58 | | 15.27 | 17.45 | 70% |
| 60 | 1.00 | 0.67 | | 13.53 | 14.55 | 82% |
| 70 | 1.35 | 0.80 | | 8.29 | 10.39 | 73% |
| 80 | 1.92 | 1.00 | | 5.89 | 6.42 | 70% |

TABLE 2

Run 2

Alfa Laval 0.2 um, UTMP

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.10 | 0.35 | 6.54 | 26.40 | | 77% |
| 20 | 0.29 | 0.39 | 6.47 | 20.07 | 18.97 | 98% |
| 30 | 0.50 | 0.43 | 6.8 | 17.45 | 17.45 | 90% |
| 40 | 0.71 | 0.48 | 7.23 | 15.05 | 17.45 | 94% |
| 50 | 0.95 | 0.55 | 7.75 | 12.65 | 15.05 | 89% |
| 60 | 1.24 | 0.64 | 8.33 | 10.04 | 12.59 | 90% |

TABLE 2-continued

Run 2

Alfa Laval 0.2 um, UTMP

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 70 | 1.54 | 0.76 | 8.97 | 7.42 | 12.09 | 92% |
| 80 | 2.17 | 0.95 | 10.2 | 4.15 | 5.80 | 88% |

TABLE 3

Run 3

Alfa Laval 0.2 um, UTMP/rUTMP (Fdown)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.10 | 0.38 | 6.57 | 30.55 | | 56% |
| 20 | 0.22 | 0.42 | 6.88 | 29.24 | 30.95 | 100% |
| 30 | 0.39 | 0.46 | 7.16 | 23.78 | 20.88 | 112% |
| 40 | 0.59 | 0.52 | 7.71 | 18.76 | 18.70 | 94% |
| 50 | 0.80 | 0.59 | 7.79 | 15.49 | 16.63 | 100% |
| 60 | 1.03 | 0.68 | 8.55 | 16.58 | 16.51 | 95% |
| 70 | 1.28 | 0.81 | 9.15 | 13.53 | 14.08 | 99% |
| 79 | 1.55 | 0.98 | 9.5 | 13.09 | 12.27 | 94% |

TABLE 4

Run 4

Alfa Laval 0.2 um, UTMP/rUTMP (Pup)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.06 | 0.35 | 5.98 | 31.64 | | 96% |
| 20 | 0.20 | 0.39 | 6.17 | 27.27 | 25.57 | 73% |
| 30 | 0.36 | 0.44 | 6.53 | 22.25 | 22.65 | 89% |
| 40 | 0.54 | 0.50 | 6.9 | 20.51 | 20.71 | 98% |
| 50 | 0.73 | 0.58 | 7.5 | 17.45 | 18.97 | 95% |
| 60 | 0.96 | 0.69 | 7.81 | 13.31 | 16.06 | 87% |
| 70 | 1.30 | 0.86 | 9.15 | 11.35 | 10.73 | 93% |

In the following Table 5, VCF achieved, overall passage, and concentration via UF are summarized for Runs 1-4. "C" refers to concentration of solute, "$C_o$" refers to initial concentration of a solute, "$V_o$" refers to initial feed volume, "V" refers to retentate volume, and "σ" refers to rejection, wherein $C=C_o(V_o/V)^\sigma$.

TABLE 5

| Run | VCF achieved | Overall passage | C | $C_o$ | $V_o$ | V | σ |
|---|---|---|---|---|---|---|---|
| 1 | 0.80 | 73% | 7.57 | 6 | 120.6 | 50.6 | 0.267657 |
| 2 | 0.76 | 91% | 2.92 | 2.70 | 121 | 51 | 0.090674 |
| 3 | 0.81 | 95% | 3.1 | 2.96 | 122.6 | 52.6 | 0.054653 |
| 4 | 0.86 | 93% | 2.91 | 2.72 | 111.8 | 41.8 | 0.068637 |

Example 2

In Runs 5-11, VCF experiments were conducted on a different fermentation broth using a similar process lay out indicated for Example 1 where different membranes also were evaluated including a Koch 1.2 μm nominal pore size spiral membrane as a control, an Alfa Laval 0.2 μm nominal pore size polysulfone (PS) membrane as a control and also for active permeate collection, and Microdyn 0.05 μm nominal pore size polyethersulfone membrane as a control and also for active permeate collection. The host organism used for producing the feed broth was *B. subtilis* broth and the enzyme was a protease enzyme, obtained as FN3 broth from Genencor Division, Danisco US, Inc. The operating temperature was 15° C.

Runs 5-11 were conducted under the following conditions. Run 5 was a control run using the Koch spiral membrane (Koch Membrane Systems, Inc.) in which there was only passive collection of permeate, meaning there was no UTMP nor co-current permeate recirculation (i.e., no active permeate collection). The average TMP was 1.5 bar and the feed flow was 9 m³/hr. Run 6 was a control using 0.2 μm polysulfone (PS) membrane in which there was only passive collection of permeate, meaning there was no UTMP nor co-current permeate recirculation. The average TMP was 1.5 bar and the feed flow was 9 m³/hr. In Run 7, an Alfa Laval 0.2 μm polysulfone (PS) membrane was used where a UTMP/rUTMP mode was conducted with UTMP at 1 bar and feed flow at 8.4 m³/hr. rUTMP was done for 30 seconds every 10 minutes by reducing the feed pump speed. The pump speed was reduced until a net negative permeate flow was observed. This indicated reverse flow through the membrane. In Run 8, an Alfa Laval 0.2 μm polysulfone (PS) membrane was used where a UTMP/rUTMP mode was conducted with UTMP at 1 bar and feed flow at 8.2 m³/hr. rUTMP was done for 5 seconds every 2 minutes by reducing the feed pump speed. The pump speed was reduced until a net negative permeate flow was observed. This indicated reverse flow through the membrane. In Run 9, a Microdyn 0.05 μm polyethersulfone (PES) membrane was used in which there was only passive collection of permeate, meaning there was no UTMP nor co-current permeate recirculation. The TMP was 1.5 bar and the feed flow was 9.8 m³/hr. In Run 10, a Microdyn 0.05 μm polyethersulfone (PES) membrane was used where a UTMP/rUTMP mode was conducted with UTMP at 0.9 bar and feed flow at 8.1 m³/hr. rUTMP was done for 5 seconds every 2 minutes by reducing the feed pump speed. The pump speed was reduced until a net negative permeate flow was observed. This indicated reverse flow through the membrane. In Run 11, a Microdyn 0.05 μm polyethersulfone (PES) membrane was used where a UTMP/rUTMP mode was conducted with UTMP at 0.8 bar and feed flow at 8.1 m³/hr. rUTMP was done for 5 seconds every 2 minutes by reducing the feed pump speed. The pump speed was reduced until a net negative permeate flow was observed. This indicated reverse flow through the membrane.

Figure 21:
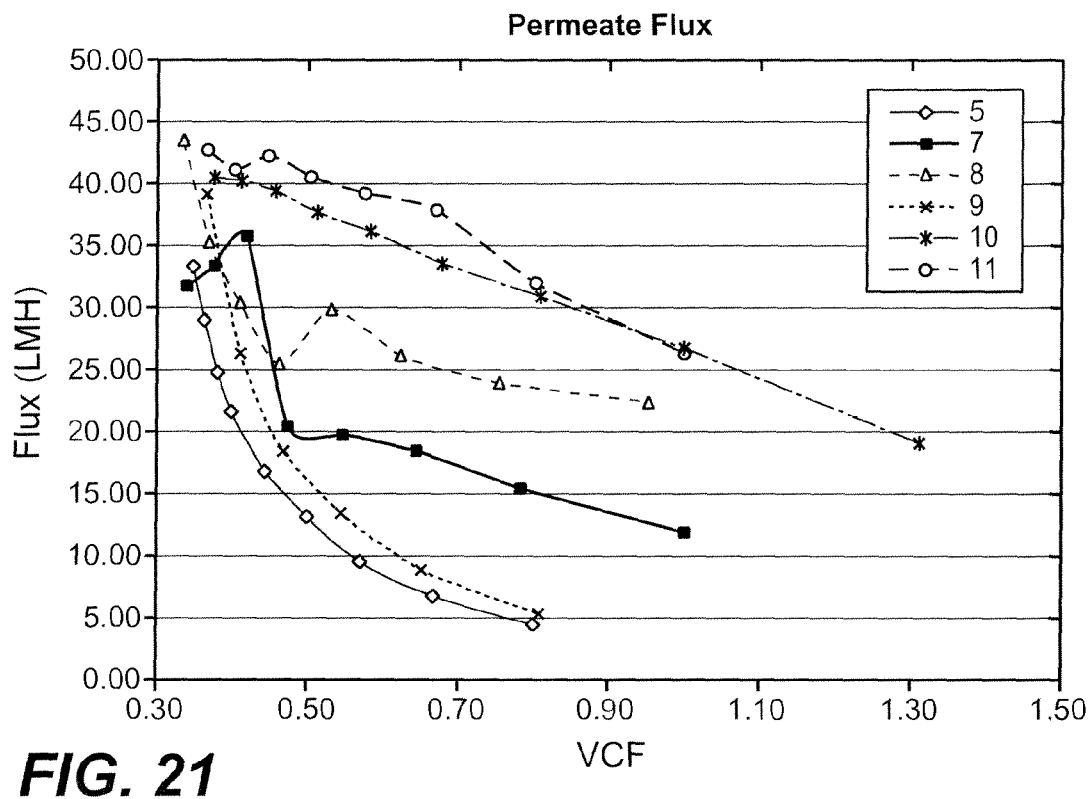
FIG. 21 illustrates data obtained from another experiment investigating filtration parameters including permeate flux and VCF, wherein the host organism and enzyme in the feed broth is a different *Bacillus subtilis* broth and protease enzyme than the experiment from which data was obtained and illustrated in FIGS. 18-20.
Figure 22:
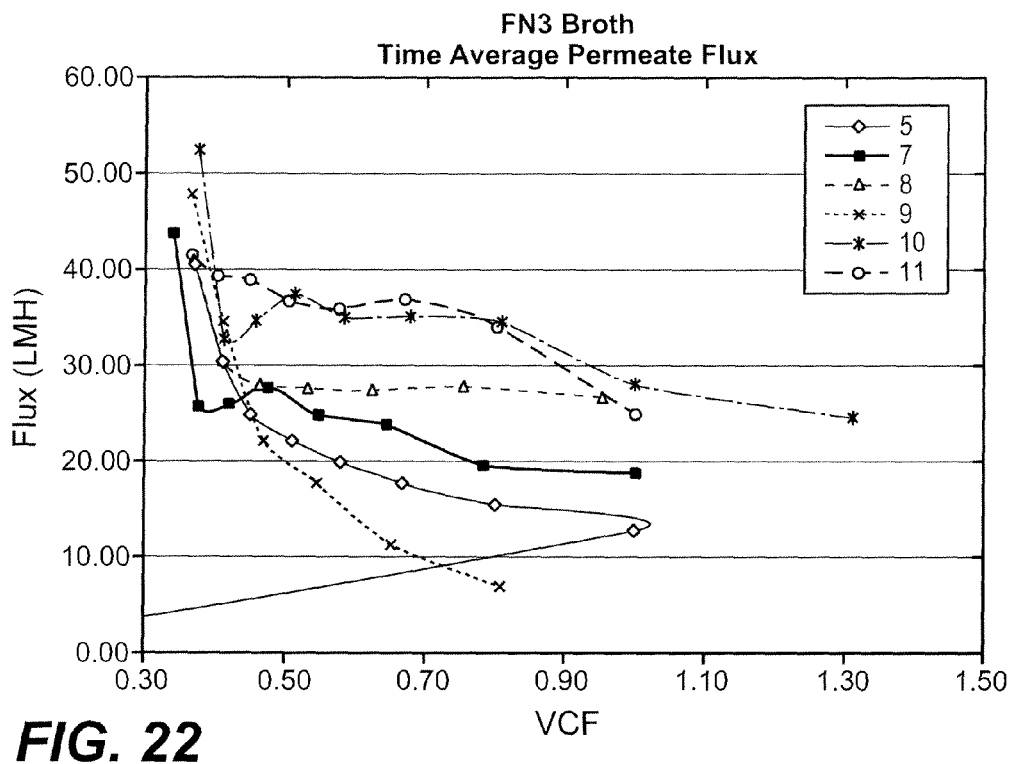
FIG. 22 illustrates data obtained from the experiment mentioned above relative to FIG. 21 investigating filtration parameters including time average permeate flux and VCF, wherein the host organism and enzyme in the feed broth is a *Bacillus subtilis* broth and protease enzyme.
Figure 23:
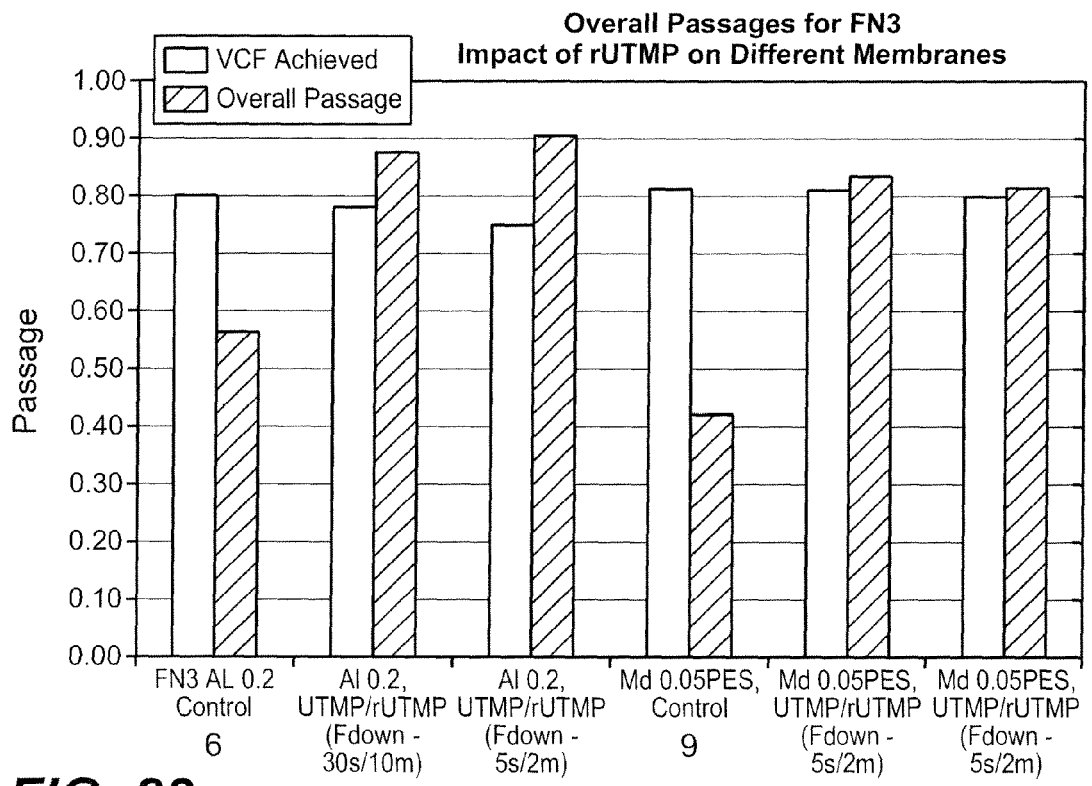
FIG. 23 illustrates data obtained from the experiment mentioned above relative to FIG. 21 investigating filtration parameters including cumulative passage and VCF in particular, wherein the host organism and enzyme in the feed broth is a *Bacillus subtilis* broth and protease enzyme.

The results of Runs 5-11 are indicated in Tables 6-12. Results for flux at different VCF results are plotted in FIGS. 21 and 22, and passage results are plotted in FIG. 23. Among other findings, the results in FIGS. 21-21 show that adding UTMP gave slower fluxes unless combined with UTMP. FIG. 23 indicates all runs using UTMP had significant improvements in overall passage. The least flux decay was observed in Runs 7, 8, 10 and 11 in which UTMP/rUTMP mode was conducted.

TABLE 6

Run 5

| | | Koch 1.2 um, control | | | Time Average | |
|---|---|---|---|---|---|---|
| Permeate (L) | Time (Hr) | VCF | Solids (%) | Permeate Flux (LMH) | Permeate Flux (LMH) | Passage (%) |
| 5 | 0.05 | 0.35 | | 33.45 | 39.67 | |
| 10 | 0.10 | 0.36 | 6.18 | 29.05 | 31.17 | 49% |
| 15 | 0.17 | 0.38 | | 24.84 | 26.72 | 56% |
| 20 | 0.25 | 0.40 | 6.48 | 21.78 | 23.38 | 64% |
| 30 | 0.44 | 0.45 | 6.93 | 16.95 | 18.70 | 66% |
| 40 | 0.70 | 0.50 | 7.25 | 13.31 | 14.23 | 63% |
| 50 | 1.08 | 0.57 | 7.75 | 9.60 | 9.49 | 62% |
| 60 | 1.50 | 0.67 | 8.65 | 6.87 | 8.73 | 56% |
| 70 | 2.17 | 0.80 | 9.31 | 4.58 | 5.45 | 63% |

TABLE 7

| Run 6 | | | Alfa Laval 0.2 um, control | | Time Average Permeate |
|---|---|---|---|---|---|
| Permeate (L) | Time (Hr) | VCF | Solids (%) | Permeate Flux (LMH) | Flux (LMH) |
| 10.00 | 0.09 | 0.37 | | 27.71 | 40.4 |
| 20.00 | 0.24 | 0.41 | | 20.95 | 30.3 |
| 30.00 | 0.44 | 0.45 | | 17.02 | 24.8 |
| 40.00 | 0.66 | 0.51 | | 14.40 | 22.0 |
| 50.00 | 0.92 | 0.58 | | 12.00 | 19.8 |
| 60.00 | 1.24 | 0.67 | | 9.82 | 17.6 |
| 70.00 | 1.66 | 0.80 | | 7.42 | 15.3 |
| 80.00 | 2.28 | 1.00 | | 5.45 | 12.8 |

TABLE 8

Run 7

Alfa Laval 0.2 um, UTMP/rUTMP (Fdown - 30 s/10 m)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.08 | 0.34 | 5.27 | 31.85 | 43.64 | 67% |
| 20 | 0.23 | 0.38 | 5.42 | 33.38 | 25.67 | 64% |
| 30 | 0.37 | 0.42 | 5.91 | 35.78 | 25.92 | 61% |
| 40 | 0.50 | 0.48 | 6.31 | 20.51 | 27.56 | 71% |
| 50 | 0.64 | 0.55 | 6.49 | 19.85 | 24.70 | 77% |
| 60 | 0.80 | 0.64 | 7.21 | 18.55 | 23.80 | 85% |
| 70 | 0.98 | 0.78 | 7.76 | 15.49 | 19.54 | 87% |
| 80 | 1.18 | 1.00 | 8.81 | 12.00 | 18.70 | 86% |

TABLE 9

Run 8

Alfa Laval 0.2 um, UTMP/rUTMP (Fdown - 5 s/2 m)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 0 | 0.05 | 0.34 | | 43.64 | | |
| 10 | 0.14 | 0.37 | | 35.35 | 40.91 | 17% |
| 20 | 0.26 | 0.41 | | 30.55 | 30.30 | 70% |
| 30 | 0.39 | 0.46 | | 25.53 | 27.97 | 90% |
| 40 | 0.52 | 0.53 | | 29.89 | 27.50 | 85% |
| 50 | 0.65 | 0.62 | | 26.18 | 27.33 | 91% |

TABLE 9-continued

Run 8

Alfa Laval 0.2 um, UTMP/rUTMP
(Fdown - 5 s/2 m)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 60 | 0.79 | 0.75 | | 24.00 | 27.73 | 89% |
| 70 | 0.92 | 0.95 | | 22.47 | 26.55 | 84% |

TABLE 10

Run 9

Microdyn 0.05 μm PES w/ P. spacer, control

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.08 | 0.37 | 5.3 | 39.27 | 47.78 | |
| 20 | 0.18 | 0.41 | 5.67 | 26.40 | 34.54 | 12% |
| 30 | 0.35 | 0.47 | 6.02 | 18.55 | 22.15 | 33% |
| 40 | 0.55 | 0.55 | 6.46 | 13.53 | 17.67 | 39% |
| 50 | 0.88 | 0.65 | 7.26 | 8.95 | 11.24 | 45% |
| 60 | 1.41 | 0.81 | | 5.45 | 6.84 | 43% |

TABLE 11

Run 10

Microdyn 0.05 μm PES, UTMP/rUTMP
(Fdown - 5 s/2 m)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.07 | 0.38 | | 40.58 | 52.36 | 87% |
| 20 | 0.18 | 0.41 | | 40.36 | 32.73 | 102% |
| 30 | 0.29 | 0.46 | | 39.49 | 34.63 | 86% |
| 40 | 0.38 | 0.51 | | 37.75 | 37.19 | 86% |
| 50 | 0.49 | 0.58 | | 36.22 | 34.91 | 88% |
| 60 | 0.59 | 0.68 | | 33.60 | 35.00 | 83% |
| 70 | 0.70 | 0.81 | | 30.98 | 34.36 | 84% |
| 80 | 0.83 | 1.00 | | 26.84 | 27.97 | 86% |
| 90 | 0.98 | 1.31 | | 19.20 | 24.47 | 82% |

TABLE 12

Run 11

Microdyn 0.05 μm PES, UTMP/rUTMP
(Fdown - 5 s/2 m)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 10 | 0.09 | 0.37 | | 42.76 | 41.43 | 80% |
| 20 | 0.18 | 0.40 | | 41.24 | 39.19 | 80% |
| 30 | 0.27 | 0.45 | | 42.33 | 38.85 | 84% |

TABLE 12-continued

Run 11

Microdyn 0.05 μm PES, UTMP/rUTMP
(Fdown - 5 s/2 m)

| Permeate (L) | Time (Hr) | VCF | Solids (%) | Permeate Flux (LMH) | Time Average Permeate Flux (LMH) | Cumulative Passage (%) |
|---|---|---|---|---|---|---|
| 40 | 0.37 | 0.50 | | 40.58 | 36.57 | 78% |
| 50 | 0.48 | 0.58 | | 39.27 | 35.87 | 85% |
| 60 | 0.57 | 0.67 | | 37.96 | 36.88 | 81% |
| 70 | 0.68 | 0.80 | | 32.07 | 34.00 | 82% |
| 80 | 0.83 | 1.00 | | 26.40 | 24.70 | 83% |

In the following Table 13, VCF achieved, overall passage, and concentration via UF are summarized for Runs 6-11.

TABLE 13

| Run | VCF achieved | Overall passage | C | $C_o$ | $V_o$ | V | σ |
|---|---|---|---|---|---|---|---|
| 6 | 0.80 | 55% | 3.5 | 2.38 | 121 | 51 | 0.44641 |
| 7 | 0.78 | 83% | 4.68 | 4.00 | 116.2 | 46.2 | 0.17023 |
| 8 | 0.75 | 90% | 4.54 | 4.2 | 108 | 48 | 0.096029 |
| 9 | 0.81 | 42% | 6.2 | 3.7 | 101.64 | 41.64 | 0.578474 |
| 10 | 0.81 | 83 | 5.3 | 4.6 | 122.2 | 52.2 | 0.166539 |
| 11 | 0.80 | 81 | 5.06 | 4.3 | 120.65 | 50.65 | 0.187514 |

Example 3

Figure 25:
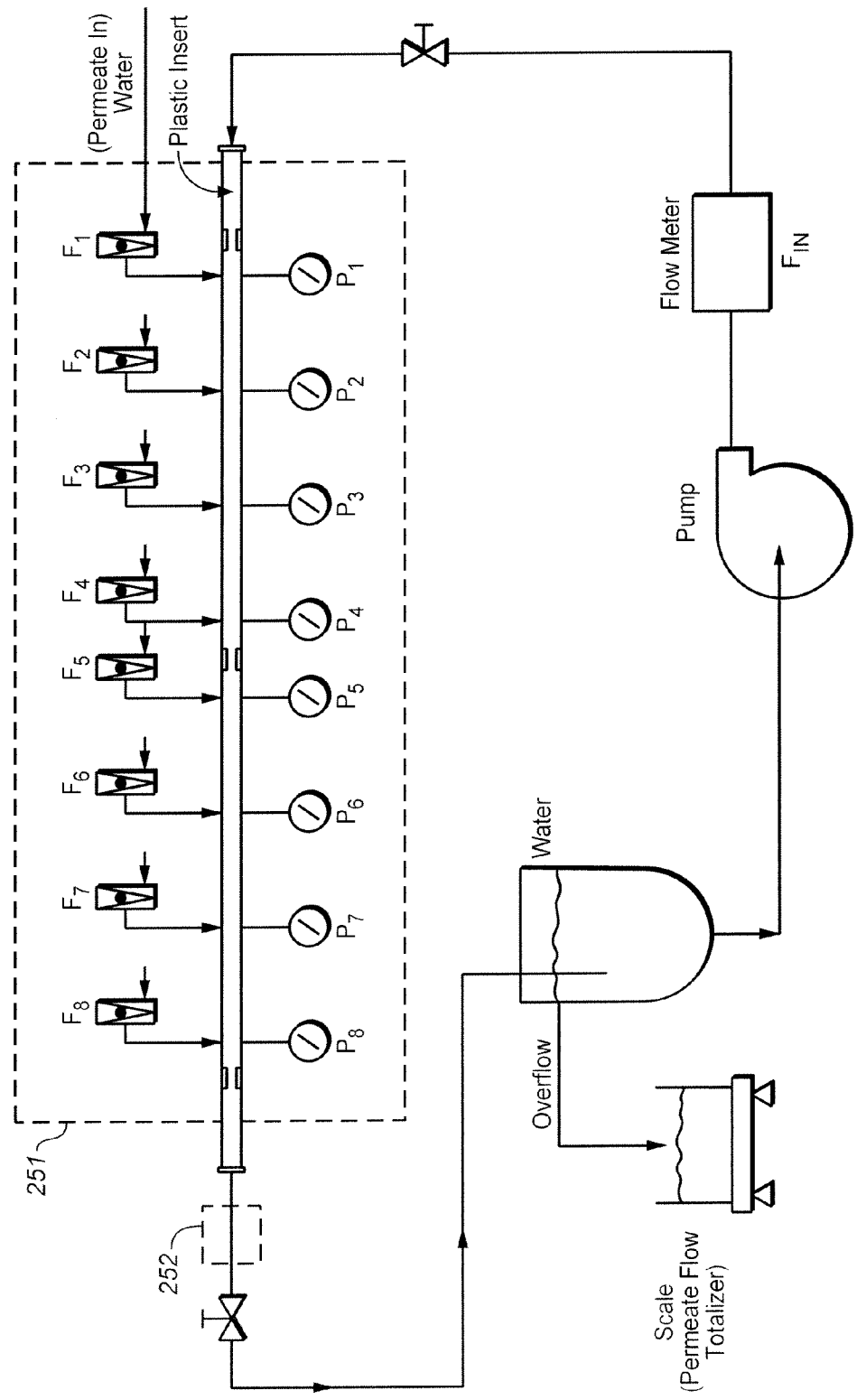
FIG. 25 shows a schematic of an experimental set-up upon which tests were performed to study pressure distribution effects for different total permeate flows in a permeate tube system.
Figure 27:
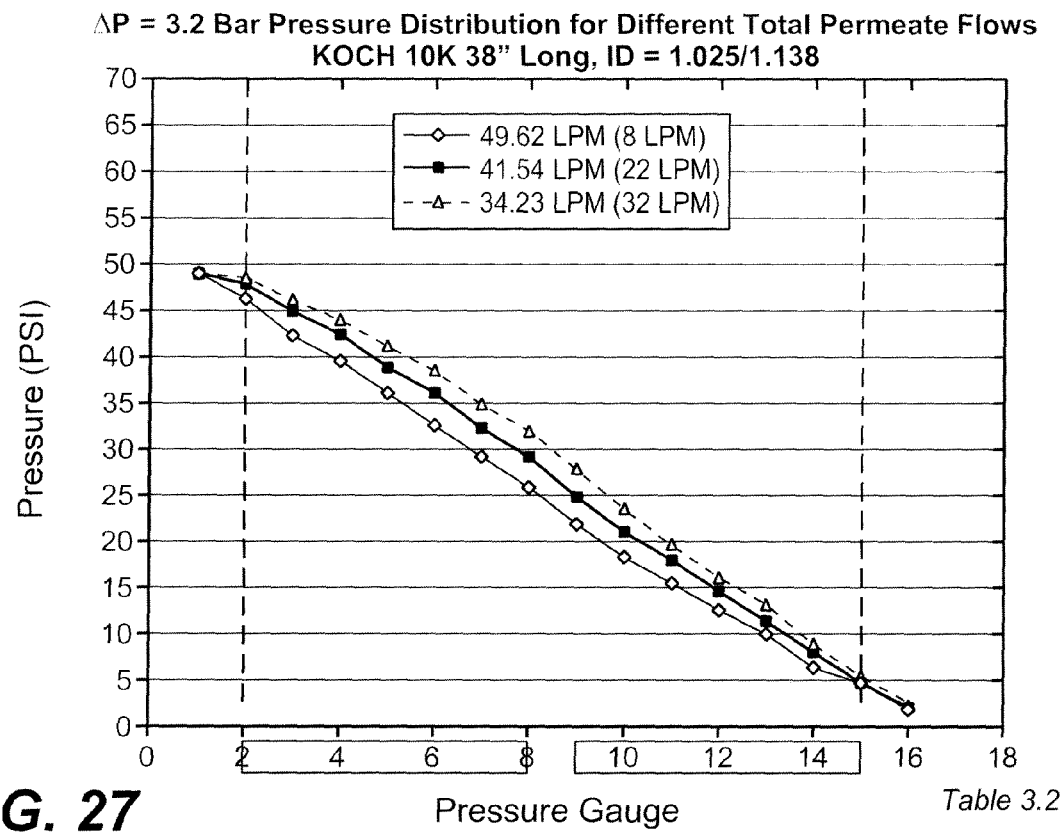
Figure 28:
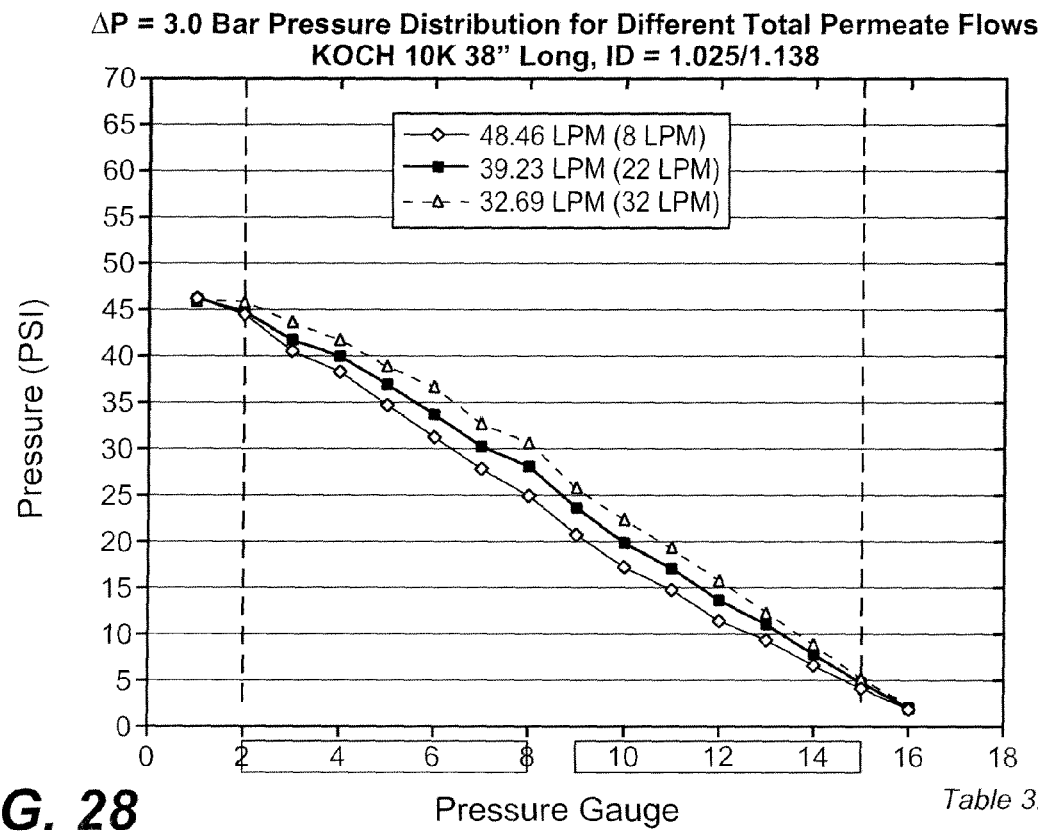
Figure 29:
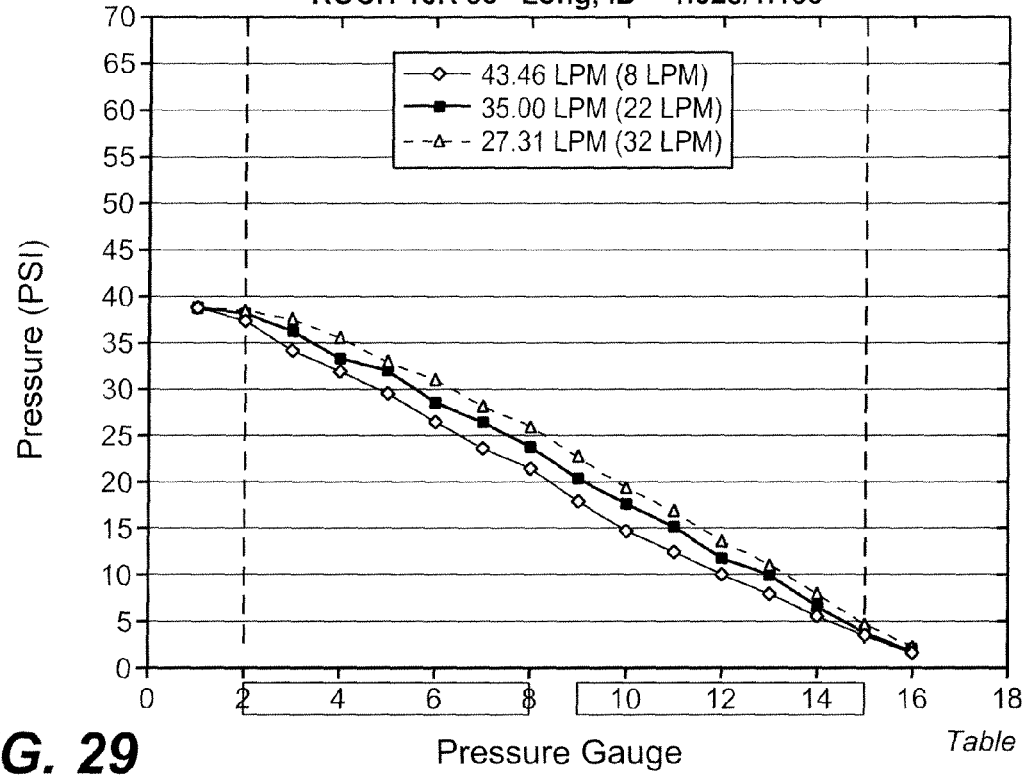
Figure 30:
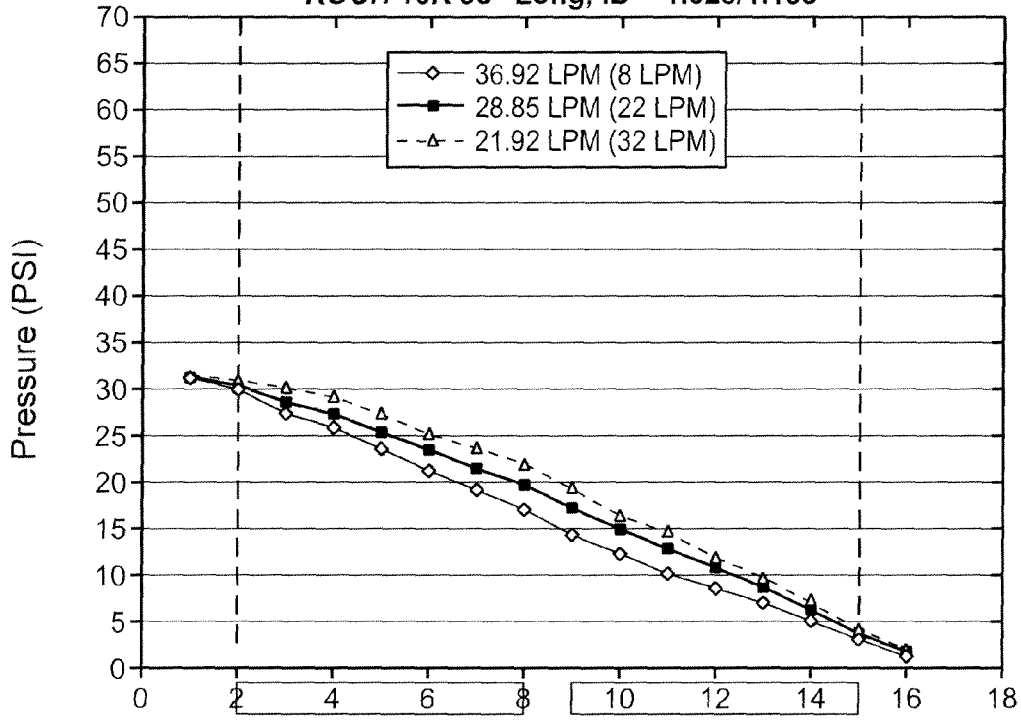

Experimental studies were conducted to investigate distribution of pressure drop from inlet to outlet in a permeate collection tube fitted with a tapered insert installed within the collection tube as a flow resistance element. To achieve accurate results an actual membrane of a spiral membrane system, Koch Membrane Systems, Inc., was unwrapped and removed and the permeate collection tube inside was separately used for these experiments. The permeate tube was retrofitted so that water could be injected in a sealed manner at regular intervals along the length of the tube and the local pressure and flow rate measured at the injection sites while the other tube openings along the length of the tube were blocked. The tube had inlet and outlet openings at its opposite ends for introduction of recirculated water or other test permeate and discharge of the permeate/water collected within and passing through the particular tube. Referring to FIG. 25, for purposes of this experiment, two permeate tubes 251 and 252 were obtained in this manner and modified such that eight (8) injection sites, pressure gauges and flow meters were installed on each permeate tube. Only tube 251 is shown schematically in FIG. 25 in order to simplify the illustration, as tube 252 was identical thereto. A tapered insert having the general configuration as shown in FIGS. 4A and 4D was installed in each permeate collection tube. The two permeate tubes were interconnected using an anti-telescoping device (Alfa Laval). An anti-telescoping device was also installed at each outer end of the permeate tubes. The equipment was installed to provide the general overall configuration shown in FIG. 25 in which co-current permeate recirculation and permeate injection rates could be controlled and monitored.

Tests were done at several different ΔP (3.4, 3.2, 3.0, 2.5, 2.0 bar) and permeate flow rates (8 LPM, 22 LPM, 32, LPM). The tapered insert had a tapered design with the diameters of 0.91" to 0.90" and 0.90" to 0.89" (two inserts for two tubes).

The results are shown in FIGS. 26-30. These figures refer to pressure gauges 1-8 installed in permeate tube 251 (from inlet to outlet thereof) and pressure gauges 9-16 installed in permeate tube 252 (from inlet to outlet thereof). As shown by the data in FIGS. 26-30, a significant and relatively evenly distributed pressure drop was observed to occur from the initial inlet to the ultimate outlet of the permeate tubes. Also, pressure drop affects of the ATD located between the two permeate tubes 251 and 252, i.e., between pressure gauges 8 and 9, were observed to be minimal Example 4

Figure 32:
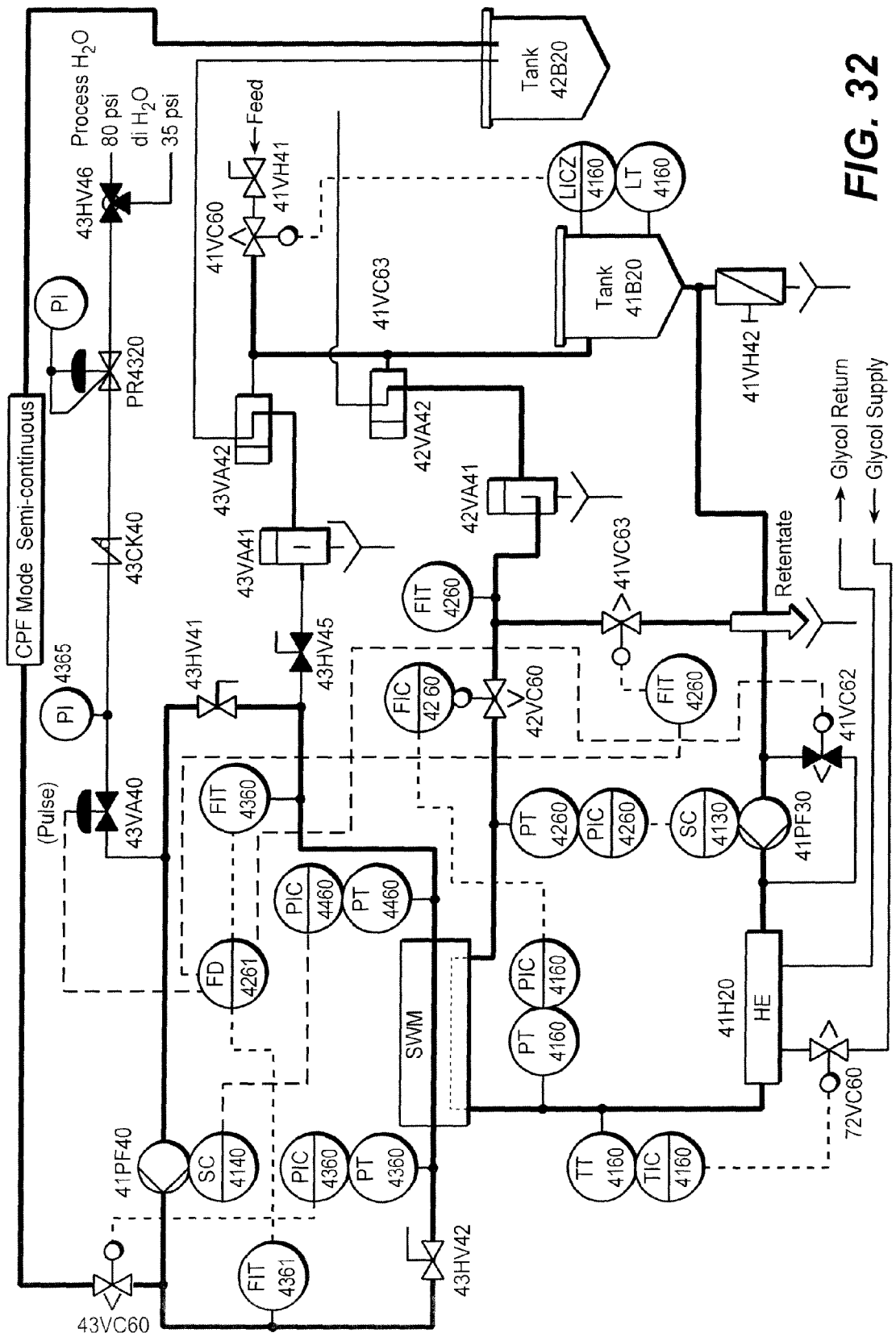
FIG. 32 is a schematic representation of a pilot scale cross-flow filtration system as shown in FIGS. 15A through 15I. In this representation, the system is set to run in a continuous mode, with feed entering through valve 41VC60, retentate and permeate being discharged at discrete rates through valves 41VC63 and 43VC60, respectively.
Figure 33:
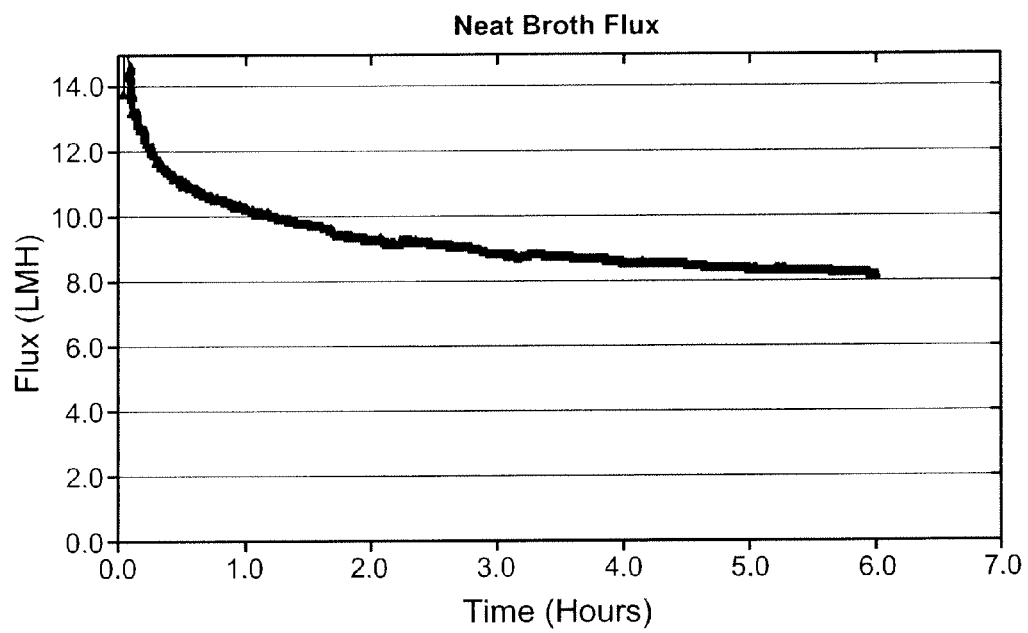
FIG. 33 shows the neat broth flux determined by measuring the amount of diluted broth fed to the system depicted in FIG. 32.
Figure 34:
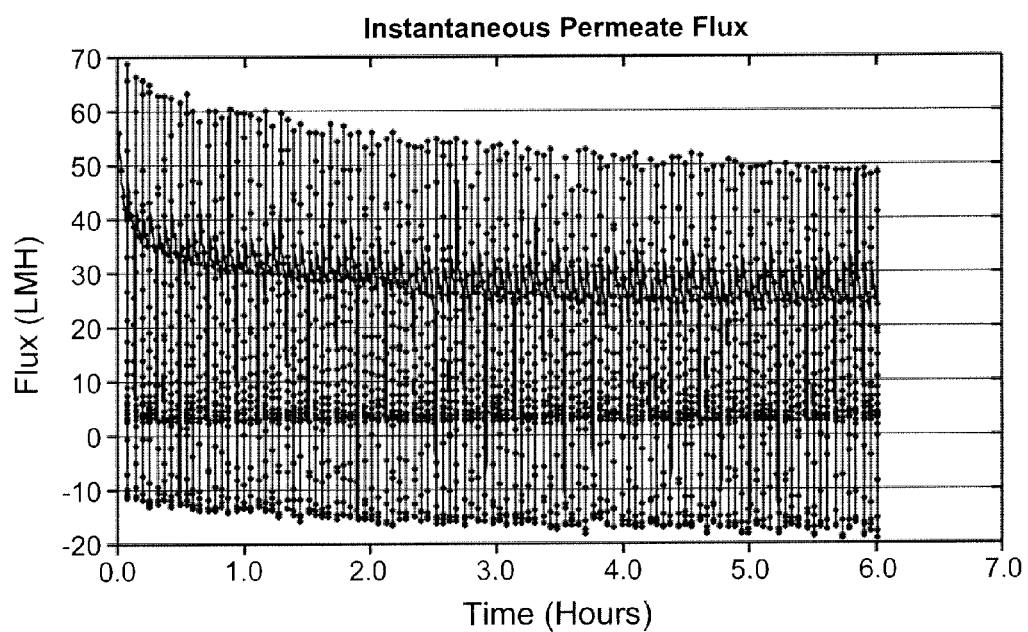
FIG. 34 shows the instantaneous permeate flux from the same experiment as FIG. 33. This demonstrates the flux variations generated by the UTMP/rUTMP system over the course of a run.
Figure 35:
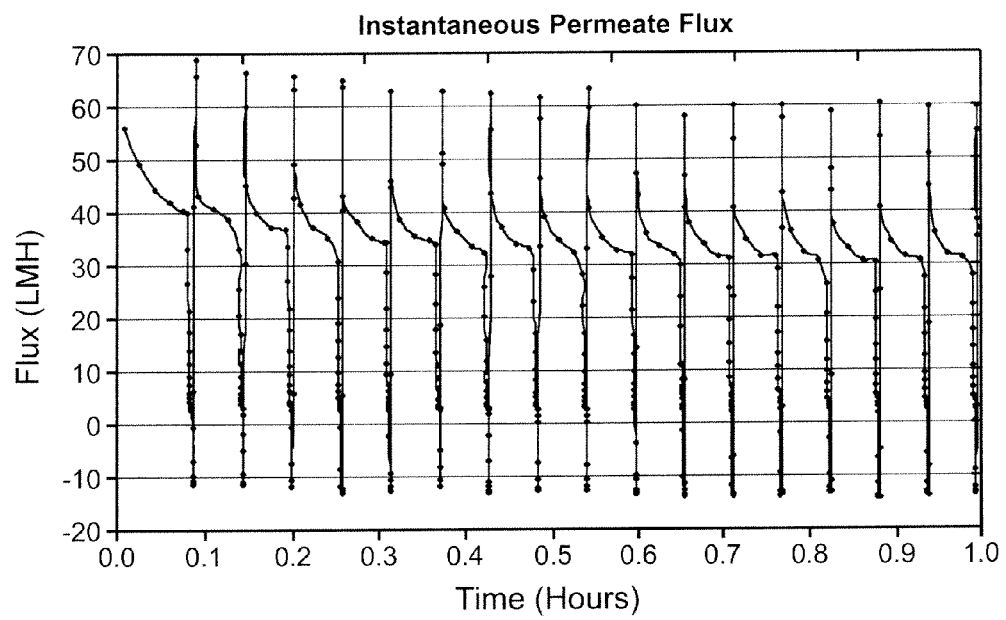
FIG. 35 shows an expanded view of the graph represented by FIG. 34, showing the flux trends for a UTMP/rUTMP cycle more clearly. When in UTMP mode alone, a flux decline is observed, and the start of a rUTMP cycle is signified by a rapid drop in flux as the UTMP is reduced to nUTMP. There is then a brief rUTMP period followed by flux recovery as the pressures return to the set-point. Flux after an rUTMP cycle is much higher than the flux prior to the rUTMP cycle.
Figure 36:
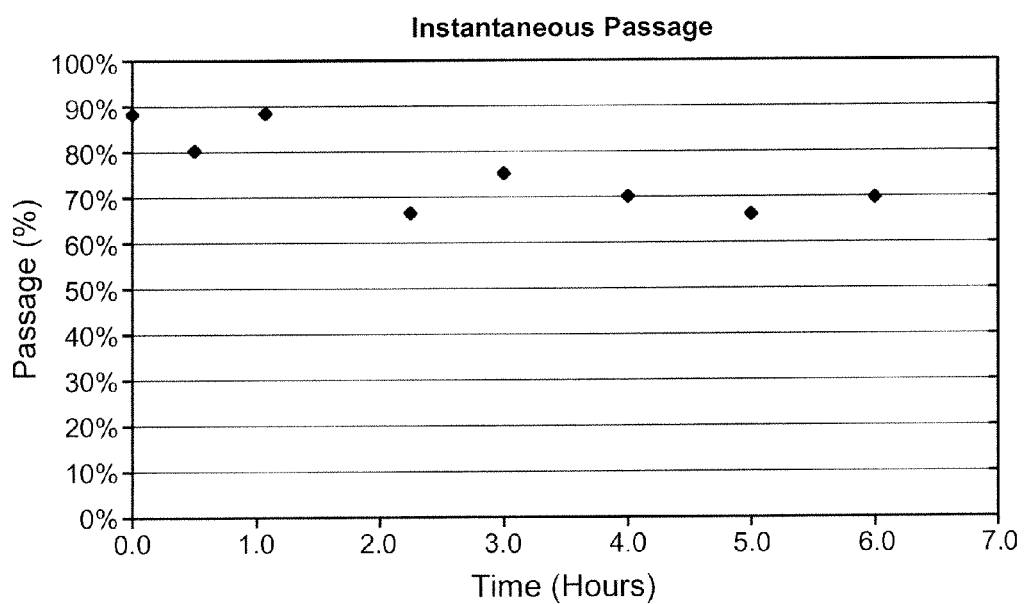
FIG. 36 is a graph that represents the passage of protease at various time points during the experiment described in Example 4.

An experiment was performed using equipment and process as outlined in FIG. 32. The aim of this experiment was to demonstrate the effectiveness of the UTMP/rUTMP system in an industrial style continuous process.

37.5 kg of a *Bacillus subtilis* fermentation broth, containing alkaline protease was batched into the feed tank along with 22.5 kg of water. The system was started up and allowed to establish the following operating conditions:

| | |
|---|---|
| Feed inlet pressure | 2.8 bar |
| Feed outlet pressure | 1.3 bar |
| Permeate inlet pressure | 1.8 bar |
| Permeate outlet pressure | 0.3 bar |
| Feed temperature | 15° C. |

These settings resulted in a UTMP of 1.0 bar and a ΔP of 1.5 bar on both the feed and permeate sides. Both feed and permeate were recirculated during start-up. The membrane used for this experiment was a Koch MFK 601 3838 with an 80 mil spacer.

Once the system was stable, the experiment was started. Permeate was sent to a collection tank. Retentate was discharged at a rate of 4.7 parts permeate to 1 part retentate. Feed from an outside holding tank was fed into the system feed tank to maintain a total system liquid weight of 60 kg. The feed from the outside holding tank was made by mixing 166.6 kg of *Bacillus subtilis* fermentation broth, containing alkaline protease, with 633 kg of water. This feed was kept at 10° C.

The system was set up to use the periodic rUTMP feature. rUTMP settings were:

| | |
|---|---|
| Interval between rUTMP cycle times | 3 minutes |
| rUTMP duration | 5 seconds |
| rUTMP intensity | −0.5 LPM net permeate flow (0.1 bar permeate over-pressure) |

The experiment was run for 6 hours. Results are shown in FIGS. 32-36.

Example 5

An experiment was performed using equipment and process as outlined in FIG. 15.1.

This was a critical flux experiment, designed to show the impact of operating different UTMPs and ΔPs.

The experimental procedure was as follows:
1. Prefoul the membrane by running for 1 hour at the conditions expected to give the highest degree of fouling. In this case it was a UTMP of 1.5 bar and ΔP of 0.8 bar.
2. Manually run a rUTMP cycle to remove foulants. This resets the membrane to a state of semi-fouled.
3. Run a the first test condition for 30 minutes, taking a sample at the end of the 30 minute cycle to check for enzyme passage.
4. Repeat steps 2 and 3 for all of the test conditions.

40 kg of a *Bacillus subtilis* fermentation broth, containing alkaline protease, was batched into the feed tank along with 40 kg of water. The system was started up and allowed to stabilize at the following process conditions:

| | |
|---|---|
| Feed inlet pressure | 2.8 bar |
| Feed outlet pressure | 2.0 bar |
| Permeate inlet pressure | 1.3 bar |
| Permeate outlet pressure | 0.5 bar |
| Feed temperature | 15° C. |

This condition was run for 1 hour to pre-foul the membrane, and then the following conditions were run as outlined above:

| CF Condition | Cond. Time (min) | Feed Pin (bar) | Feed Pout (bar) | Perm. Pin (bar) | Perm. Pout (bar) | TMP (bar) | ΔP (bar) |
|---|---|---|---|---|---|---|---|
| 1 | 30 | 2.8 | 2.0 | 2.3 | 1.5 | 0.5 | 0.8 |
| 2 | 30 | 2.8 | 2.0 | 1.8 | 1.0 | 1.0 | 0.8 |
| 3 | 30 | 2.8 | 2.0 | 1.3 | 0.5 | 1.5 | 0.8 |
| 4 | 30 | 3.5 | 2.0 | 3.0 | 1.5 | 0.5 | 1.5 |
| 5 | 30 | 3.5 | 2.0 | 2.5 | 1.0 | 1.0 | 1.5 |
| 6 | 30 | 3.5 | 2.0 | 2.0 | 0.5 | 1.5 | 1.5 |

The membrane used for this experiment was a Koch MFK 601 3838 with an 80 mil spacer.

Figure 37:
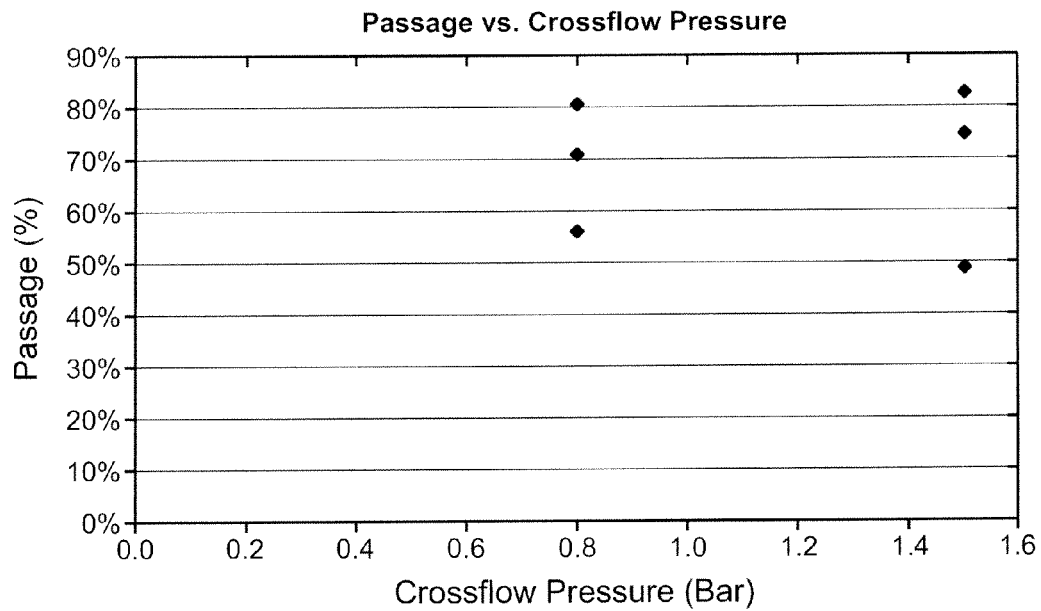
FIG. 37 is a graph that represents instantaneous passage of protease as a function of crossflow pressure ($\Delta P$) during the experiment described in Example 5. The samples for passage calculation were taken once the process had been running at a specific condition for 30 minutes.
Figure 38:
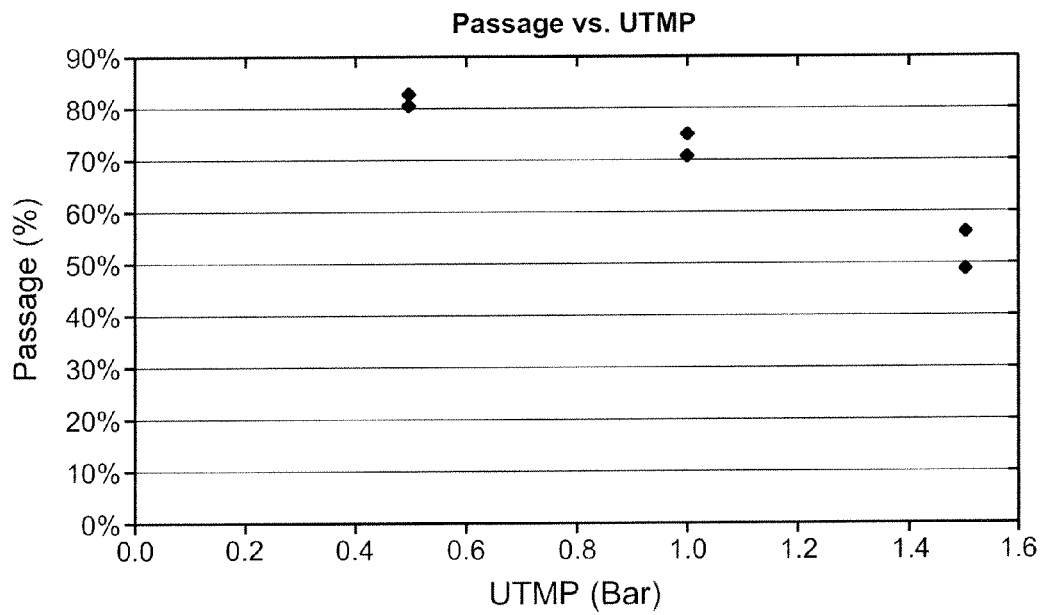
FIG. 38 is a graph that represents instantaneous passage of protease as a function of uniform transmembrane pressure (UTMP) during the experiment described in Example 5. The samples for passage calculation were taken once the process had been running at a specific condition for 30 minutes.
Figure 39:
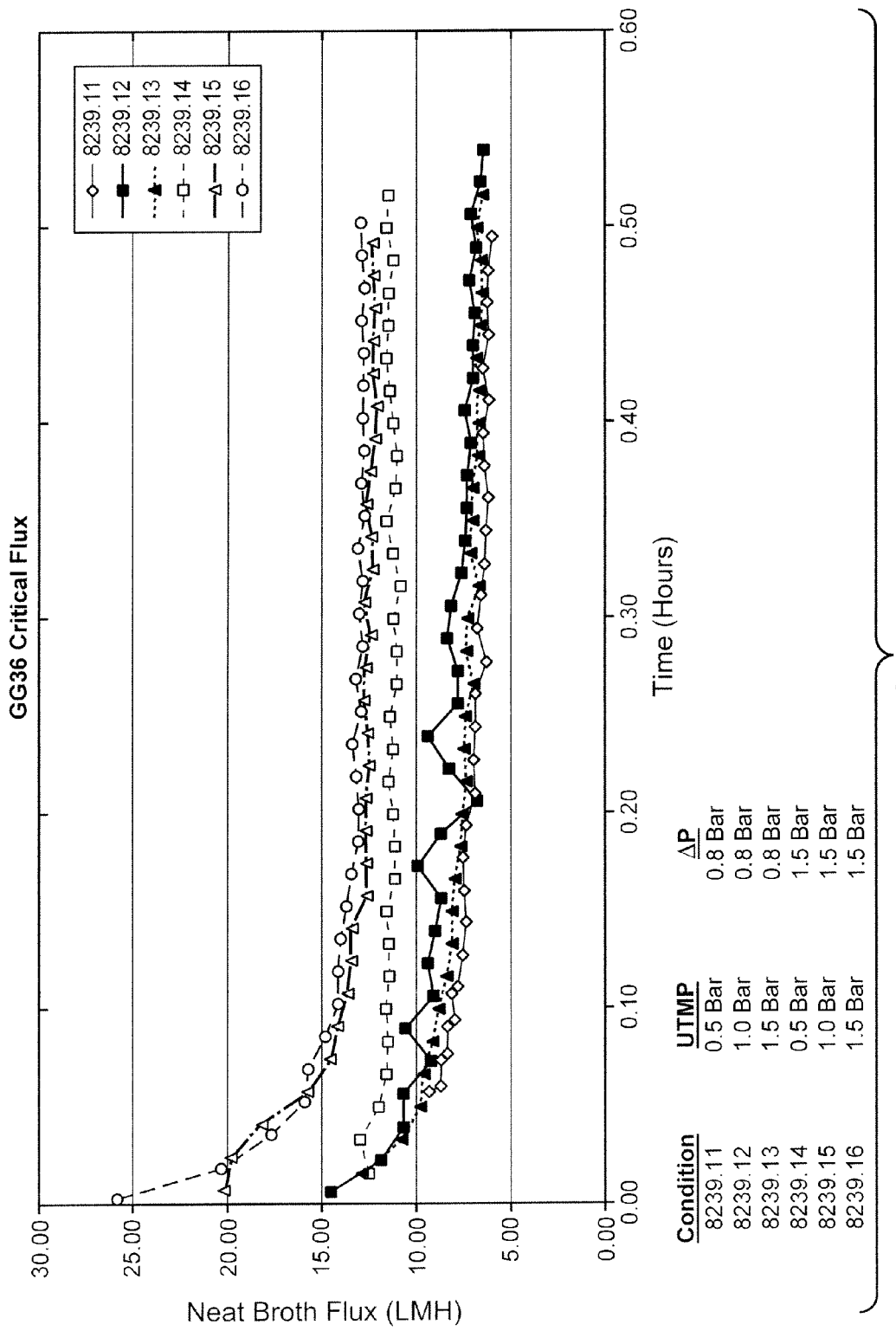
FIG. 39 is a graph that represents neat broth fluxes observed during the experiment described in Example 5.

The results are shown in FIGS. 37-39.

Example 6

Skim Milk Concentration

In a 500 L tank, 252 kg of water was added and heated to 50° C. Once the water was at temperature, 25 kg of dry skim milk powder was added slowly and allowed to mix in with agitation. The milk solution was allowed to hydrate for 90 minutes at 50° C.

92 kg of feed was pumped into a pilot MF skid (a spiral system as shown in FIGS. 15A to 15I) containing a 3838 0.05 um PES microfiltration membrane module supplied by Microdyn Technologies Inc. The permeate tube was filled with 8 mm plastic balls that acted as a FRE. The system was started up and allowed to come up to temperature under very low UTMP conditions (0.2 bar). Once the system had warmed up and the feed was stabilized at 50° C., a concentration process was started. The system was set to the following operational parameters for milk concentration:

| | |
|---|---|
| Temperature | 50° C. |
| Feed inlet pressure | 2.5 bar |
| Feed outlet pressure | 1.5 bar |
| Permeate inlet pressure | 1.5 bar |
| Permeate outlet pressure | 0.5 bar |

Feed was constantly supplied from the 500 L tank to make up the volume lost in permeate leaving the system, so the system feed level was maintained at 92 kg throughout this experiment. The process was run until all 277 kg of skim milk had been fed with a residual volume of 92 kg, resulting in a 3× concentration.

Figure 40:
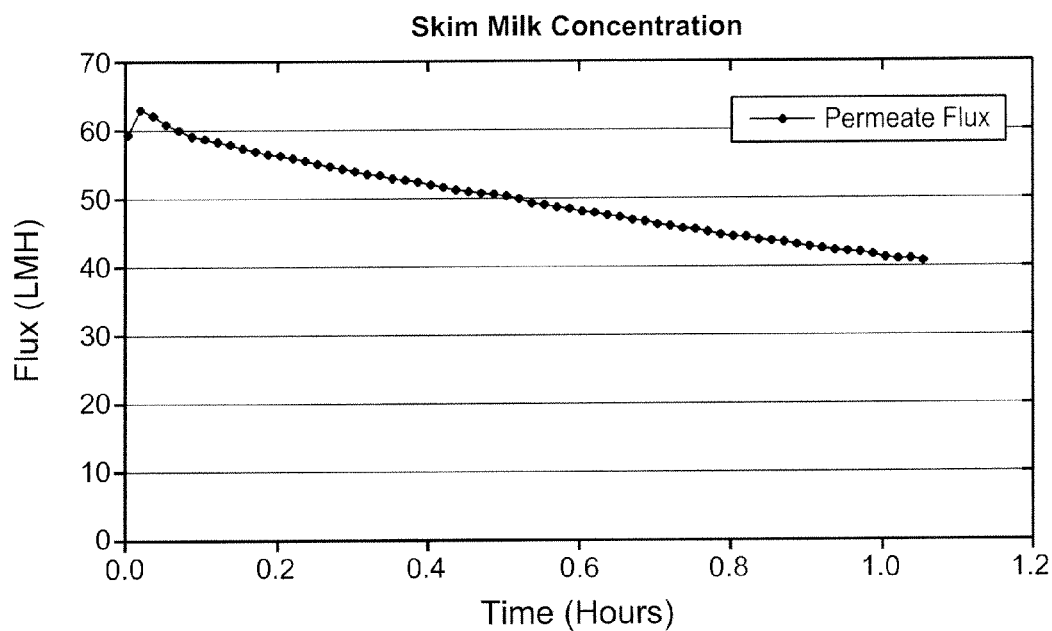
FIG. 40 is a graph that represents the permeate flux over the course of 3× concentration of skim milk in the experiment described in Example 6.

The results are shown in FIG. 40.

Example 7

Critical Flux on Skim Milk Concentrate

The 3× milk concentrate generated as described in Example 6 was used to an experiment to evaluate passage and flux at various UTMPs. For all conditions, the crossflow pressure was 0.8 bar and the feed temperature was 50° C. Permeate and retentate were continuously recirculated to the feed tank, so the feed composition was equivalent throughout the experiment. Milk was recirculated at each condition for 30 minutes.

| CF Condition | Cond. Time (min) | Feed Pin (bar) | Feed Pout (bar) | Perm. Pin (bar) | Perm. Pout (bar) | TMP (bar) | ΔP (bar) |
|---|---|---|---|---|---|---|---|
| 1 | 30 | 5.0 | 4.2 | 4.5 | 3.7 | 0.5 | 0.8 |
| 2 | 30 | 5.0 | 4.2 | 4.0 | 3.2 | 1.0 | 0.8 |
| 3 | 30 | 5.0 | 4.2 | 3.0 | 2.2 | 2.0 | 0.8 |
| 4 | 30 | 5.0 | 4.2 | 2.0 | 1.2 | 3.0 | 0.8 |
| 5 | 30 | 5.0 | 4.2 | 1.0 | 0.2 | 4.0 | 0.8 |

Figure 41:
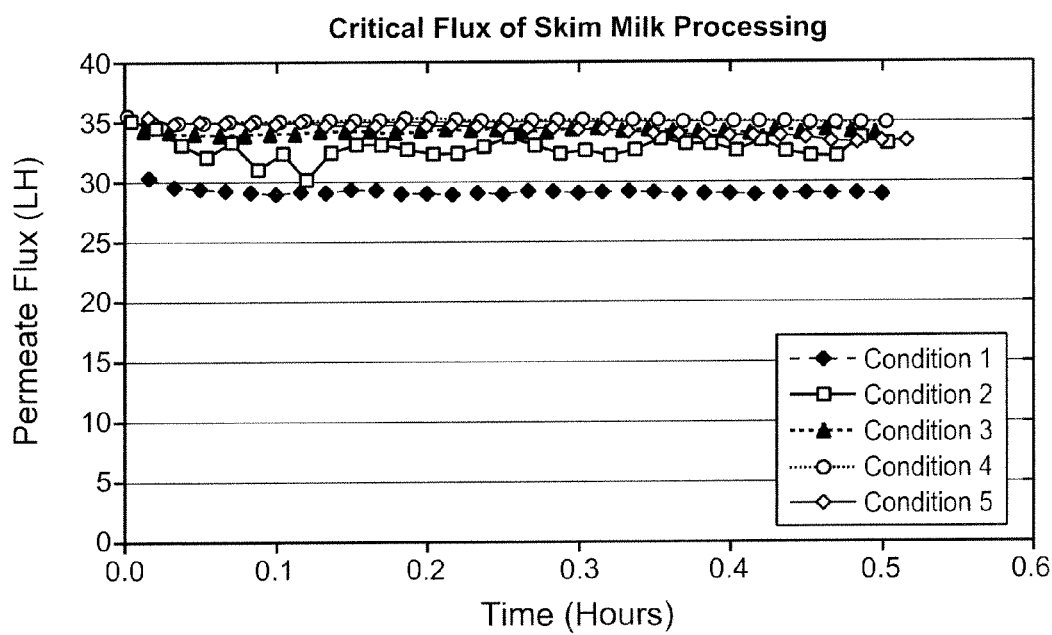
FIG. 41 is a graph that represents the permeate flux observed during the experiment described in Example 7.
Figure 43:
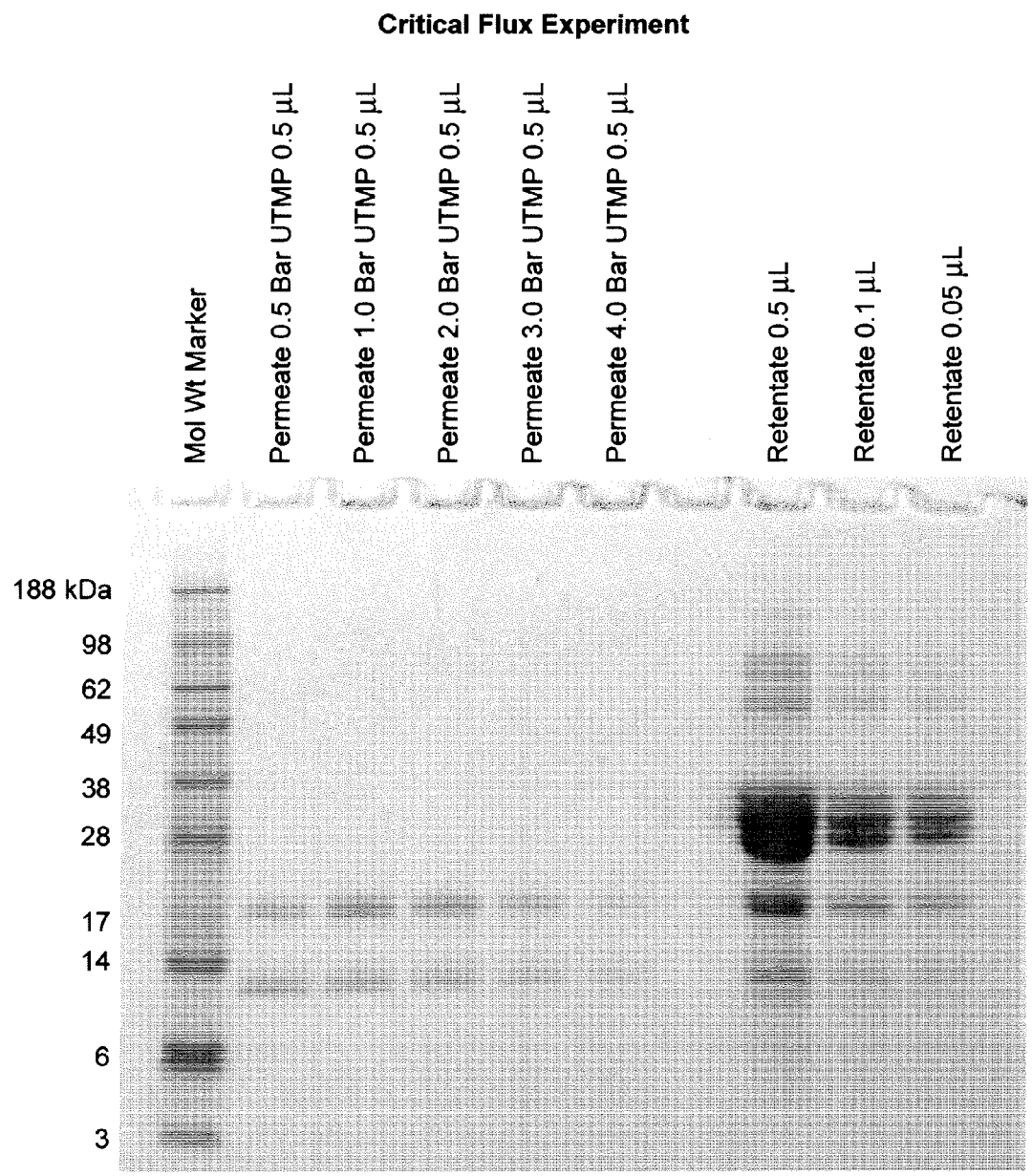
FIG. 43 shows electrophoretic analysis of permeate samples collected while filtering skim milk as described in Example 6 at various UTMPs, which ranged from 0.5 to 4.0 bar as indicated. The membrane was a Microdyn 0.05 µm PES spiral wound membrane. In the filtration, the permeate stream was recycled to the feed tank. A retentate sample was also analyzed in the gel, which is an in an Invitrogen (Carlsbad, Calif.) 10% Bis-Tris gel, run using MES buffer. Samples were first heated and treated with reducing agent before loading them in the gel. Protein bands were stained using Coomassie dye. The sample volume (µL) loaded in each gel lane is indicated for each sample. Invitrogen SeeBlue Plus2 molecular weight standard is included for protein size reference.

The results are shown in FIGS. 41 and 43.

Example 8

Diafiltration of 3× Milk Concentrate

After the critical flux experiment cited above, a deionized water supply line was hooked up to the MF skid's feed tank. The system was allowed to stabilize at the following operational parameters:

| | |
|---|---|
| Temperature | 50° C. |
| Feed inlet pressure | 2.3 bar |
| Feed outlet pressure | 1.3 bar |
| Permeate inlet pressure | 1.5 bar |
| Permeate outlet pressure | 0.5 bar |

Permeate was then sent to a permeate collection tank and water was continuously fed to feed tank in order to maintain a weight of 92 kg of feed in the system. This process was run until 185 kg of permeate was collected.

Figure 42:
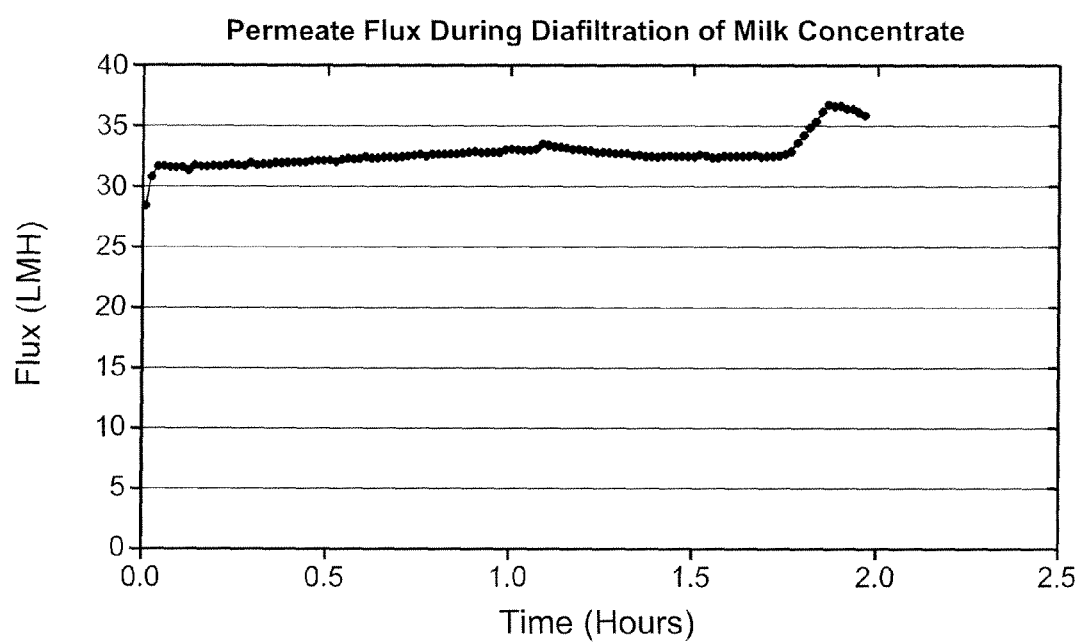
FIG. 42 is a graph that represents the permeate flux observed during the experiment described in Example 8.]

The results are shown in FIG. 42.

Example 9

In the equipment depicted in FIG. 15I, a critical flux experiment was run with an alpha-amylase broth from *Bacillus licheniformis*. The cells were lysed with lysozyme from Innovapure. The broth was pH adjusted to 10 with NaOH. 40 liters of broth were mixed with 40 liters of water and allowed to reach a temperature of 50° C. The membrane was prefouled for 1 hour with a DP of 1.0 bar and a UTMP of 1.5 bar. The membrane was then subjected to a manual rUTMP phase for 10 seconds before starting the experiment. A manual rUTMP phase of 10 seconds was performed between each condition. The membrane used was a Koch MFK 601, 1.2 um PES membrane with 80 mil spacers.

The following operating conditions were run: (all pressures in bar)

| | Temp | Feed $P_{in}$ | Feed $P_{out}$ | Perm $P_{in}$ | Perm $P_{out}$ | ΔP | UTMP |
|---|---|---|---|---|---|---|---|
| 1 | 50° C. | 4.3 | 2.8 | 3.8 | 2.3 | 1.5 | 0.5 |
| 2 | 50° C. | 4.3 | 2.8 | 3.3 | 1.8 | 1.5 | 1.0 |
| 3 | 50° C. | 4.3 | 2.8 | 2.8 | 1.3 | 1.5 | 1.5 |
| 4 | 50° C. | 4.3 | 2.8 | 2.3 | 0.8 | 1.5 | 2.0 |
| 5 | 50° C. | 4.3 | 2.8 | 3.8 | 2.3 | 1.5 | 0.5 |
| 6 | 50° C. | 4.3 | 2.8 | 3.3 | 1.8 | 1.5 | 1.0 |
| 7 | 50° C. | 4.3 | 2.8 | 2.8 | 1.3 | 1.5 | 1.5 |
| 8 | 50° C. | 4.3 | 2.8 | 2.3 | 0.8 | 1.5 | 2.0 |

Figure 46:
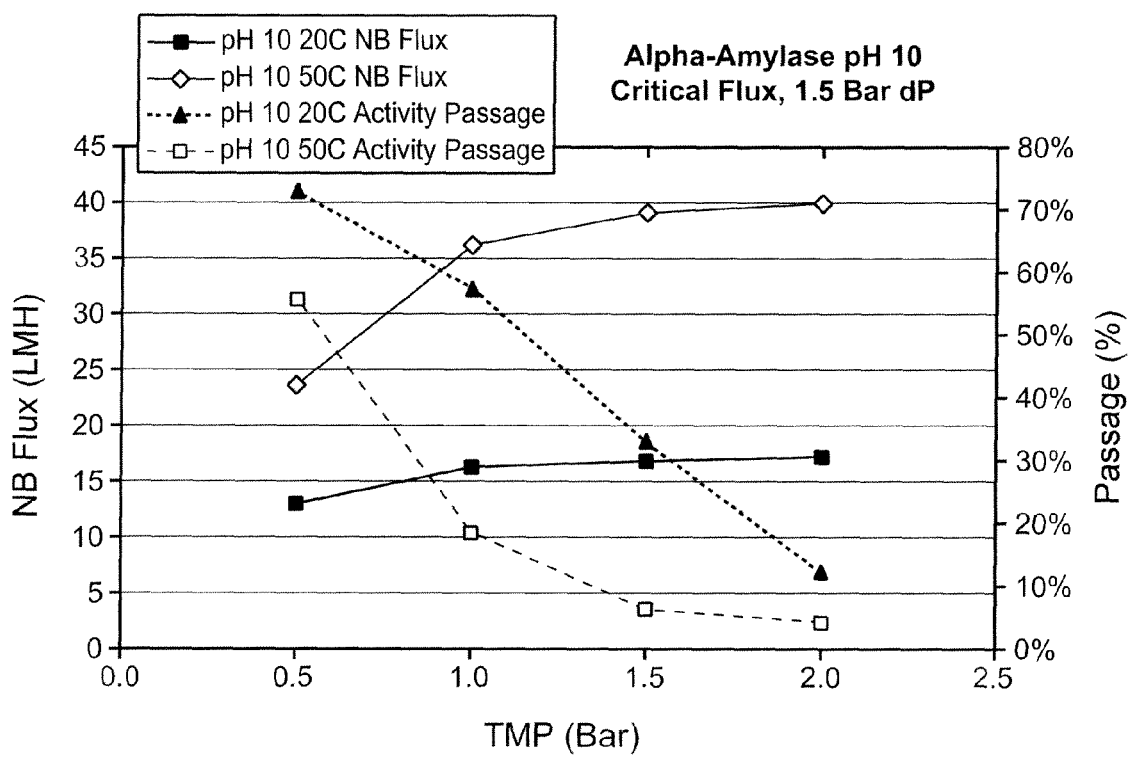
FIG. 46 shows results of the experiment described in Example 9.

Each condition was run for 20 minutes, at which point samples of retentate and permeate were taken for analysis. The results are shown in FIG. 46.

Example 10

Figure 24:
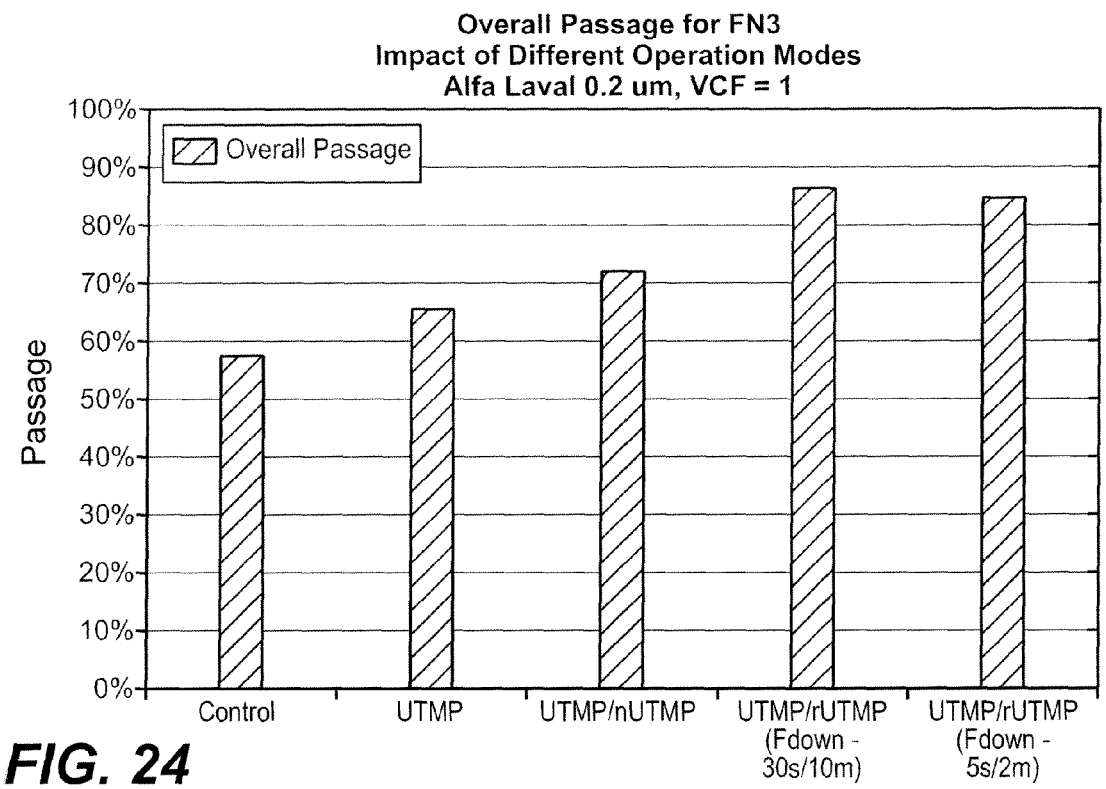
FIG. 24 shows the impact of different operation modes on overall passage data obtained from the experiment mentioned above relative to FIG. 21.
Figure 26:
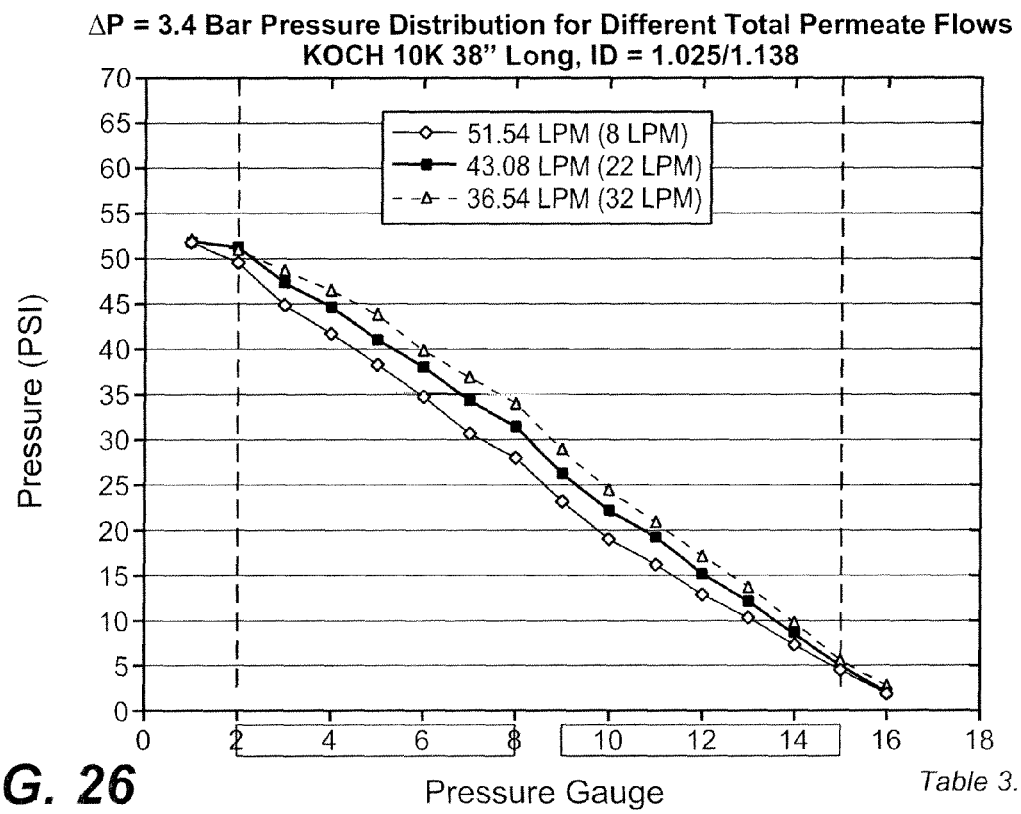
FIGS. 26-30 illustrate data obtained on the experimental set-up of FIG. 25.

FIG. 24 shows the impact of the different operation modes on overall passage for runs using the Laval 0.2 μm polysulfone (PS) membrane at VCF 1.

Figure 44:
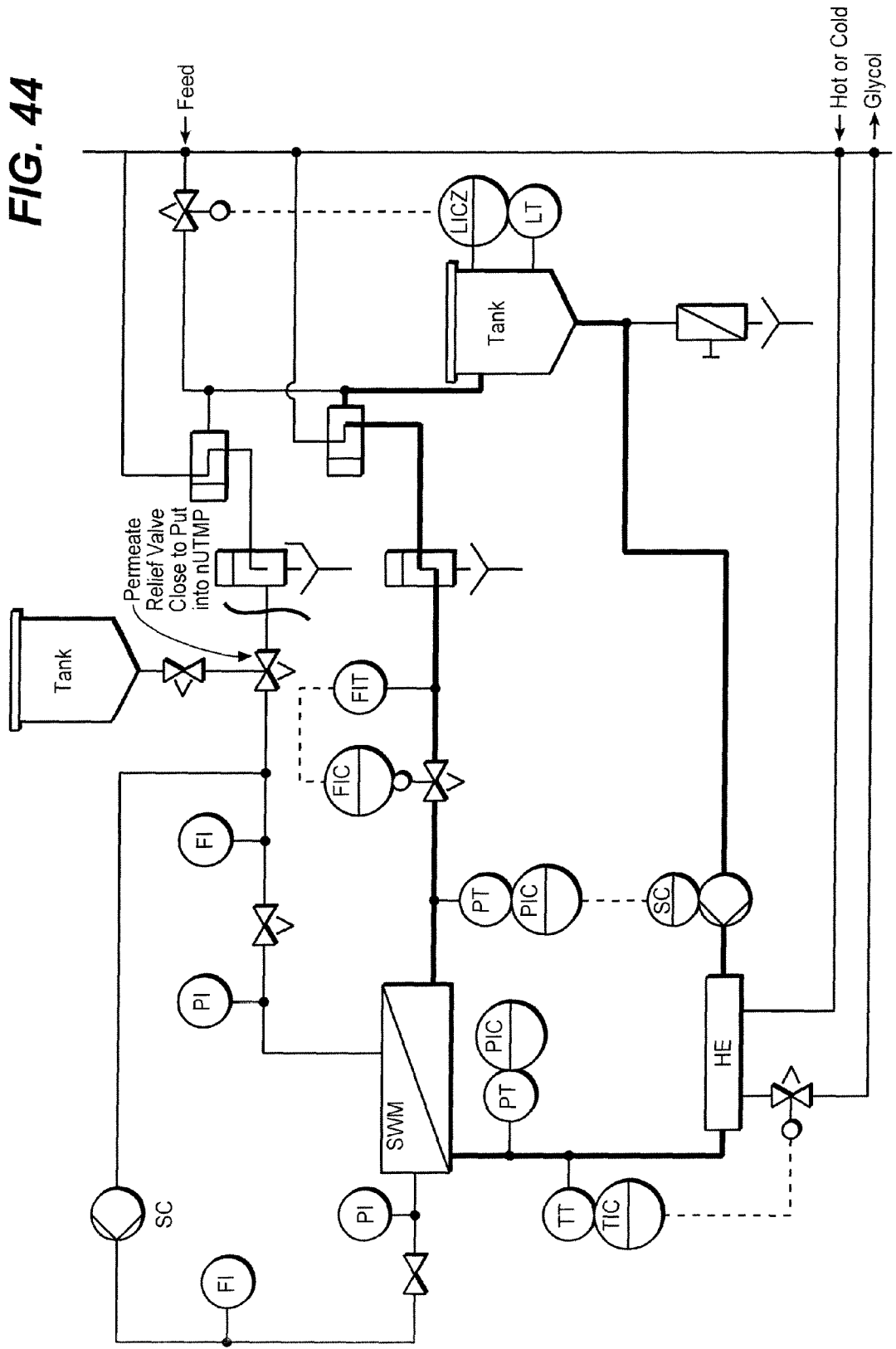
FIG. 44 depicts the equipment setup used for the experiment described in Example 10.

Four experiments were run on the equipment depicted in FIG. 44 to test the relative performance of four different modes of operation: normal (no FRE or permeate recirculation), UTMP only, UTMP/nUTMP and UTMP/rUTMP. An alkaline protease fermentation broth from *Bacillus subtilis* was used in all cases. The batch volumes and dilutions were the same for all four runs. The same 0.2 μm polysulfone MF module from Alfa Laval was used for all four experiments.

The following operating conditions were used

| | Normal | UTMP | nUTMP | rUTMP |
|---|---|---|---|---|
| Feed Pin | 2.0 | 2.0 | 2.0 | 2.0 |
| Feed Pout | 1.0 | 1.0 | 1.0 | 1.0 |
| Perm Pin | 0 | 1.0 | 1.0 | 1.0 |
| Perm Pout | 0 | 0.1 | 0.1 | 0.1 |
| Temperature | 15 C. | 15 C. | 15 C. | 15 C. |
| Feed ΔP | 1.0 | 1.0 | 1.0 | 1.0 |
| TMP | 1.5 | 0.95 | 0.95 | 0.95 |

For each experiment, 40 kg of broth was mixed with 80 kg of water and allowed to reach 15° C. Then the experiments were started. Permeate was collected in a separate tank and the process was run until the feed weight remaining in the system was 40 kg, which is equivalent to a VCF=1.0. The collected permeate was assayed for alkaline protease and the overall passage for each experiment was determined.

The nUTMP cycle was run for 5 seconds every 3 minutes. nUTMP was executed by simply closing the permeate relief valve as shown in FIG. 44. This allowed the permeate pressure to equalize with the feed side pressure due to the continued permeation from feed to permeate that builds pressure on the permeate side once the recirculation loop becomes a closed loop. rUTMP was run for 5 seconds every 2 minutes. The mode of performing rUTMP was as previously described when reducing the feed pump speed.

FIG. 24 also includes data from run 7 from Example 2 (F down 30 s/10 m).

Example 11

During the course of development of the process and equipment, some design changes were made in the equipment that led to improved hydrodynamics and control features. The major changes are depicted in the following figures.

FIG. 17: This is a schematic of the original filtration equipment set up for UTMP and rUTMP.

FIG. 44: This shows a modification made to the equipment shown in FIG. 17. Instead having a permeate tank in the permeate recirculation loop, the recirculation loop is closed. This enables nUTMP by closing the permeate relief valve.

FIGS. 15A to 15I This represents the redesigned equipment, which includes automated control of UTMP, nUTMP and 2 modes of rUTMP. Original modes of rUTMP (reducing the feed pump speed or increasing the permeate pump speed) can still be used, but the rUTMP cycle wouldn't be automated.

A potential major advantage of the fully automated system depicted in FIG. 15 is a truer rUTMP cycle. In the original set-up, if the feed pump speed is reduced, this will reduce the pressure drop as the feed passes through the filter module, so inlet and outlet pressures of the feed will not be reduced by the same amount. Assuming the permeate recirculates at a near constant rate during this cycle, the reverse flow will be greater at the inlet of the module than the outlet.

Figure 45:
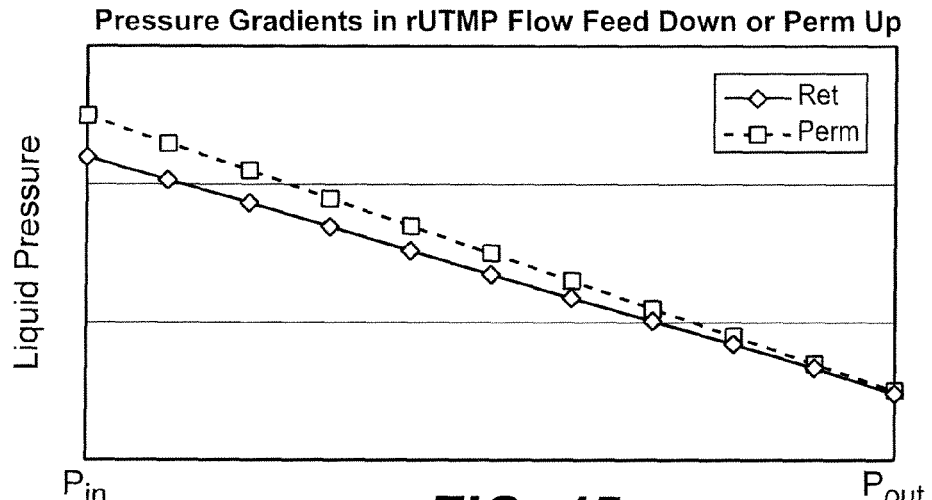
FIG. 45 depicts predicted pressure gradients for the equipment setup depicted in FIG. 44.

Conversely, when the permeate pump speed is increased, the pressure drop through the permeate collection tube increases. Assuming the feed recirculation rate is at a near constant rate, again the reverse flow will be greater at the inlet of the module than the outlet. The predicted pressure gradients are depicted in FIG. 45.

The system depicted in FIG. 15 has fully automated control of both pumps and the pressure control valves (43VC60 and 42VC60). This allows for the maintenance of equivalent pressure difference between inlet and outlet of the filter module during an rUTMP cycle, as depicted in FIG. 14

Legend of equipment used in Examples:

| Example 1 | FIG. 17 |
| Example 2 | FIG. 17 |
| Example 3 | FIG. 25 |
| Example 4 | FIG. 32 |
| Example 5 | FIG. 15I |
| Examples 6 to 8 | FIG. 15 |
| Example 9 | FIG. 15 |
| Example 10 | FIG. 44 |

FIG. 31 is a chart showing illustrative non-limiting embodiments, as series 1 to 4, and series 10 to 15, in accordance with the above or additional aspects of the present invention, with the general process conditions associated with each scenario being indicated.

Other embodiments of the present teachings will be apparent to those skilled in the art from consideration of the present specification and practice of the present teachings disclosed herein. It is intended that the specification and examples be considered as exemplary only and not be limiting of the claims. All cited references, patents, and patent applications are incorporated in their entireties herein by reference.

We claim:

1. A filtration system comprising:
    (a) spiral wound filtration membrane module, comprising:
        a spirally wound membrane,
        a retentate channel extending along a retentate side of the membrane for receiving a feed stream from a feed stream inlet and flow of retentate axially across a retentate side of the membrane to a retentate outlet for discharge from the module;
        a permeate channel located on a permeate side of the membrane that is opposite to the retentate side, for radial flow of permeate passing through the membrane to a central permeate collection tube in fluid communication therewith,
        said collection tube containing at least one flow resistance element and defining a fluid channel for flow of collected permeate to a permeate outlet for discharge of collected permeate from the module, and said collection tube has a permeate inlet for introducing at least a portion of discharged permeate back into the collection tube;
    (b) a permeate pump for returning a portion of the permeate discharged from said permeate collection tube at a controllable rate into the permeate inlet of the collection tube;
    (c) a feed stream pump for feeding the feed stream to the feed stream inlet at a controllable rate, wherein said permeate pump and feed stream pump being mutually controllable,
    (d) a controller for mutual control of the permeate pump and feed stream pump such the respective feed stream and permeate flow rates into the membrane module are mutually controllable effective to provide alternating separation and defouling phases during a production run wherein uniform transmembrane pressure is substantially maintained axially along the membrane during both phases of operation.

2. A filtration system according to claim 1, further comprising:
    (e) a pressurized water line in fluid communication with the permeate channel.

3. The filtration system of claim 1, wherein said spiral wound filtration membrane module further comprises:
    a housing having a first and second axial ends and defining an annular space in which the central permeate collection tube is located;
    a membrane leaf spirally wound around the permeate collection tube, said membrane leaf comprising a porous member sandwiched between semi-permeable membrane sheets to define the permeate passage as a radial flow channel, and a spacer arranged between windings of the membrane leaf to define the retentate channel, wherein an outer axial edge and lateral side edges of the membrane leaf are sealed and the inner axial edge thereof is in permeate flow communication with said permeate collection tube.

4. The filtration system of claim 1, wherein said permeate pump and feed stream pump further being controllable for periodically overpressurizing the permeate side of the membrane relative to the retentate side sufficient to generate backflow across the membrane from the permeate side to the retentate side while maintaining axial, co-directional positive forward flow in the retentate and permeate channels.

5. The filtration system of claim 4, wherein said permeate pump being controllable to increase return rate of discharged permeate to the permeate inlet while feed stream pump is controllable to maintain the feed stream at a constant rate.

6. The filtration system of claim 1, wherein the flow resistance element is selected from the group consisting of a tapered unitary insert, a porous media packed within an internal space defined by a collection tube through which permeate flows, a static mixing device housed within a collection tube through which permeate flows, and at least one baffle extending radially inward from an inner wall of a collection tube through which permeate flows.

7. The filtration system of claim 1, wherein the flow resistance element comprises a tapered unitary insert.

8. The filtration system of claim 1, wherein the flow resistance element comprises a tapered unitary insert retained within the collection tube by at least one resilient sealing ring located between the insert and an inner wall of the collection tube, and said tapered unitary insert including at least one groove extending below said resilient sealing ring allowing passage of fluid under the sealing ring and along an outer surface of the tapered unitary insert.

9. The filtration system of claim 1, wherein the membrane has a filter pore size of from about 0.005 micron to about 5 micron.

10. The filtration system of claim 1, wherein the membrane is selected from a PVDF, a polysulfone, or a polyether sulfone membrane.

* * * * *